(12) United States Patent
Murai et al.

(10) Patent No.: US 11,843,271 B2
(45) Date of Patent: *Dec. 12, 2023

(54) POWER RECEPTION CONTROL METHOD FOR POWER STORAGE ELEMENT AND POWER RECEPTION CONTROL DEVICE

(71) Applicants: NISSAN MOTOR CO., LTD., Yokohama (JP); RENAULT S.A.S., Boulogne-Billancourt (FR)

(72) Inventors: Kensuke Murai, Kanagawa (JP); Kenta Suzuki, Kanagawa (JP); Keigo Ikezoe, Kanagawa (JP)

(73) Assignees: NISSAN MOTOR CO., LTD., Yokohama (JP); RENAULT S. A. S., Boulogne-Billancourt (FR)

( * ) Notice: Subject to any disclaimer, the term of this patent is extended or adjusted under 35 U.S.C. 154(b) by 277 days.

This patent is subject to a terminal disclaimer.

(21) Appl. No.: 17/440,308

(22) PCT Filed: Mar. 22, 2019

(86) PCT No.: PCT/IB2019/000321
§ 371 (c)(1),
(2) Date: Sep. 17, 2021

(87) PCT Pub. No.: WO2020/194009
PCT Pub. Date: Oct. 1, 2020

(65) Prior Publication Data
US 2022/0158470 A1    May 19, 2022

(51) Int. Cl.
*H02J 7/00* (2006.01)
*B60L 53/62* (2019.01)
*B60L 53/63* (2019.01)

(52) U.S. Cl.
CPC .......... *H02J 7/00714* (2020.01); *B60L 53/62* (2019.02); *B60L 53/63* (2019.02); *H02J 7/0013* (2013.01); *H02J 7/0048* (2020.01)

(58) Field of Classification Search
CPC .... H02J 7/00714; H02J 7/0013; H02J 7/0048; H02J 7/00; B60L 53/62; B60L 53/63
See application file for complete search history.

(56) References Cited

U.S. PATENT DOCUMENTS 7,928,699 B2    4/2011  Kohn
2013/0335032 A1*  12/2013  Kuribayashi  ..........  B60L 55/00
                                                        320/137

(Continued)

FOREIGN PATENT DOCUMENTS

EP      2 429 054 A2    3/2012
EP      2 683 053 A1    1/2014

(Continued)

*Primary Examiner* — Jared Fureman
*Assistant Examiner* — Esayas G Yeshaw
(74) *Attorney, Agent, or Firm* — Foley & Lardner LLP

(57) ABSTRACT

A power reception control method for a power storage element controls element-receiving electric power received by the power storage element in an electric power system for supplying electric energy to a load group including plural power storage elements. The power reception control method acquires differential electric power by subtracting a current value of total transmitted electric power from a maximum value of the total transmitted electric power that is an available amount to be supplied to the entire load group via an electric power supply base point, calculates a degree of priority of the power storage element in accordance with a numerical value indicating a demand of a user, multiplies the differential electric power by the degree of priority to calculate element differential electric power, and adds the element differential electric power to the previous element-receiving electric power so as to update the element-receiving electric power.

11 Claims, 35 Drawing Sheets

(56) References Cited

U.S. PATENT DOCUMENTS

| | | | |
|---|---|---|---|
| 2014/0015319 A1* | 1/2014 | Nyu ........................ | H02J 3/00 |
| | | | 307/31 |
| 2014/0379151 A1* | 12/2014 | Tokuda ................. | G05B 15/02 |
| | | | 700/287 |
| 2015/0165917 A1* | 6/2015 | Robers .................... | B60L 3/12 |
| | | | 320/109 |
| 2016/0272079 A1* | 9/2016 | Quoc-Tuan ............ | B60L 53/63 |
| 2016/0380440 A1* | 12/2016 | Coleman, Jr. ............ | G05F 1/66 |
| | | | 700/295 |
| 2017/0010595 A1 | 1/2017 | Kawaguchi | |
| 2017/0018923 A1* | 1/2017 | Rombouts ............. | G05B 17/02 |
| 2017/0345107 A1* | 11/2017 | Hirata .................... | G06Q 30/04 |
| 2018/0358839 A1* | 12/2018 | Perez ...................... | H02J 3/46 |

FOREIGN PATENT DOCUMENTS

| | | |
|---|---|---|
| EP | 2 775 586 A1 | 9/2014 |
| JP | 2013-118759 A | 6/2013 |
| JP | 2013-158146 A | 8/2013 |
| JP | 2015-186338 A | 10/2015 |
| JP | 2016-033817 A | 3/2016 |
| JP | 2016-226141 A | 12/2016 |
| JP | 2017-500836 A | 1/2017 |
| JP | 6168528 B2 | 7/2017 |
| WO | WO 2012/118184 A1 | 9/2012 |
| WO | WO-2012/120976 A1 | 9/2012 |
| WO | WO-2013/021502 A1 | 2/2013 |
| WO | WO-2015/115385 A1 | 8/2015 |
| WO | WO-2017/154760 A1 | 9/2017 |

\* cited by examiner

FIG. 5A

|  | EV1 | EV2 | EV3 |
|---|---|---|---|
| START TIME | 1:00 | 1:00 | 1:00 |
| END TIME | 7:00 | 9:00 | 11:00 |
| ELECTRIC POWER CAPACITY | 3 | 3 | 3 |
| STORAGE BATTERY CAPACITY | 24 | 24 | 24 |
| START-TIME SOC | 40% | 40% | 40% |

(REFERENCE EXAMPLE)

(EMBODIMENT)

FIG. 6A

|  | EV1 | EV2 | EV3 |
|---|---|---|---|
| START TIME | 1:00 | 1:00 | 1:00 |
| END TIME | 11:00 | 11:00 | 11:00 |
| ELECTRIC POWER CAPACITY | 3 | 3 | 3 |
| STORAGE BATTERY CAPACITY | 24 | 24 | 24 |
| START-TIME SOC | 10% | 40% | 70% |
| TARGET SOC | 60% | 60% | 60% |

FIG. 7A

|  | EV1 | EV2 | EV3 |
|---|---|---|---|
| START TIME | 1:00 | 1:00 | 1:00 |
| END TIME | 11:00 | 11:00 | 11:00 |
| ELECTRIC POWER CAPACITY | 3 | 3 | 3 |
| STORAGE BATTERY CAPACITY | 24 | 24 | 24 |
| START-TIME SOC | 60% | 40% | 20% |

(REFERENCE EXAMPLE)  (EMBODIMENT)

FIG. 8A

|  | EV1 | EV2 | EV3 |
|---|---|---|---|
| START TIME | 1:00 | 1:00 | 1:00 |
| END TIME | 7:00 | 9:00 | 11:00 |
| ELECTRIC POWER CAPACITY | 3 | 3 | 3 |
| STORAGE BATTERY CAPACITY | 24 | 24 | 24 |
| START-TIME SOC | 40% | 40% | 40% |

(REFERENCE EXAMPLE)      (EMBODIMENT)

FIG. 9A

|  | EV1 | EV2 | EV3 |
|---|---|---|---|
| START TIME | 1:00 | 1:00 | 1:00 |
| END TIME | 7:00 | 9:00 | 11:00 |
| ELECTRIC POWER CAPACITY | 3 | 3 | 3 |
| STORAGE BATTERY CAPACITY | 24 | 24 | 24 |
| START-TIME SOC | 20% | 40% | 60% |

(REFERENCE EXAMPLE)  (EMBODIMENT)

FIG. 10A

|  | EV1 | EV2 | EV3 |
|---|---|---|---|
| START TIME | 1:00 | 1:00 | 1:00 |
| END TIME | 11:00 | 11:00 | 11:00 |
| ELECTRIC POWER CAPACITY | 3 | 3 | 3 |
| STORAGE BATTERY CAPACITY | 24 | 24 | 24 |
| START-TIME SOC | 40% | 40% | 40% |
| DEGREE OF PRIORITY | LOW (1/3 CORRECTION) | MIDDLE (2/3 CORRECTION) | HIGH (NO CORRECTION) |

FIG. 11A

|  | EV1 | EV2 | EV3 |
|---|---|---|---|
| START TIME | 1:00 | 2:00 | 3:00 |
| END TIME | 11:00 | 10:00 | 9:00 |
| ELECTRIC POWER CAPACITY | 3 | 3 | 3 |
| STORAGE BATTERY CAPACITY | 24 | 24 | 24 |
| START-TIME SOC | 40% | 40% | 40% |

FIG. 12A

|  | EV1 | EV2 | EV3 |
|---|---|---|---|
| START TIME | 1:00 | 2:00 | 3:00 |
| END TIME | 11:00 | 10:00 | 9:00 |
| ELECTRIC POWER CAPACITY | 3 | 3 | 3 |
| STORAGE BATTERY CAPACITY | 24 | 24 | 24 |
| START-TIME SOC | 40% | 40% | 40% |

FIG. 13A

|  | EV1 | EV2 | EV3 |
|---|---|---|---|
| START TIME | 1:00 | 2:00 | 3:00 |
| END TIME | 11:00 | 10:00 | 9:00 |
| ELECTRIC POWER CAPACITY | 3 | 3 | 3 |
| STORAGE BATTERY CAPACITY | 24 | 24 | 24 |
| START-TIME SOC | 40% | 40% | 40% |

(REFERENCE EXAMPLE)

(EMBODIMENT)

FIG. 14A

|  | EV1 | EV2 | EV3 |
|---|---|---|---|
| START TIME | 1:00 | 2:00 | 3:00 |
| END TIME | 11:00 | 10:00 | 9:00 |
| ELECTRIC POWER CAPACITY | 3 | 3 | 3 |
| STORAGE BATTERY CAPACITY | 24 | 24 | 24 |
| START-TIME SOC | 40% | 40% | 40% |

(REFERENCE EXAMPLE)

(EMBODIMENT)

FIG. 15A

|  | EV1 | EV2 | EV3 |
|---|---|---|---|
| START TIME | 1:00 | 2:00 | 3:00 |
| END TIME | 11:00 | 10:00 | 9:00 |
| ELECTRIC POWER CAPACITY | 3 | 3 | 3 |
| STORAGE BATTERY CAPACITY | 24 | 24 | 24 |
| ARRIVAL-TIME SOC | 40% | 40% | 40% |

(FIFTH MODIFIED EXAMPLE)

(SIXTH MODIFIED EXAMPLE)

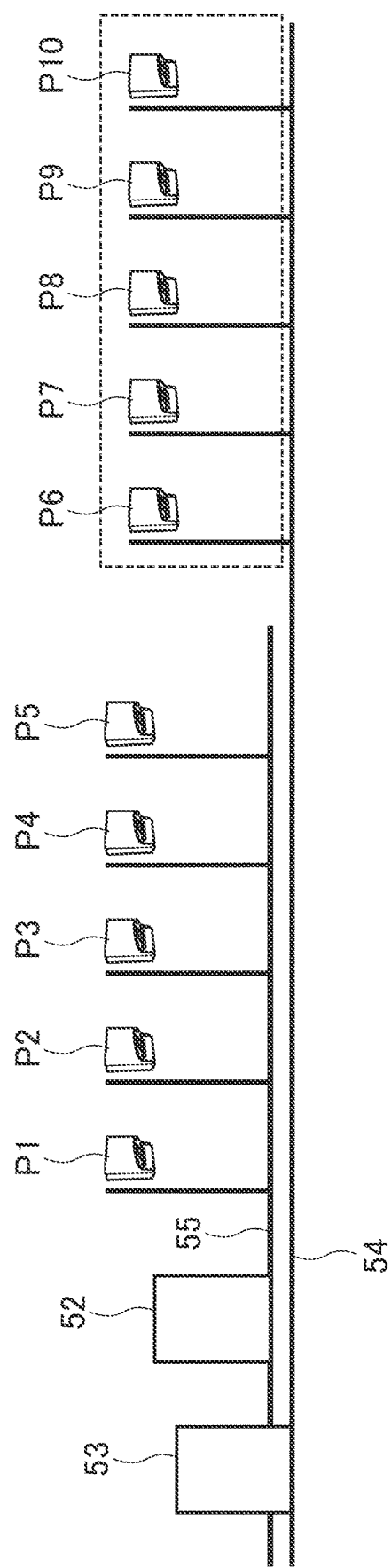

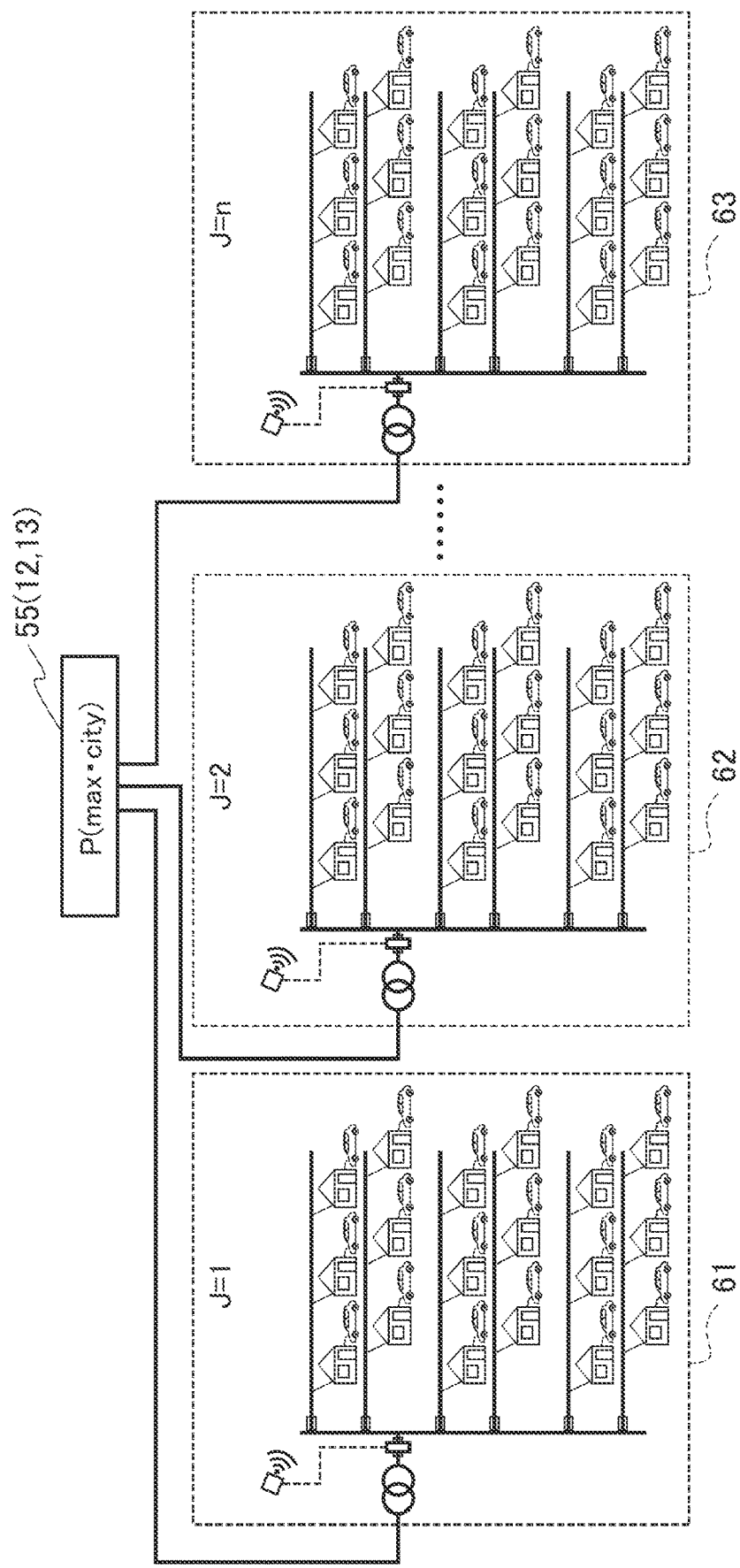

POWER RECEPTION CONTROL METHOD FOR POWER STORAGE ELEMENT AND POWER RECEPTION CONTROL DEVICE

TECHNICAL FIELD

The present invention relates to a power reception control method for a power storage element and a power reception control device.

BACKGROUND ART

Japanese Patent No. 6168528 (Patent Literature 1) discloses a technique that controls electric power consumption of a plurality of electric power-consuming elements according to constraints of total consumed electric power consumed in an entire group including the electric power-consuming elements. Patent Literature 1 particularly discloses as follows. A broadcast transmission element transmits a function of a difference between a current value of the total consumed electric power and a reference value of the total consumed electric power (an instruction value for adjusting the total consumed electric power) as broadcast into the group. The electric power-consuming elements each control the own consumed electric power by use of the function and a degree of priority given for each of the electric power-consuming elements. This leads the current value of the total consumed electric power of the entire group to converge in the reference value of the total consumed electric power so as to be constrained. The respective electric power-consuming elements thus can be controlled independently of the electric power control broadcast transmission element and the other electric power-consuming elements.

CITATION LIST

Patent Literature

Patent Literature 1: Japanese Patent 6168528

SUMMARY OF THE INVENTION

Technical Problem

The technique disclosed in Patent Literature 1 does not take into account of demands of users of the respective electric power-consuming elements upon setting the degree of priority. This technique can share the difference between the current value of the total consumed electric power and the reference value of the total consumed electric power among the respective electric power-consuming elements, but cannot reflect, in the sharing of the difference, the demands of the users of the respective electric power-consuming elements that differ from each other.

In view of the foregoing problem, the present invention provides a power reception control method for a power storage element and a power reception control device capable of suitably sharing electric power depending on a demand of a user of the respective power storage elements while leveling a state of charge of the respective power storage elements.

Technical Solution

An aspect of the present invention provides a power reception control method for a power storage element, the method repeating a processing cycle to control element-receiving electric power received by the power storage element in an electric power system for supplying electric energy to a load group including plural power storage elements via an electric power supply base point. The processing cycle includes acquiring differential electric power obtained by subtracting a current value of total transmitted electric power having been supplied to the entire load group via the electric power supply base point from a maximum value of the total transmitted electric power that is an available amount to be supplied to the entire load group via the electric power supply base point, calculating a degree of priority of the power storage element in accordance with a numerical value indicating a demand of a user of the power storage element, multiplying the differential electric power by the degree of priority to calculate element differential electric power, and adding the element differential electric power to the element-receiving electric power in a previous processing cycle so as to update the element-receiving electric power.

Advantageous Effects

The aspect of the present invention can suitably share the electric power depending on the demand of the user of the respective power storage elements while leveling the state of charge of the respective power storage elements.

BRIEF DESCRIPTION OF DRAWINGS

FIG. 5A is a table illustrating conditions of a simulation in the first embodiment.

FIG. 6A is a table illustrating conditions of a simulation in a second embodiment.

FIG. 7A is a table illustrating conditions of a first simulation in a third embodiment.

FIG. 8A is a table illustrating conditions of a second simulation in the third embodiment.

FIG. 9A is a table illustrating conditions of a third simulation in the third embodiment.

FIG. 10A is a table illustrating conditions of a simulation in a fourth embodiment.

FIG. 11A is a table illustrating conditions of a simulation in a fifth embodiment.

FIG. 12A is a table illustrating conditions of a simulation in a third modified example.

FIG. 13A is a table illustrating conditions of a simulation in a fourth modified example.

FIG. 14A is a table illustrating conditions of a simulation in a fifth modified example.

FIG. 15A is a table illustrating conditions of a simulation in a sixth modified example.

FIG. 17A is a block diagram showing a comparative example with respect to a second example.

FIG. 20A is a block diagram illustrating a configuration of a power reception control device and peripheral devices according to a sixth example.

DESCRIPTION OF EMBODIMENTS

Figure 1:
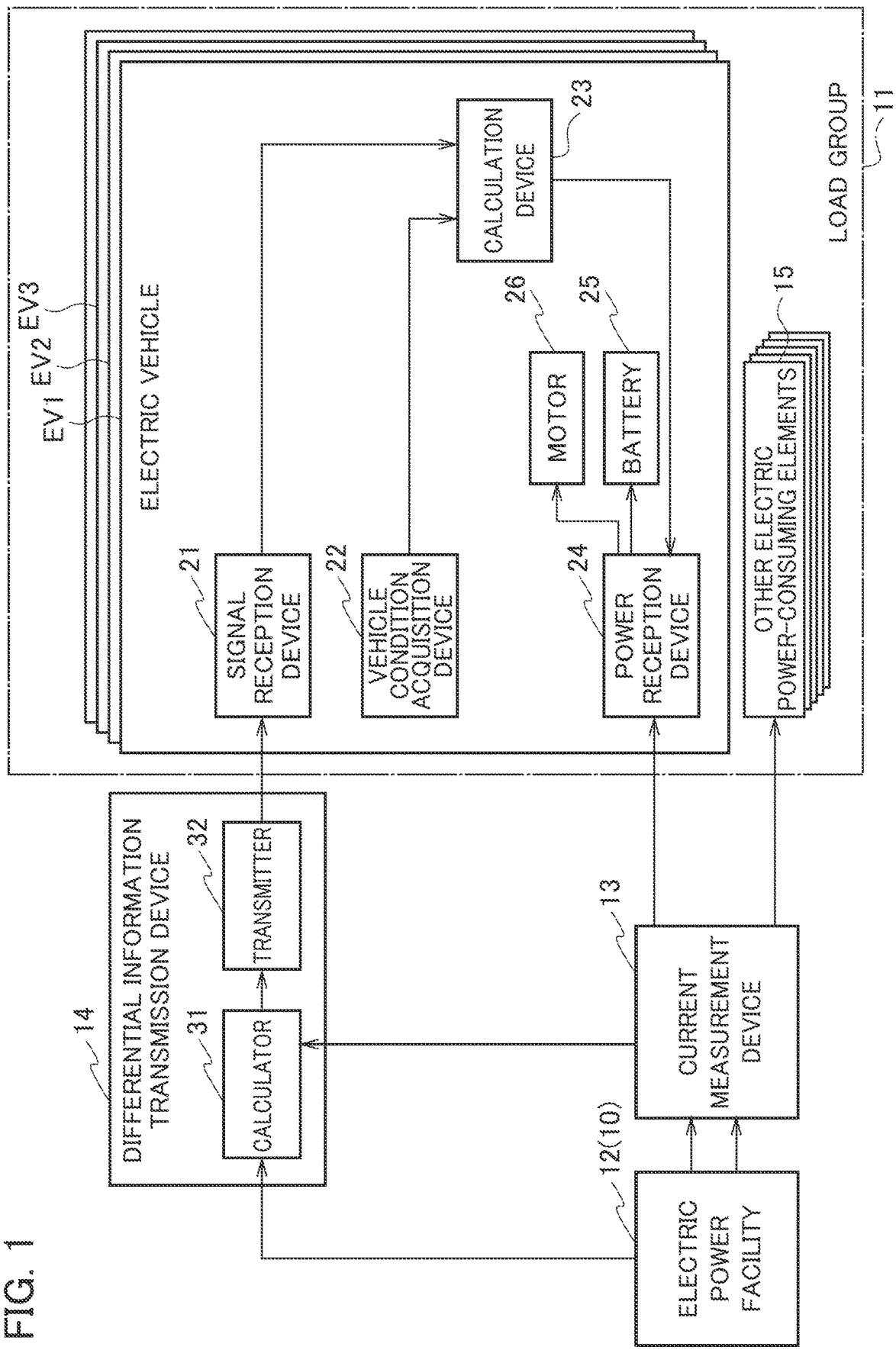
FIG. 1 is a block diagram illustrating a configuration of a power reception control device of an electric vehicle EV1 and peripheral devices according to a first embodiment.

Embodiments, modified examples thereof, and specific examples to which the embodiments or the modified examples are applied are described below with reference to the drawings. The same elements illustrated in the drawings are denoted by the same reference numerals, and overlapping explanations are not repeated below.

First Embodiment

A configuration of a power reception control device of an electric vehicle (an example of a power reception element) and peripheral devices according to a first embodiment is described below with reference to FIG. 1. The power reception control device, which serves as a part of an electric power system for supplying electric energy to a load group 11 including a plurality of electric vehicles (EV1, EV2, EV3, . . . ) via an electric power facility 12 (an example of an electric power supply base point 10), repeats a predetermined processing cycle so as to control element-receiving electric power received by the electric vehicle EV1 included in the load group 11.

The power reception control device includes a signal reception device 21 that externally receives electrical signals, a vehicle condition acquisition device 22 that acquires information indicating a condition of the electric vehicle EV1, and a calculation device 23 that calculates the element-receiving electric power of the electric vehicle EV1. The electric vehicle EV1 includes a power reception device 24 that externally receives electric power, a battery 25 that stores the electric power (the element-receiving electric power) received by the power reception device 24, and a motor 26 driven according to the electric energy or the element-receiving electric power stored in the battery 25.

The "processing cycle" as used herein includes processing steps (a) to (e) below.

(a) The signal reception device 21 acquires information indicating differential electric power ($\Delta P$) obtained by subtracting a current value of the total transmitted electric power (Pall_now) having been supplied to the entire load group 11 via the electric power facility 12 from a maximum value of the total transmitted electric power (Pall_max) that is the available amount to be supplied to the entire load group 11 via the electric power facility 12.

(b) The calculation device 23 calculates a degree of priority ($\beta$) of the electric vehicle EV1 indicating a level of priority regarding the electric power reception that the own vehicle (the electric vehicle EV1) has over the other electric vehicles (EV2, EV3, . . . ), in accordance with a numerical value indicating a demand of the user of the electric vehicle EV1.

(c) The calculation device 23 multiplies the differential electric power ($\Delta P$) indicated in the acquired information by the degree of priority (P) so as to calculate element differential electric power ($\beta \Delta P$).

(d) The calculation device 23 adds the element differential electric power (β∆P) to the element-receiving electric power (Pt) in a previous processing cycle so as to update the element-receiving electric power (Pt+1).

(e) The calculation device 23 controls the electric vehicle EV1 so as to receive the element-receiving electric power (Pt+1) after being updated.

The term "electric vehicle" as used in the respective embodiments, modified examples, and examples refers to an example of a "power storage element" or a "power reception element" that receives electric power transferred via the electric power facility 12. The power storage element stores the received electric power in a battery (including a secondary battery, a storage battery, and a rechargeable battery). The term "power storage element" includes any apparatuses and devices that include batteries, such as vehicles (including electric vehicles, hybrid vehicles, construction machines, and agricultural machines), train vehicles, playground equipment, tools, home appliances, and daily necessities.

The "power storage element" is an example of the "power reception element" that receives the electric power transferred via the electric power facility 12. The "power reception element" includes, in addition to the "power storage element", an "electric power-consuming element" that does not store but consumes the received electric power. Examples of "electric power-consuming elements" include train vehicles, playground equipment, tools, home appliances, and daily necessities. The "electric power-consuming element" can include a battery as in the case of the electric vehicles. When the electric power received by an electric vehicle is directly transmitted to a motor without being stored in the battery to be consumed as drive power by the motor, the electric vehicle is presumed to be an example of the "electric power-consuming element". The "electric power-consuming element" thus includes any apparatuses and devices that do not store but consume the received electric power, regardless of whether to include a battery.

Both the "power storage element" and the "power reception element" are indicative of a unit configuration for the power reception control by the power reception control device. Namely, the power reception control according to the respective embodiments, modified examples, and examples is executed by use of the power storage element or the power reception element as a unit. For example, the power reception control according to the respective embodiments, modified examples, and examples is executed for each of the electric vehicles (EV1, EV2, EV3, . . . ) independently of and parallel to each other.

The respective embodiments illustrate the power storage elements as an example of the power reception elements, and illustrate the electric vehicles (EV) as an example of the power storage elements that travel by use of electricity as an energy source and the motor 26 as a power source. It should be understood that the power reception elements and the power storage elements described in the present invention are not intended to be limited to the electric vehicles (EV).

The term "electric power facility 12" as used in the respective embodiments and modified examples refers to an example of the electric power supply base point 10. Examples of the electric power facility 12" include elements <1> to <6> as described below.

The specific application cases are described in the following first to seventh examples below.

<1> "Charging station" for electric vehicles EV;

<2> "Electric power converter" installed in a spot such as a residence, an office building, a commercial facility, a factory, or a parking lot in an expressway;

<3> "Power plant" for hydropower generation, thermal power generation, or atomic power generation, and "electrical substation" for converting generated electric power to predetermined voltage;

<4> "Wiring facility" of various types for distributing electric power transferred via an electrical substation;

<5> "Wiring (including cables and feeders)" for connecting the above devices or facilities to each other; and <6> "Virtual power plant (VPP)" for aggregating neighboring small-scale power storage elements to function as if a single large power plant.

While the respective embodiments, modified examples thereof, and examples are illustrated herein with a case in which the power reception control device is mounted on the electric vehicle EV1, the power reception control device can externally control the element-receiving electric power of the electric vehicle EV1 outside the electric vehicle EV1 by use of near-field communication technologies such as short-range wireless communications, wireless LANs, and wireless WANs, or mobile communication networks.

While the respective embodiments, modified examples thereof, and examples are illustrated with the configuration of one electric vehicle EV1 among the plural electric vehicles (EV1, EV2, EV3, . . . ) included in the load group 11, the other electric vehicles (EV2, EV3, . . . ) included in the load group 11 also have the same configuration as the electric vehicle EV1.

The power reception control device controls the electric power received by the electric vehicle EV1 via the electric power facility 12. The electric vehicle EV1 includes the power reception device 24 called an on-board charger (OBC). The calculation device 23 controls the electric power received by the power reception device 24 via the electric power facility 12. The electric power received by the power reception device 24 is stored in the battery 25. Alternatively, the electric vehicle EV1 may be configured such that the electric power received by the electric power reception device is directly transferred to the motor 26 serving as a drive source without being stored in the battery 25.

The electric power supplied to the electric vehicle EV1 via the electric power facility 12 is measured by a current measurement device 13. The value of the electric power calculated by the current measurement device 13 is transmitted to a differential information transmission device 14.

The electric energy is supplied to the respective electric vehicles (EV1, EV2, EV3, . . . ) included in the load group 11 via the single electric power facility 12. The electric energy may also be supplied to one or more other electric power-consuming elements 15 included in the load group 11 via the single electric power facility 12, in addition to the respective electric vehicles (EV1, EV2, EV3, . . . ). The respective electric vehicles (EV1, EV2, EV3, . . . ) and the one or more other electric power-consuming elements 15 that receive the electric energy via the electric power facility 12 compose a single group (the load group 11).

The current measurement device 13 measures the current value of the total transmitted electric power (Pall_now) supplied to all of the electric vehicles (EV1, EV2, EV3, . . . ) and the other electric power-consuming elements 15 included in the single load group 11 via the electric power facility 12, namely, measures the total transmitted electric power of the entire load group 11.

The electric power capacity of the entire load group 11, which is the maximum value of the total transmitted electric power (Pall_max) that is the available amount to be supplied to the entire load group 11 via the electric power facility 12, is preliminarily determined. The power reception control device according to the respective embodiments controls the element-receiving electric power of the electric vehicle EV1 according to constraints of the maximum value of the total transmitted electric power (Pall_max). For example, the power reception control device controls the electric power to be received by the electric vehicle EV1 such that the current value of the total transmitted electric power (Pall_now) calculated by the current measurement device 13 does not exceed the maximum value of the electric power (Pall_max). The power reception control device can be configured to control the electric power to be received by the electric vehicle EV1 such that the current value of the total transmitted electric power (Pall_now) is temporarily allowed to exceed the maximum value of the electric power (Pall_max). The maximum value of the total transmitted electric power (Pall_max), which is determined depending on various factors, is described in detail in the respective examples below.

As illustrated in FIG. 1, the first embodiment is illustrated with a case in which the differential information transmission device 14 is connected to each of the electric power facility 12, the current measurement device 13, and the electric vehicle EV1 so as to communicate with each other in a wireless or wired manner. The electric power facility 12 sends an electrical signal indicating the maximum value of the total transmitted electric power (Pall_max) to the differential information transmission device 14. The current measurement device 13 sends a signal indicating the calculated current value of the total transmitted electric power (Pall_now) to the differential information transmission device 14.

The differential information transmission device 14 includes a calculator 31 and a transmitter 32. The calculator 31 calculates the differential electric power (ΔP) by subtracting the current value of the total transmitted electric power (Pall_now) from the maximum value of the total transmitted electric power (Pall_max) according to the formula (1) below. The transmitter 32 transmits (broadcasts) an electrical signal indicating the differential electric power (ΔP) to all of the electric vehicles (EV1, EV2, EV3, ... ) included in the load group 11 by mobile communication. The electrical signal indicating the differential electric power (ΔP) is received by the signal reception device 21, and is transferred to the calculation device 23. The power reception control device thus can acquire the information about the differential electric power (ΔP) obtained by subtracting the current value of the total transmitted electric power (Pall_now) supplied to the entire load group 11 via the electric power facility 12 from the maximum value of the total transmitted electric power (Pall_max) that is the available amount to be supplied to the entire load group 11 via the electric power facility 12.

[Math. 1]

$$\Delta P = P_{all\_max} - P_{all\_now} \quad (1)$$

The differential information transmission device 14 uses the transmitter 32 to transmit (broadcast) the information indicating the differential electric power (ΔP) by wireless communication to the signal reception device 21 of all of the electric vehicles (EV1, EV2, EV3, ... ) included in the load group 11. The transmission of the information indicating the differential electric power (ΔP) may be made in a wired manner.

Figure 3:
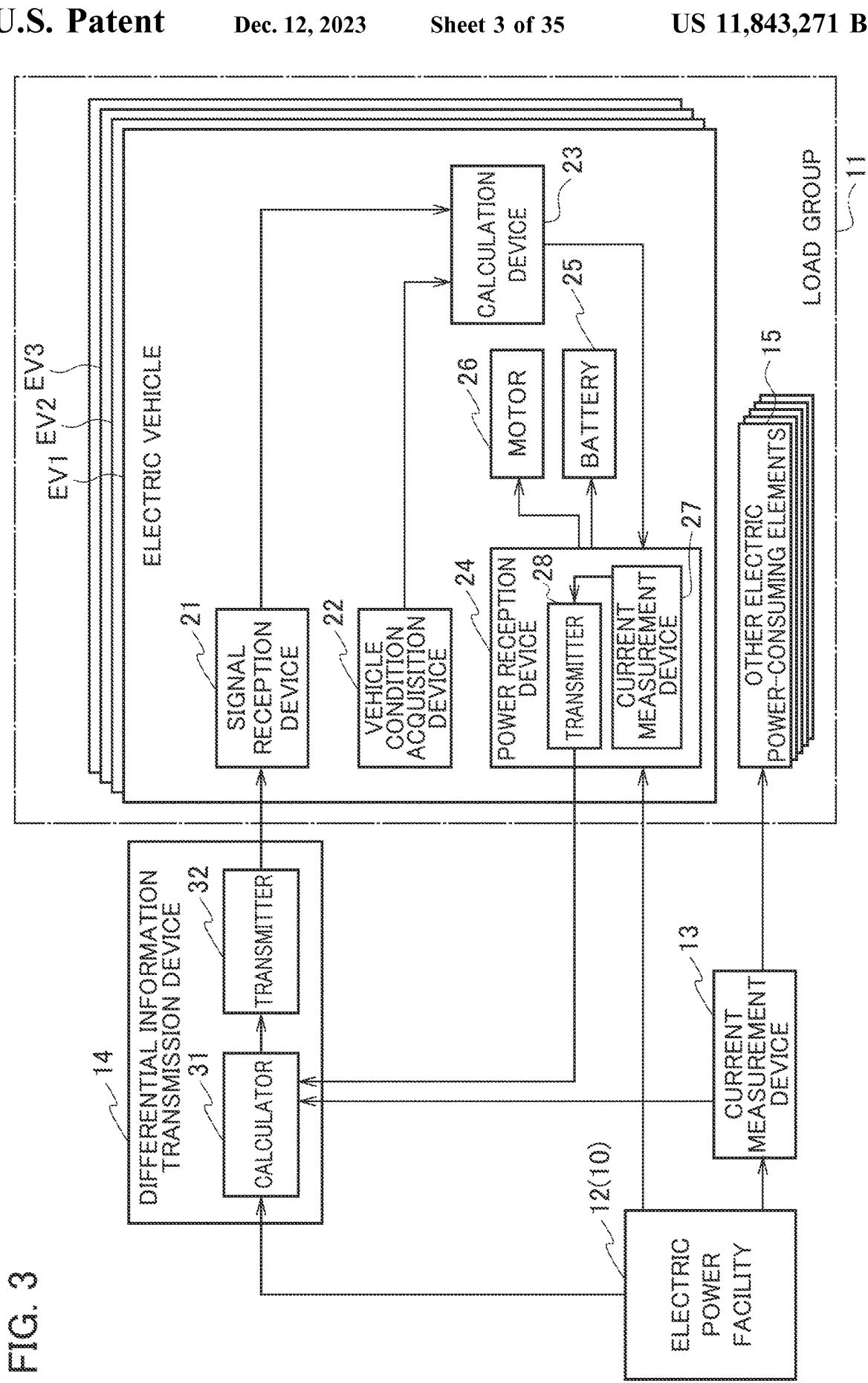
FIG. 3 is a block diagram illustrating a configuration of the power reception control device of the electric vehicle EV1 and the peripheral devices according to a first modified example of the first embodiment.

The differential information transmission device 14 in the example shown in FIG. 1 does not need to include a signal reception device for receiving signals indicating conditions of the respective electric vehicles, such as a state of charge (SOC) of the battery 25 and a time at which charging is finished (Td), transmitted from the respective electric vehicles. In other words, the communications between the differential information transmission device 14 and the respective electric vehicles only need to be made by one-way communications from the differential information transmission device 14 toward the respective electric vehicles. An example in which two-way communications are required is described below with reference to FIG. 3.

The differential information transmission device 14 may be a server connected to each of the electric power facility 12, the current measurement device 13, and the load group 11 via a computer network. Alternatively, the differential information transmission device 14 may be configured to serve as a part of the electric power facility 12.

The vehicle condition acquisition device 22 acquires the information about the condition of the electric vehicle EV1. The term "condition of the electric vehicle EVE" refers to a numerical value indicating a demand of the user of the electric vehicle EV1, for example. The numerical value indicating the demand of the user of the electric vehicle EV1 is a remaining time period (T) by the time at which the electric power reception of the electric vehicle EV1 ends (the end time Td of the electric power reception). The remaining time period (T) can be calculated according to the time at which the electric vehicle EV1 finishes the electric power reception. The remaining time period (T) is a time during which the battery 25 of the electric vehicle EV1 can be charged.

Figure 2:
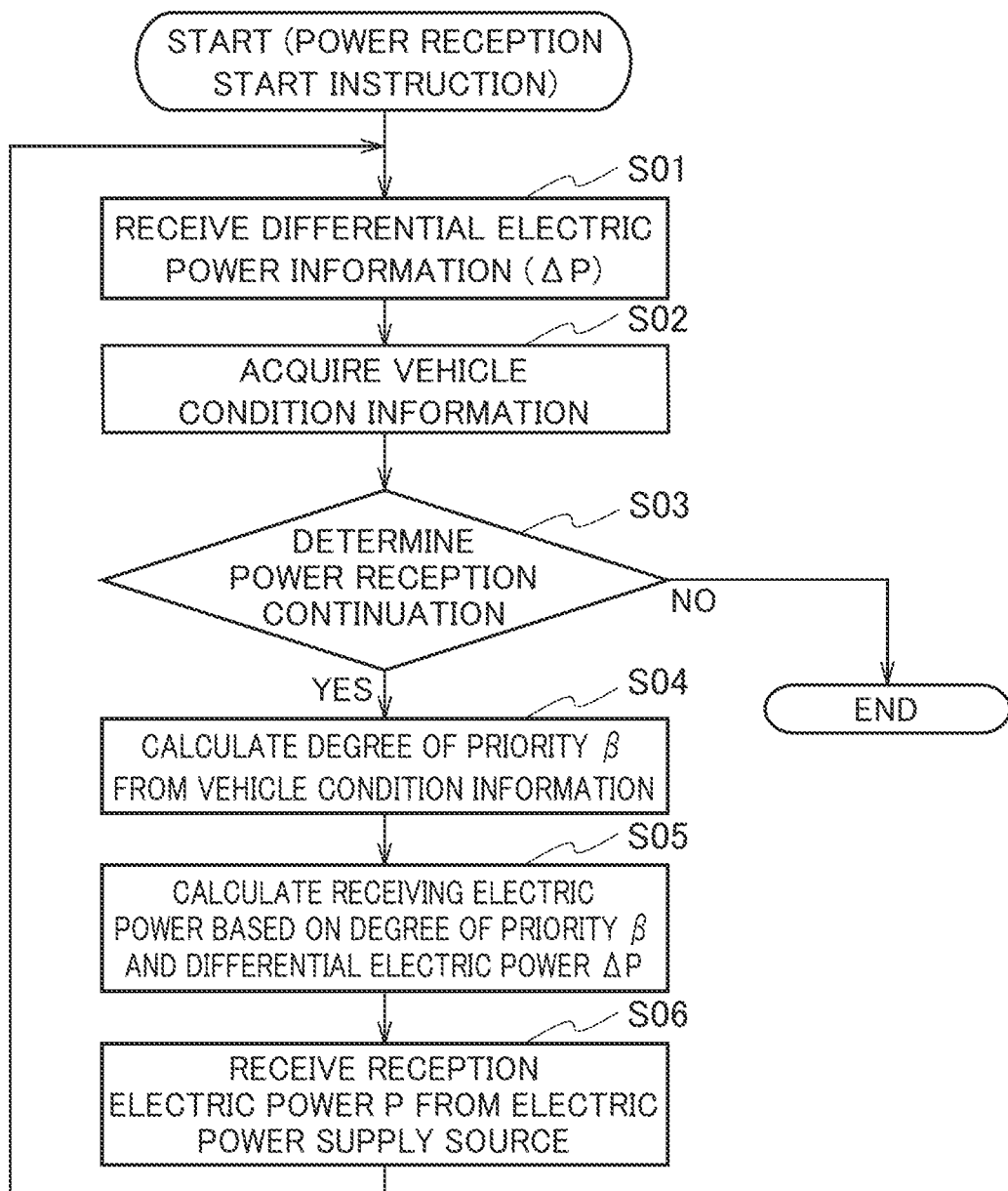
FIG. 2 is a flowchart showing time-series processing steps (a) to (e) executed by the power reception control device illustrated in FIG. 1.

For example, when the user, who returns home and starts charging the battery of the electric vehicle EV1 in its parking space, intends to go out with the electric vehicle EV1 at 7 a.m. on the following day, the user can set a predetermined time (five minutes) before 7 a.m. on the following day as the end time of the electric power reception. The "demand of the user" intending to "leave at 7 a.m. tomorrow" herein indicates the end time of the electric power reception (6:55 a.m.=$T_d$) and the remaining time period (T) by the end time of the electric power reception. The term "end time of the electric power reception (Td)" refers to a time at which a period ends during which the electric vehicle EV1 can keep the electric power reception, which differentiates a time at which the electric power reception is determined not to be continued (NO in step S03) as described in a power reception control flowchart below (FIG. 2).

The end time of the electric power reception (Td) may be a time actually set by the user via an information communication terminal such as a smartphone or a user interface mounted on the electric vehicle EV1. Alternatively, the end time of the electric power reception (Td) may be estimated according to statistical data obtained through inquiries into past action histories of the user (such as histories of past leaving times) when there is no specific instruction or setting made by the user.

The calculation device 23 calculates the degree of priority (β) of the electric vehicle EV1 indicating a level of priority regarding the electric power reception that the own vehicle EV1 has over the other electric vehicles (EV2, EV3, ... ), according to the numerical value indicating the demand of the user of the electric vehicle EV1 (the condition of the electric vehicle EV1). In particular, the calculation device 23 calculates the degree of priority (β) based on the remaining time period (T) from the current time ($T_o$) to the end time ($T_d$) of the electric power reception according to the formula (2) below. In the formula (2), N is the total number of the electric vehicles that receive the electric power in the load group 11.

[Math. 2]

$$\beta = \frac{1}{N \times (T_d - T_0)} \quad (2)$$

As given by the formula (2), the degree of priority (β) is inversely proportional to the remaining time period (T). The degree of priority (β) is higher as the remaining time period (T) is shorter. The application of the formula (2) is an example, and the degree of priority (β) may be inversely proportional to "the remaining time period (T) to the power of g" obtained by multiplying the remaining time period (T) 'g' times (g is a positive integer of two or greater).

The total number (N) of the electric vehicles may be statistical data (numerical data) obtained through inquiries into histories of the past electric power reception in the load group 11, or may be estimated as an approximate total number (N) according to the current value of the electric power (Pall_now). The total number (N) is transmitted as broadcast from the differential information transmission device 14 as in the case of the differential electric power (ΔP) or from a device annexed to the differential information transmission device 14. Alternatively, the total number (N) may be specified in accordance with positional information or identification signals of a charging system.

The calculation device 23 calculates the element differential electric power (βΔP) by multiplying the differential electric power (ΔP) by the degree of priority (β), and adds the element differential electric power (βΔP) to the element-receiving electric power (Pt) in the previous processing cycle so as to update the element-receiving electric power (Pt+1), according to the formula (3) below. The suffixes (subscripts) "t" and "t+1" placed after the symbol "P" indicating the element-receiving electric power refer to the repeated number of the "processing cycle", where t is a positive integer including zero.

[Math. 3]

$$P_{t+1} = P_t + \beta \cdot \Delta P \quad (3)$$

The calculation device 23 sends an instruction signal to the power reception device 24 so as to receive the element-receiving electric power (Pt+1) after being updated. The power reception device 24 when receiving the instruction signal receives the updated element-receiving electric power (Pt+1) via the electric power facility 12.

The power reception control device repeatedly executes the "processing cycle" including the processing steps (a) to (e) at regular intervals, so as to control the electric power (the element-receiving electric power Pt) received by the power reception device 24 of the electric vehicle EV1.

An example of a power reception control method executed by the power reception control device as illustrated in FIG. 1 is described below with reference to the flowchart shown in FIG. 2. A person skilled in the art can easily understand a specific process of the power reception processing method executed by the power reception control device, according to the explanations of the specific configurations and functions of the power reception control device as illustrated in FIG. 1. The present embodiment thus herein illustrates the power reception processing method executed by the power reception control device shown in FIG. 1 with main processing operations of the power reception control device, and explanations of specific processing operations that overlap with those with reference to FIG. 1 are not repeated below.

First, in step S01, the signal reception device 21 acquires the information indicating the differential electric power (ΔP) calculated by the calculator 31. The process proceeds to step S02, and the vehicle condition acquisition device 22 acquires the information indicating the end time (Td) of the electric power reception as an example of the information indicating the condition of the electric vehicle EV1.

The process proceeds to step S03, and the power reception control device determines whether the electric power reception needs to be continued. For example, when the instruction signal for finishing the electric power reception is received from the user of the electric vehicle EV1 (NO in step S03) or when the current time reaches the end time ($T_d$) of the electric power reception, the power reception control device ends the electric power reception. The power reception control device also ends the electric power reception when detecting disconnection of a charging port (NO in step S03), since the probability that the electric vehicle EV1 starts moving within several minutes from the disconnection is high. The power reception control device also ends the electric power reception when the state of charge (SOC) of the battery 25 reaches a target value (NO in step S03). When any of these cases are not detected (YES in step S03), the power reception control device causes the process to proceed to step S04 so as to keep the electric power reception.

In step S04, the calculation device 23 calculates the degree of priority (β) based on the end time (Td) of the electric power reception according to the formula (2). The process proceeds to step S05, and the calculation device 23 substitutes the differential electric power (ΔP) and the degree of priority (β) for the formula (3) so as to update the element-receiving electric power (Pt+1).

The process proceeds to step S06, and the calculation device 23 controls the power reception device 24 so as to receive the element-receiving electric power (Pt+1) after being updated. The power reception control device repeats the processing cycle from step S01 to step S06 as a unit until the determination in the step S03 results in NO so as to control the element-receiving electric power (P).

First Modified Example

The first embodiment is illustrated above with the case of the one-way communications from the differential information transmission device 14 toward the respective electric vehicles. The present invention is not limited to this case, and the communications between the differential information transmission device 14 and the respective electric vehicles may be two-way communications, for example. A first modified example of the first embodiment is illustrated below with a case in which the power reception device 24 further includes a transmitter 28 so as to transmit an electrical signal indicating the element-receiving electric power (Pt) of the electric vehicle EV1 from the transmitter 28 to the differential information transmission device 14. The explanations of the other electric vehicles (EV2, EV3, . . . ) included in the load group 11, which all have the same configurations as the electric vehicle EV1, are omitted below. The different points from the first embodiment are mainly described, and the points common to those in the first embodiment are not repeated below.

The power reception device 24 includes a current measurement device 27 that measures the electric power (the element-receiving electric power) received by the electric vehicle EV1, and the transmitter 28 that transmits the electrical signal indicating the element-receiving electric power (Pt) to the differential information transmission device 14 by wireless communication. In particular, the current calculation device 27 measures a value of a current flowing through the power reception device 24, and calculates the element-receiving electric power (Pt) based on a voltage upon the electric power reception. The transmitter 28 and the differential information transmission device 14 are connected so as to communicate with each other via a computer network. The transmitter 28 may be integrated with the signal reception device 21 so as to implement a transmission/reception device. A transmission device that exchanges communications according to mobile communication standards such as 4G and 5G may be used as the transmitter 28.

The current measurement device 13 thus does not need to measure the electric power transferred to the respective electric vehicles (EV1, EV2, EV3, . . . ) of the entire electric power supplied via the electric power facility 12, but only measures the electric power transferred to the other electric power-consuming elements 15. The current measurement device 13 measures the total transmitted electric power supplied to the other electric power-consuming elements 15 included in the load group 11, and sends the electrical signal indicating the calculated total transmitted electric power to the differential information transmission device 14.

The calculator 31 adds up the total transmitted electric power supplied to the other electric power-consuming elements 15 and the element-receiving electric power of all of the respective electric vehicles (EV1, EV2, EV3, . . . ), so as to calculate the current value of the total transmitted electric power (Pall_now) supplied to the entire load group 11 via the electric power facility 12.

While the configurations of the power reception device 24 and the current measurement device 13 and the method of calculating the current value of the total transmitted electric power (Pall_now) differ from those as described with reference to FIG. 1, the other configurations are the same as the case illustrated in FIG. 1, and overlapping explanations are not repeated below.

The operations of the power reception control device, namely, the power reception control method according to the first modified example is common to the process as illustrated in FIG. 2. The operation in step S06 only differs from that illustrated in FIG. 2. In step S06, the calculation device 23 controls the power reception device 24 so as to receive the element-receiving electric power (Pt+1) after being updated. The current measurement device 27 then measures the element-receiving electric power, and the transmitter 28 transmits the electrical signal indicating the element-receiving electric power measured to the differential information transmission device 14. The other steps are common to those in the first embodiment, and overlapping explanations are not repeated below.

Second Modified Example

Figure 4:
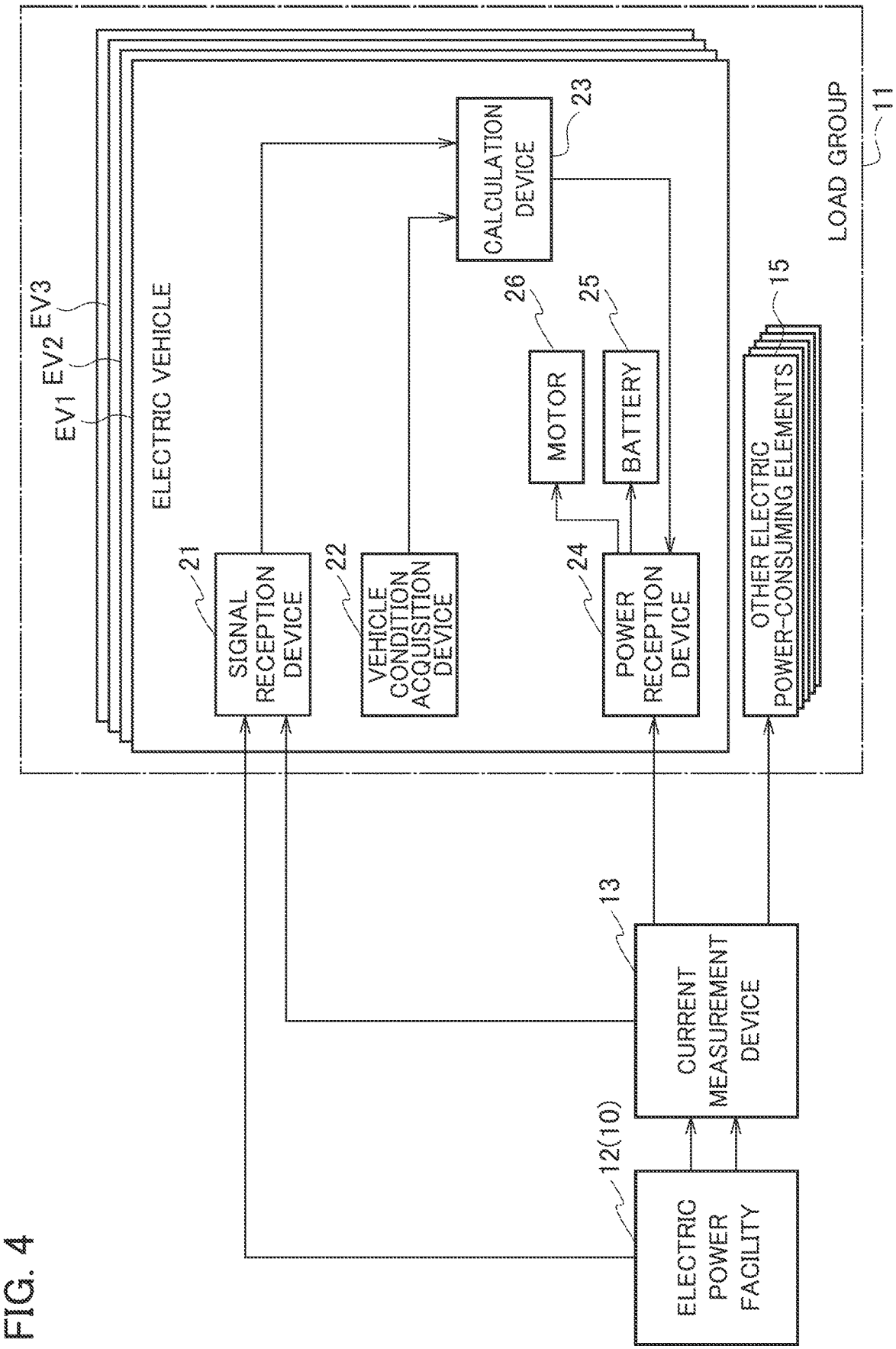
FIG. 4 is a block diagram illustrating a configuration of the power reception control device of the electric vehicle EV1 and the peripheral devices according to a second modified example of the first embodiment.

The first modified example of the first embodiment is illustrated above with the case in which the signal reception device 21 receives the information indicating the differential electric power (ΔP) calculated on the outside of the power reception control device (by the differential information transmission device 14). The present invention is not limited to this case, and the signal reception device 21 may calculate the differential electric power (ΔP) by itself according to the formula (1). In this case, as illustrated in FIG. 4, the signal reception device 21 receives, from the electric power facility 12, the electrical signal indicating the maximum value of the total transmitted electric power (Pall_max) that is the available amount to be supplied to the entire load group 11 via the electric power facility 12, and receives the electrical signal indicating the current value of the total transmitted electric power (Pall_now) from the current measurement device 13.

The signal reception device 21 transfers the electrical signal indicating the differential electric power (ΔP) calculated by itself to the calculation device 23. The other configurations are the same as those shown in FIG. 1 (in the first embodiment), and overlapping explanation are not repeated below.

The operations of the power reception control device, namely, the power reception control method according to the second modified example is common to the process as illustrated in FIG. 2. The operation in step S01 only differs from that illustrated in FIG. 2. In step S01, the signal reception device 21 receives the electrical signal indicating the maximum value of the total transmitted electric power (Pall_max) from the electric power facility 12, and receives the electrical signal indicating the current value of the total transmitted electric power (Pall_now) from the current measurement device 13. The signal reception device 21 calculates the differential electric power (ΔP) according to the formula (1), and transfers the electrical signal indicating the differential electric power (ΔP) to the calculation device 23. The other steps are common to those in the first embodiment, and overlapping explanations are not repeated below.

(Simulation Results)

Next, results of a simulation of the power reception control executed in accordance with the power reception control method according to the first embodiment are described below.

The conditions for the simulation in the first embodiment are first described below. As illustrated in FIG. 5A, each of the three electric vehicles (EV1, EV2, and EV3) executes the power reception control in accordance with the power reception control method according to the first embodiment. The time at which the respective electric vehicles start the electric power reception (the start time) is the same (1:00 a.m.), but the time at which the respective electric vehicles end the electric power reception (the end time) differs from each other. The end time is 7 a.m. for the electric vehicle EV1, 9 a.m. for the electric vehicle EV2, and 11 a.m. for the electric vehicle EV3. The maximum value of the electric power (the element-receiving electric power) that the power reception device 24 of the respective electric vehicles (EV1, EV2, and EV3) can receive is common to each other, which is 3 kW, and the capacity of the battery 25 (the storage battery capacity) of the respective electric vehicles (EV1, EV2, and EV3) is also common to each other, which is 24 kWh. The state of charge (SOC) of the respective electric vehicles (EV1, EV2, and EV3) at the start time of the electric power reception is also common to each other, which is 40%. The target value of the state of charge (the target SOC) of the respective electric vehicles (EV1, EV2, and EV3) is not set by the user, and is 100% (full charge) that is a default value.

Figure 5B:
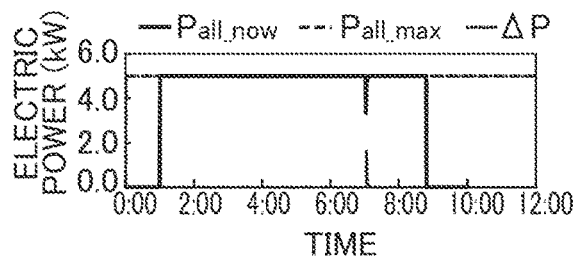
FIG. 5B is a view of plural graphs showing results of the simulation in the first embodiment, indicating the four graphs of a reference example on the left side and the four graphs of the first embodiment on the right side.
Figure 5B:
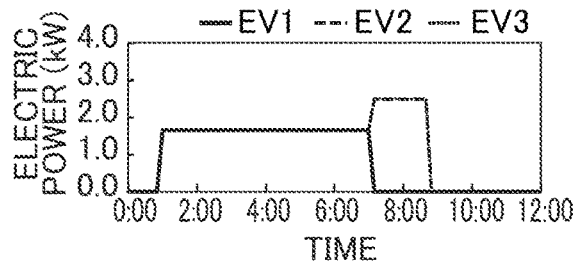
Figure 5B:
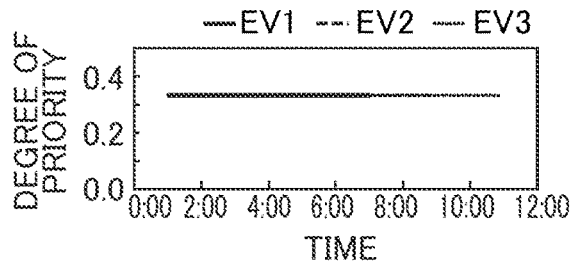
Figure 5B:
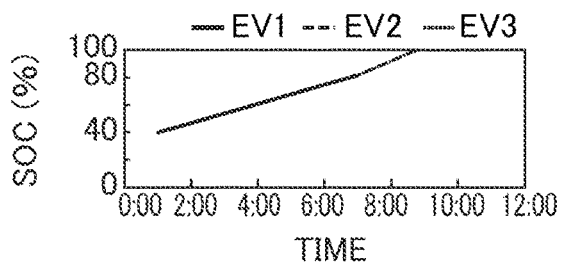
Figure 5B:
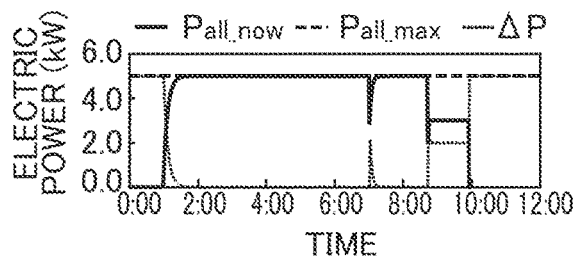
Figure 5B:
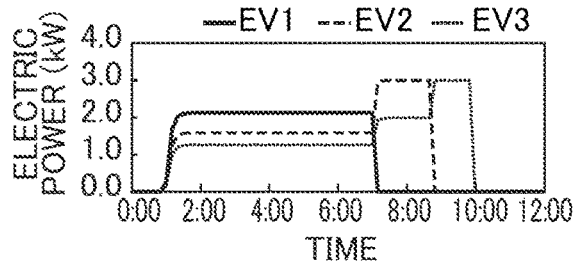
Figure 5B:
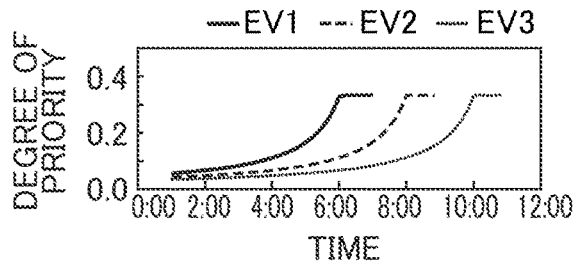
Figure 5B:
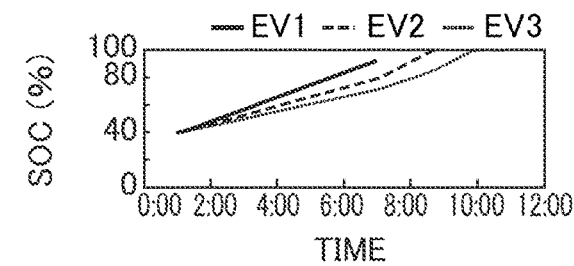

The results of the simulation are next described below. FIG. 5B illustrates eight graphs showing the results of the simulation in the first embodiment, indicating the four graphs of a reference example on the left side and the four graphs of the first embodiment on the right side. The axis of abscissas in all of the graphs indicates the time.

The axis of ordinates in the two graphs on the uppermost side indicates the current value of the total transmitted electric power (Pall_now) supplied to the entire load group 11 via the electric power facility 12, the maximum value of the total transmitted electric power (Pall_max) that is the available amount to be supplied to the entire load group 11 via the electric power facility 12, and the differential electric power ($\Delta P$) obtained by subtracting the current value (Pall_now) from the maximum value (Pall_max).

The axis of ordinates in the two graphs on the second uppermost side indicates the electric power (the element-receiving electric power) received by the respective electric vehicles (EV1, EV2, and EV3) via the electric power facility 12. The axis of ordinates in the two graphs on the second lowermost side indicates the degree of priority ($\beta$) of the respective electric vehicles (EV1, EV2, and EV3). The axis of ordinates in the two graphs on the lowermost side indicates the state of charge (SOC) of the respective electric vehicles (EV1, EV2, and EV3).

The reference example sets the degree of priority ($\beta$) of the respective electric vehicles (EV1, EV2, and EV3) to a fixed value (⅓). In particular, the total number of the electric vehicles is three, and ($T_d-T_o$) is removed from the denominator on the right side of the formula (2). Since the differential electric power ($\Delta P$) is evenly distributed by ⅓ to the respective electric vehicles (EV1, EV2, and EV3), the element-receiving electric power (Pt) calculated according to the formula (3) also equally varies in the three electric vehicles. Since the electric vehicles (EV1, EV2, and EV3) that all start the electric power reception simultaneously at 1 a.m. receive the same element-receiving electric power (Pt), the state of charge (SOC) of the three electric vehicles equally increases while having the common inclination.

The electric vehicle EV1 first ends the electric power reception at 7 a.m. (NO in step 803 in FIG. 2). The element-receiving electric power of the electric vehicle EV1 is then shifted to the differential electric power ($\Delta P$), and is redistributed to the other two electric vehicles (EV2 and EV3). The element-receiving electric power of the other two electric vehicles (EV2 and EV3) is thus increased after 7 a.m. The other two electric vehicles (EV2 and EV3) then end the electric power reception before the end time ($T_d$) of the electric power reception, since the state of charge of the two electric vehicles (EV2 and EV3) reaches the full charge (100%) (NO in step S03 in FIG. 2). The state of charge of the electric vehicle EV1 at the end time of the electric power reception (at 7 a.m.) was 82%.

In contrast, according to the first embodiment, the degree of priority ($\beta$) of the respective electric vehicles (EV1, EV2, and EV3) varies with the passage of time according to the formula (2). In particular, the degree of priority ($\beta$) is increased as the remaining time period by the end time of the electric power reception ($T=T_d-T_o$) is decreased. More particularly, the degree of priority ($\beta$) of the respective electric vehicles (EV1, EV2, and EV3) is inversely proportional to the remaining time period ($T=T_d-T_o$) by the end time ($T_d$) of the electric power reception. Since the element-receiving electric power (Pt) is increased as the remaining time period (T) is decreased, the state of charge can be increased at an early stage. The element-receiving electric power of the electric vehicle EV1 at the end time ($T_d$) of the electric power reception, which is the earliest among the three electric vehicles, was higher than that in the reference example (82%), so that the state of charge of the electric vehicle EV1 at the end time of the electric power reception (at 7 a.m.) could be increased to 93%. The other two electric vehicles (EV2 and EV3) each could reach the full charge before the end time of the electric power reception (at 9 a.m. and 11 a.m.). The simulation thus revealed that the average of the state of charge of all of the electric vehicles (EV1, EV2, and EV3) included in the load group 11 at the end time ($T_d$) could be increased, so as to decrease a variation in the state of charge accordingly.

As described above, the first embodiment can achieve the following operational effects.

Calculating the degree of priority ($\beta$) in accordance with the numerical value indicating the demand of the user of the respective electric vehicles can share the differential electric power ($\Delta P$) depending on the conditions of the respective electric vehicles. This can set the degree of priority ($\beta$) depending on the numerical value indicating the demand of the user of the respective electric vehicles that differs from each other, such as the remaining time period (T) by the end time ($T_d$) of the electric power reception. The differential electric power ($\Delta P$) thus can be shared suitably depending on the demands of the users while leveling the state of charge of the respective electric vehicles.

The numerical value indicating the demand of the user is the remaining time period (T) by the end time ($T_d$) of the electric power reception. The degree of priority ($\beta$) thus can be set depending on the remaining time period (T).

The degree of priority ($\beta$) is higher as the remaining time period (T) by the end time ($T_d$) of the electric power reception is shorter, as given by the formula (2). This can increase the state of charge of the respective electric vehicles (EV1, EV2, and EV3) at the end time of the electric power reception.

Since the degree of priority ($\beta$) can be set to be higher for the electric vehicle having the shorter remaining time period (T), a larger amount of the electric power can be allotted to the electric vehicle having the shorter remaining time period (T). The state of charge thus can be leveled for the respective electric vehicles at the time at which the electric power reception ends.

The degree of priority ($\beta$) is inversely proportional to the remaining time period (T), as given by the formula (2). This can allot a larger amount of the electric power to the electric vehicle having the shorter remaining time period (T).

Second Embodiment

A second embodiment is illustrated with a case of calculating the degree of priority ($\beta$) of the electric vehicle EV1 according to the target value of the state of charge (SOCgoal) of the battery 25 included in the electric vehicle EV1, instead of the remaining time period (T) by the end time ($T_d$) as given by the formula (2).

The target value of the state of charge (SOCgoal) of the battery 25 is another example of the numerical value indicating the demand of the user of the electric vehicle EV1.

For example, the user, when visiting a neighborhood shopping center for shopping, starts charging the battery 25 of the electric vehicle EV1 in a parking lot in the shopping center. The user thinks that the battery 25 only needs to be charged to 60% as the state of charge, since the user intends to travel only a short distance so as to go home after shopping. In this case, the target value of the state of charge (SOCgoal) of the battery 25 can be set to a relatively small amount of 60%, instead of the full charge (100%). The "demand of the user" intending to "charge the battery only to 60%" herein directly indicates the target value of the state of charge (SOCgoal) of the battery 25.

The target value of the state of charge (SOCgoal) may be a value actually set by the user via an information communication terminal such as a smartphone or a user interface mounted on the electric vehicle EV1. Alternatively, the target value of the state of charge (SOCgoal) may be estimated according to statistical data obtained through inquiries into past action histories of the user (such as setting histories of the past target values (SOCgoal)) when there is no specific instruction or setting made by the user. The target value (SOCgoal) may also be set to 100% (the full charge) when there is no specific instruction or setting made by the user.

The vehicle condition acquisition device 22 acquires the target value of the state of charge (SOCgoal) and the current value of the state of charge (SOCnow) of the battery as the numerical values indicating the demand of the user of the electric vehicle EV1. The current value of the state of charge (SOCnow) of the battery 25 is a value of the state of charge of the battery 25 measured by the vehicle condition acquisition device 22 in step S02 in the processing cycle shown in FIG. 2, for example.

The calculation device 23 calculates the degree of priority (β) of the electric vehicle EV1 based on the target value of the state of charge (SOCgoal) of the battery 25 according to the formula (4) below, instead of the formula (2).

[Math. 4]

$$SOC_{now} < SOC_{goal} \;\; \beta = \frac{1}{N}$$
$$SOC_{now} \geq SOC_{goal} \;\; \beta = \frac{1}{5N} \quad (4)$$

As given by the formula (4), the calculation device 23 compares the target value of the state of charge (SOCgoal) of the battery 25 and the current value of the state of charge (SOCnow) of the battery 25 so as to calculate the degree of priority (β).

The degree of priority (β) in the case in which the current value (SOCnow) is smaller than the target value (SOCgoal) is greater than the degree of priority (β) in the case in which the current value (SOCnow) is greater than or equal to the target value (SOCgoal). For example, when the current value (SOCnow) is smaller than the target value (SOCgoal), the degree of priority (β) is a reciprocal number of the total number (N) of the electric vehicles that receive the electric power. When the current value (SOCnow) is greater than or equal to the target value (SOCgoal), the degree of priority ($3) is a value obtained by dividing the reciprocal number of the total number (N) of the electric vehicles that receive the electric power by five. The numerical number "five" in the formula (4) is an example, and any other number that is greater than one may be used instead.

The power reception control device according to the second embodiment differs from the first embodiment in "the numerical value indicating the demand of the user of the electric vehicle EV1" used upon calculating the degree of priority (β). The other configurations are common to those in the first embodiment (FIG. 1), and overlapping explanations are not repeated below.

The operations of the power reception control device, namely, the power reception control method according to the second embodiment is common to the process as illustrated in FIG. 2. The operations in step S02 and step S04 only differ from those illustrated in FIG. 2. In step S02, the vehicle condition acquisition device 22 acquires the information indicating the target value of the state of charge (SOCgoal) and the current value. In step S04, the calculation device 23 calculates the degree of priority (β) of the electric vehicle EV1 based on the target value of the state of charge (SOCgoal) of the battery 25 according to the formula (4), instead of the formula (2). The other steps are common to those in the first embodiment, and overlapping explanations are not repeated below.

The first modified example in which the method of calculating the current value of the total transmitted electric power (Pall_now) is modified (FIG. 3) and the second modified example in which the method of calculating the differential electric power (ΔP) is modified (FIG. 4) with respect to the first embodiment, are also applicable to the power reception control device and the power reception control method according to the second embodiment.

(Simulation Results)

Next, results of a simulation of the power reception control executed in accordance with the power reception control method according to the second embodiment are described below.

The conditions for the simulation in the second embodiment are first described below. As illustrated in FIG. 6A, each of the three electric vehicles (EV1, EV2, and EV3) executes the power reception control in accordance with the power reception control method according to the second embodiment. The time at which the respective electric vehicles start the electric power reception (the start time) is the same (1:00 a.m.), and the time at which the respective electric vehicles end the electric power reception (the end time) is the same (11 a.m.). The maximum value of the electric power (the element-receiving electric power) that the power reception device 24 of the respective electric vehicles (EV1, EV2, and EV3) can receive is common to each other, which is 3 kW, and the capacity of the battery 25 (the storage battery capacity) of the respective electric vehicles (EV1, EV2, and EV3) is also common to each other, which is 24 kWh. The state of charge of the respective electric vehicles (EV1, EV2, and EV3) at the start time of the electric power reception (referred to below as a "start-time SOC") differs from each other. The start-time SOC of the electric vehicle EV1 is 10%, the start-time SOC of the electric vehicle EV2 is 40%, and the start-time SOC of the electric vehicle EV3 is 70%. The target value of the state of charge (the target SOC) of the respective electric vehicles (EV1, EV2, and EV3) (referred to below as a "target SOC") is common to each other, which is 60%.

Figure 6B:
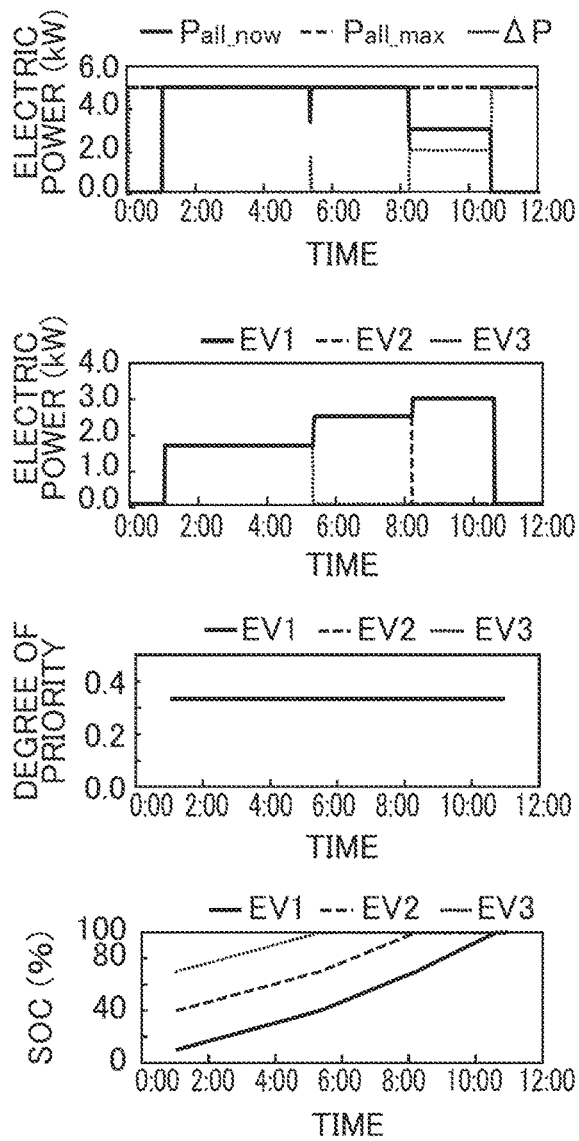
FIG. 6B is a view of plural graphs showing results of the simulation in the second embodiment, indicating the four graphs of a reference example on the left side and the four graphs of the second embodiment on the right side.
Figure 6B:
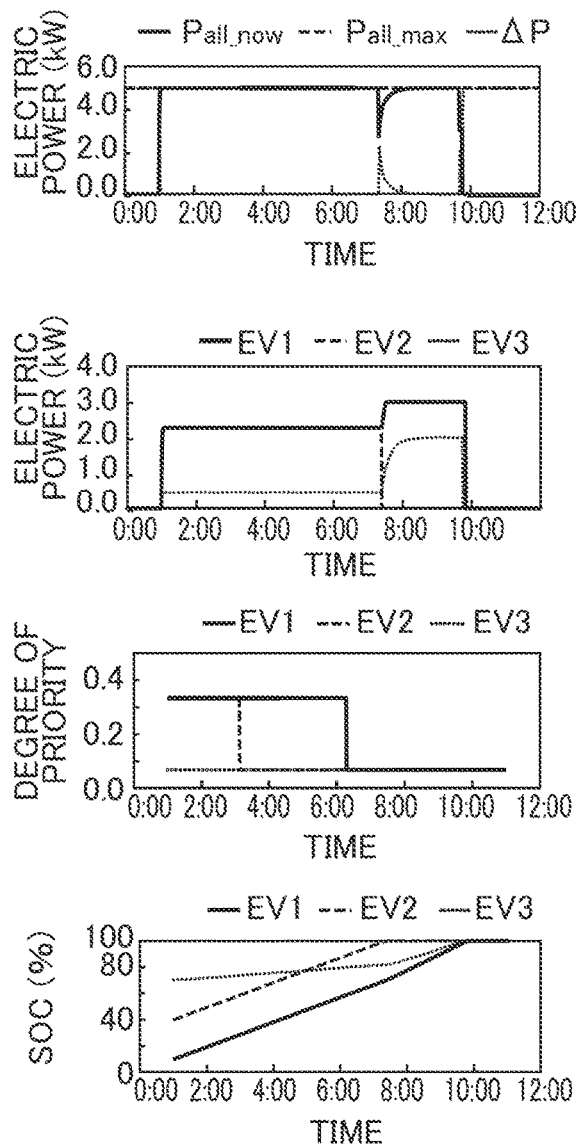

The results of the simulation are next described below. FIG. 6B illustrates eight graphs showing the results of the simulation in the second embodiment, indicating the four graphs of a reference example on the left side and the four graphs of the second embodiment on the right side. The items of the numerical values indicated in the axis of ordinates and the axis of abscissas in the respective graphs are the same as those in the respective graphs shown in FIG. 5B, and overlapping explanations are not repeated below.

The reference example sets the degree of priority (β) of the respective electric vehicles (EV1, EV2, and EV3) to a fixed value (⅓) based on the total number (N) of the electric vehicles which is three. This value is the same as the degree of priority (β) when the current value of the state of charge (SOCnow) is smaller than the target value of the state of charge (SOCgoal) as given by the formula (4). Since the differential electric power (ΔP) is evenly distributed by ⅓ to the respective electric vehicles (EV1, EV2, and EV3), the element-receiving electric power (Pt) calculated according to the formula (3) also equally varies in the three electric vehicles. The electric vehicles (EV1, EV2, and EV3) that all start the electric power reception simultaneously at 1 a.m. thus receive the same element-receiving electric power (Pt). The state of charge (SOC) of the three electric vehicles equally increases while having the common inclination, although the start-time SOC of the respective electric vehicles (EV1, EV2, and EV3) differs from each other.

The electric vehicle EV3, which has the highest start-time SOC, ends the electric power reception after 5 a.m. since the battery is fully charged (NO in step S03 in FIG. 2). The element-receiving electric power of the electric vehicle EV3 is then shifted to the differential electric power ($\Delta P$), and is redistributed to the other two electric vehicles (EV1 and EV2). The element-receiving electric power of the other two electric vehicles (EV1 and EV2) is thus increased after 5 a.m.

The electric vehicle EV2, which has the second highest start-time SOC, ends the electric power reception after 8 a.m. since the battery is fully charged (NO in step S03 in FIG. 2). The element-receiving electric power of the electric vehicle EV2 is then shifted to the differential electric power ($\Delta P$), and is redistributed to the remaining electric vehicle (EV1). The element-receiving electric power of the electric vehicle (EV1) is increased after 8 a.m., but does not exceed the electric power capacity (3 kW) of the power reception device 24 of the electric vehicle (EV1).

The electric vehicle EV1, which has the lowest start-time SOC, then ends the electric power reception after 10 a.m. since the battery is fully charged (NO in step S03 in FIG. 2).

According to the second embodiment, the degree of priority ($\beta$) of the respective electric vehicles (EV1, EV2, and EV3) is calculated according to the formula (4). In particular, the electric vehicle EV3 does not need to receive a large amount of the electric power since the start-time SOC of the electric vehicle EV3 is already greater than or equal to the target SOC. The degree of priority ($\beta$) of the electric vehicle EV3 is thus $\frac{1}{15}$ at the start time of the electric power reception. The start-time SOC of the other two electric vehicles (EV1 and EV2) is lower than the target SOC of the electric vehicle EV3. The degree of priority ($\beta$) of the other two electric vehicles (EV1 and EV2) is $\frac{1}{3}$. The differential electric power ($\Delta P$) is thus distributed to the other two electric vehicles (EV1 and EV2) more than the electric vehicle EV3. Namely, since the element-receiving electric power of the electric vehicle EV3 is smaller than the element-receiving electric power of the other two electric vehicles (EV1 and EV2), the rate of increase for the electric vehicle EV3 is smaller than the rate of increase for the other two electric vehicles (EV1 and EV2).

The current value of the state of charge (SOCnow) of the electric vehicle EV2 reaches the target SOC of the electric vehicle EV2 around 3 a.m., and the degree of priority ($\beta$) of the electric vehicle EV2 is then decreased from $\frac{1}{3}$ to $\frac{1}{15}$ according to the formula (4). The differential electric power ($\Delta P$) is zero at this time, and the element-receiving electric power of the electric vehicle EV2 does not change.

The current value of the state of charge (SOCnow) of the electric vehicle EV1 reaches the target SOC of the electric vehicle EV1 after 6 a.m., and the degree of priority ($\beta$) of the electric vehicle EV1 is then decreased from $\frac{1}{3}$ to $\frac{1}{15}$ according to the formula (4). The differential electric power ($\Delta P$) is zero at this time, and the element-receiving electric power of the electric vehicle EV1 does not change.

The electric vehicle EV2 ends the electric power reception after 7 a.m. since the battery is fully charged (NO in step S03 in FIG. 2). The element-receiving electric power of the electric vehicle EV2 is then shifted to the differential electric power ($\Delta P$), and is redistributed to the other two electric vehicles (EV1 and EV3). The element-receiving electric power of the other electric vehicles (EV1 and EV3) is thus increased after 7 a.m.

The other two electric vehicles (EV1 and EV3) then end the electric power reception before 10 a.m. since the respective batteries are fully charged (NO in step S03 in FIG. 2).

According to the second embodiment, the electric vehicle having the current value (SOCnow) smaller than the target SOC receives the electric power prior to the electric vehicle having the current value (SOCnow) greater than or equal to the target SOC. The simulation revealed that the time at which the state of charge of the respective electric vehicles reaches the full charge could conform to each other, as compared with the reference example. In other words, a variation in the timing of ending the electric power reception in the respective electric vehicles could be decreased. The second embodiment thus could suitably share the differential electric power ($\Delta P$) depending on the demands of the users while leveling the state of charge of the respective electric vehicles.

As described above, the second embodiment can achieve the following operational effects.

The second embodiment can simultaneously employ a method of dealing with no change in the speed of charge (the element-receiving electric power) because of the differential electric power ($\Delta P$) which is zero although the degree of priority ($\beta$) changes, more particularly, a method of intentionally sending a signal with a great volume at a time to stop the electric power reception of the electric vehicle EV1, and then restarting sending the signal indicating the differential electric power ($\Delta P$), for example. The use of this method can reduce the speed of charge (the element-receiving electric power) of the electric vehicle having the current value (SOCnow) greater than or equal to the target SOC so as to further increase the speed of charge (the element-receiving electric power) of the electric vehicle having the current value (SOCnow) smaller than the target SOC.

The "numerical value indicating the demand of the user" in the second embodiment is illustrated above with the target value of the state of charge (SOCgoal) of the power storage element. This can suitably share the differential electric power ($\Delta P$) depending on the demand of the user (the target value of the state of charge) while leveling the state of charge of the respective electric vehicles.

The calculation device 23 compares the target value of the state of charge (SOCgoal) of the battery 25 and the current value of the state of charge (SOCnow) of the battery 25 so as to calculate the degree of priority ($\beta$). This can suitably calculate the degree of priority ($\beta$) depending on the demand of the user (the target value of the state of charge).

The degree of priority ($\beta$) in the case in which the current value (SOCnow) is smaller than the target value (SOCgoal) is greater than the degree of priority ($\beta$) in the case in which the current value (SOCnow) is greater than or equal to the target value (SOCgoal). This can charge the electric vehicle having the current value (SOCnow) smaller than the target SOC prior to the electric vehicle having the current value (SOCnow) greater than or equal to the target SOC.

Third Embodiment

A third embodiment is illustrated with a case in which the degree of priority ($\beta$) of the electric vehicle EV1 is calculated according to both the remaining time period (T) from the current time ($T_o$) to the end time ($T_d$) of the electric power reception and the target value of the state of charge (SOCgoal) of the battery 25.

The calculation device 23 calculates the degree of priority (β) of the electric vehicle EV1 based on the remaining time period (T) by the end time ($T_d$) of the electric power reception and the target value of the state of charge (SOCgoal) of the battery 25 according to the formula (5) below, instead of the formula (2) or (4).

[Math. 5]

$$\beta = \frac{SOC_{goal} - SOC_{now}}{N \times (T_d - T_0)} \quad (5)$$

As given by the formula (5), the degree of priority (β) is inversely proportional to the remaining time period (T). The "remaining time period (T)" is the period from the current time ($T_o$) to the end time ($T_d$) of the electric power reception. The degree of priority (β) is higher as the remaining time period (T) is shorter. The application of the formula (5) is an example, and the degree of priority (β) may be inversely proportional to "the remaining time period (T) to the power of g" obtained by multiplying the remaining time period (T) 'g' times (g is a positive integer of two or greater).

As given by the formula (5), the calculation device 23 subtracts the current value of the state of charge (SOCnow) of the battery 25 from the target value of the state of charge (SOCgoal) of the battery 25 so as to obtain an uncharged state (ASOC). The degree of priority (β) is proportional to the uncharged state (ASOC). The degree of priority (β) may be proportional to the uncharged state (ASOC) to the power of g. The current value of the state of charge (SOCnow) of the battery 25 is a value of the state of charge measured in step S02 in each processing cycle, for example.

The degree of priority (β) is calculated in accordance with the uncharged state (ASOC) obtained by subtracting the measurement value of the current state of charge (SOCnow) measured for the electric vehicle EV1 from the target value of the state of charge (SOCgoal). The degree of priority (β) is increased as the uncharged state (ASOC) is increased. The differential electric power (ΔP) thus can be distributed to the electric vehicle having the greater uncharged state (ASOC) prior to the other electric vehicles. This can suitably share the differential electric power (ΔP) depending on the demand of the user (the target value of the state of charge) while leveling the state of charge of the respective electric vehicles.

The calculation device 23 may calculate the degree of priority (β) of the electric vehicle EV1 based on the remaining time period (T) by the end time ($T_d$) of the electric power reception and the target value of the state of charge (SOCgoal) of the battery 25 according to the formula (6) below, instead of the formula (5). The formula (6) corresponds to a formula combining the formula (2) and the formula (4).

[Math. 6]

$$SOC_{now} < SOC_{goal} \quad \beta = \frac{1}{N \times (T_d - T_0)} \quad (6)$$

$$SOC_{now} \geq SOC_{goal} \quad \beta = \frac{1}{5N \times (T_d - T_0)}$$

The degree of priority (β) in the case in which the current value (SOCnow) is smaller than the target value (SOCgoal) is greater than the degree of priority (β) in the case in which the current value (SOCnow) is greater than or equal to the target value (SOCgoal). For example, when the current value (SOCnow) is smaller than the target value (SOCgoal), the degree of priority (β) is a reciprocal number of the total number (N) of the electric vehicles that receive the electric power. When the current value (SOCnow) is greater than or equal to the target value (SOCgoal), the degree of priority (β) is a value obtained by dividing the reciprocal number of the total number (N) of the electric vehicles that receive the electric power by five. The numerical number "five" in the denominator on the right side of the formula (6) for calculating "β" is an example, and any other number that is greater than one may be used instead.

The power reception control device according to the third embodiment differs from the first embodiment and the second embodiment in "the numerical value indicating the demand of the user of the electric vehicle EV1" used upon calculating the degree of priority (β). The other configurations are common to those in the first embodiment (FIG. 1), and overlapping explanations are not repeated below.

The operations of the power reception control device, namely, the power reception control method according to the third embodiment is common to the process as illustrated in FIG. 2. The operations in step S02 and step S04 only differ from those illustrated in FIG. 2. In step S02, the vehicle condition acquisition device 22 acquires the information indicating the end time ($T_d$) of the electric power reception, the target value of the state of charge (SOCgoal), and the current value of the state of charge (SOCnow), and calculates the remaining time period (T) by the end time ($T_d$) of the electric power reception. In step S04, the calculation device 23 calculates the degree of priority (β) of the electric vehicle EV1 based on the remaining time period (T) by the end time ($T_d$) and the target value of the state of charge (SOCgoal) of the battery 25 according to the formula (5) or the formula (6), instead of the formula (2). The other steps are common to those in the first embodiment, and overlapping explanations are not repeated below.

The first modified example in which the method of calculating the current value of the total transmitted electric power (Pall_now) is modified (FIG. 3) and the second modified example in which the method of calculating the differential electric power (ΔP) is modified (FIG. 4) with respect to the first embodiment, are also applicable to the power reception control device and the power reception control method according to the third embodiment.

(First Simulation Results)

Next, results of first to third simulations of the power reception control executed in accordance with the power reception control method according to the third embodiment are described below. The first to third simulations have calculated the degree of priority (β) of the electric vehicle EV1 according to the formula (5).

The conditions for the first simulation are first described below. As illustrated in FIG. 7A, each of the three electric vehicles (EV1, EV2, and EV3) executes the power reception control in accordance with the power reception control method according to the third embodiment. The time at which the respective electric vehicles start the electric power reception (the start time) is the same (1:00 a.m.), and the time at which the respective electric vehicles end the electric power reception (the end time) is the same (11 a.m.). The maximum value of the electric power (the element-receiving electric power) that the power reception device 24 of the respective electric vehicles (EV1, EV2, and EV3) can receive is common to each other, which is 3 kW, and the capacity of the battery (the storage battery capacity) of the respective electric vehicles (EV1, EV2, and EV3) is also common to each other, which is 24 kWh. The state of charge of the respective electric vehicles (EV1, EV2, and EV3) at the start time of the electric power reception (the start-time SOC) differs from each other. The start-time SOC of the electric vehicle EV1 is 60%, the start-time SOC of the electric vehicle EV2 is 40%, and the start-time SOC of the electric vehicle EV3 is 20%. The target value of the state of charge (the target SOC) of the respective electric vehicles (EV, EV2, and EV3) is not set by the user, and is 100% (full charge) that is a default value.

Figure 7B:
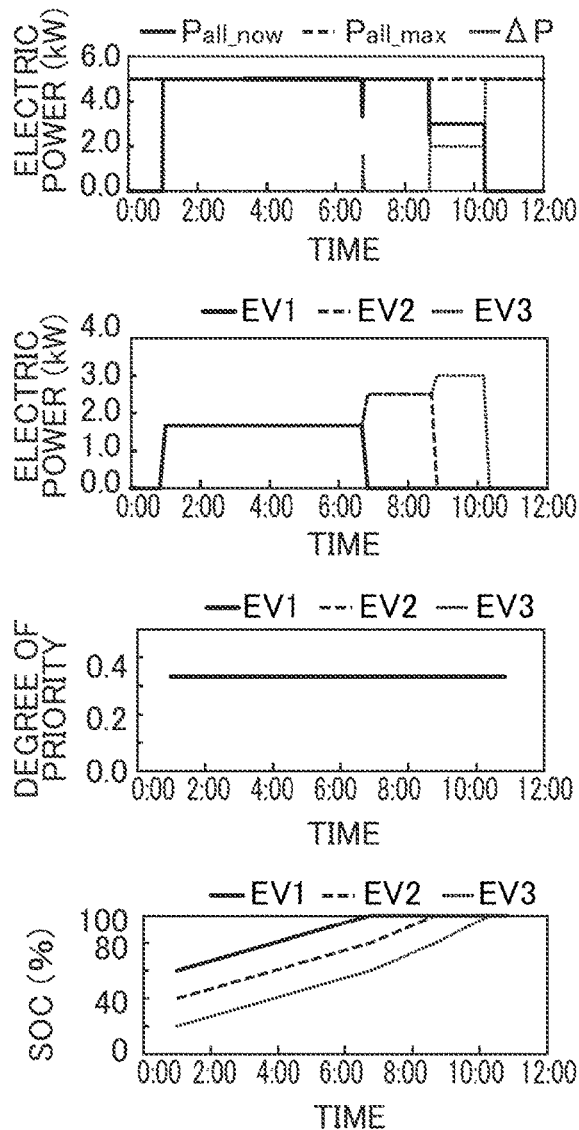
FIG. 7B is a view of plural graphs showing results of the first simulation in the third embodiment, indicating the four graphs of a reference example on the left side and the four graphs of the third embodiment on the right side.
Figure 7B:
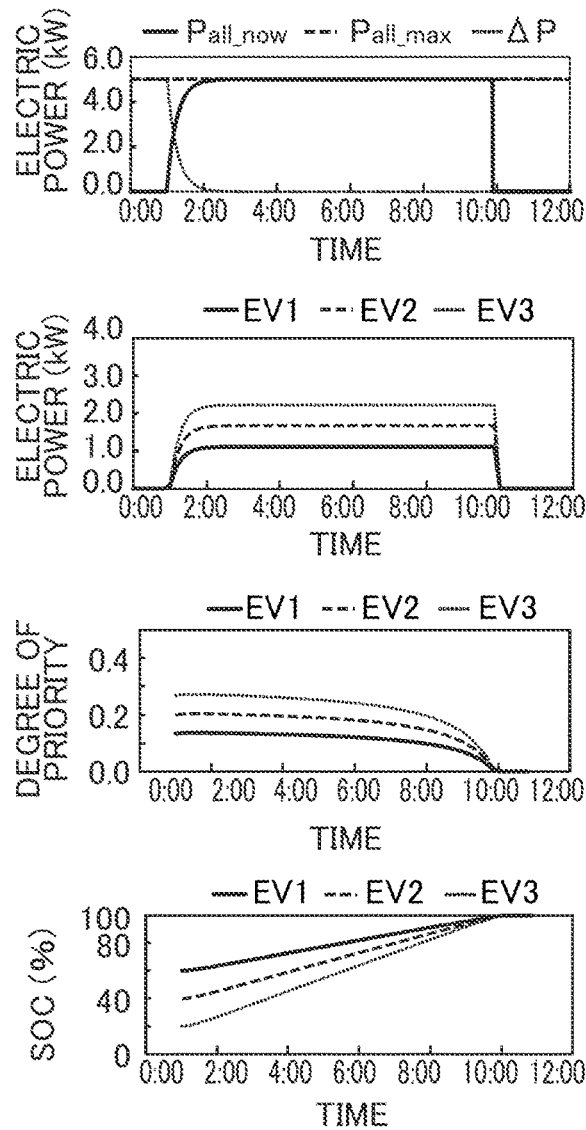

The results of the first simulation are next described below. FIG. 7B illustrates eight graphs showing the results of the first simulation, indicating the four graphs of a reference example on the left side and the four graphs of the third embodiment on the right side. The items of the numerical values indicated in the axis of ordinates and the axis of abscissas in the respective graphs are the same as those in the respective graphs shown in FIG. 5B, and overlapping explanations are not repeated below.

The reference example shown in FIG. 7B differs from the reference example shown in FIG. 6B in the start-time SOC of the respective electric vehicles, but the other conditions including the method of calculating the degree of priority are common to those in the reference example shown in FIG. 6B, so as to obtain the similar simulation results.

The reference example sets the degree of priority ($\beta$) of the respective electric vehicles (EV1, EV2, and EV3) to a fixed value (⅓) based on the total number (N) of the electric vehicles which is three. Since the differential electric power ($\Delta P$) is evenly distributed by ⅓ to the respective electric vehicles (EV1, EV2, and EV3), the element-receiving electric power (Pt) calculated according to the formula (3) also equally varies in the three electric vehicles. The electric vehicles (EV1, EV2, and EV3) that all start the electric power reception simultaneously at 1 a.m. thus receive the same element-receiving electric power (Pt). The state of charge (SOC) of the three electric vehicles equally increases while having the common inclination, although the start-time SOC of the respective electric vehicles (EV1, EV2, and EV3) differs from each other.

The electric vehicle EV1, which has the highest start-time SOC, ends the electric power reception after 6 a.m. since the battery is fully charged (NO in step S03 in FIG. 2). The element-receiving electric power of the electric vehicle EV1 is then shifted to the differential electric power ($\Delta P$), and is redistributed to the other two electric vehicles (EV2 and EV3). The element-receiving electric power of the other electric vehicles (EV2 and EV3) is thus increased after 6 a.m.

The electric vehicle EV2, which has the second highest start-time SOC, ends the electric power reception after 8 a.m. since the battery is fully charged (NO in step S03 in FIG. 2). The element-receiving electric power of the electric vehicle EV2 is then shifted to the differential electric power ($\Delta P$), and is redistributed to the remaining electric vehicle (EV3). The element-receiving electric power of the electric vehicle (EV3) is increased after 8 a.m., but does not exceed the electric power capacity (3 kW) of the power reception device 24 of the electric vehicle (EV3).

The electric vehicle EV3, which has the lowest start-time SOC, then ends the electric power reception after 10 a.m. since the battery is fully charged (NO in step S03 in FIG. 2).

In contrast, according to the third embodiment as shown in FIG. 7B, the degree of priority ($\beta$) of the respective electric vehicles (EV1, EV2, and EV3) varies with the passage of time according to the formula (5). In particular, the degree of priority ($\beta$) is higher as the remaining time period ($T=T_d-T_o$) by the end time of the electric power period (at 11 a.m.) is shorter. The degree of priority ($\beta$) is decreased as the current value of the state of charge (SOCnow) approaches the target value (SOCgoal), since the uncharged state (ASOC) is decreased.

Since the current value of the state of charge (SOCnow) of the respective electric vehicles (EV1, EV2, and EV3) reaches the target SOC (100%) before 11 a.m., the numerator (the uncharged state) results in zero earlier than the denominator (the remaining time period T) in the formula (5). The degree of priority ($\beta$) of the respective electric vehicles (EV1, EV2, and EV3) is thus determined in accordance with the difference between the target SOC and the start-time SOC. In other words, since the differential electric power ($\Delta P$) can be allotted to the electric vehicle having the lower start-time SOC prior to the other electric vehicles, the element-receiving electric power (Pt) of the electric vehicle having the lower start-time SOC is increased so as to increase the speed of charge. A variation in the time at which the electric power reception ends (the time at which the SOC reaches 100%) in the respective electric vehicles (EV1, EV2, and EV3) thus can be decreased accordingly.

(Second Simulation Results)

The conditions for the second simulation are first described below. As illustrated in FIG. 8A, the respective parameters for the three electric vehicles (EV1, EV2, and EV3) are the same as in the simulation conditions as illustrated in FIG. 5A, and overlapping explanations are not repeated below.

Figure 8B:
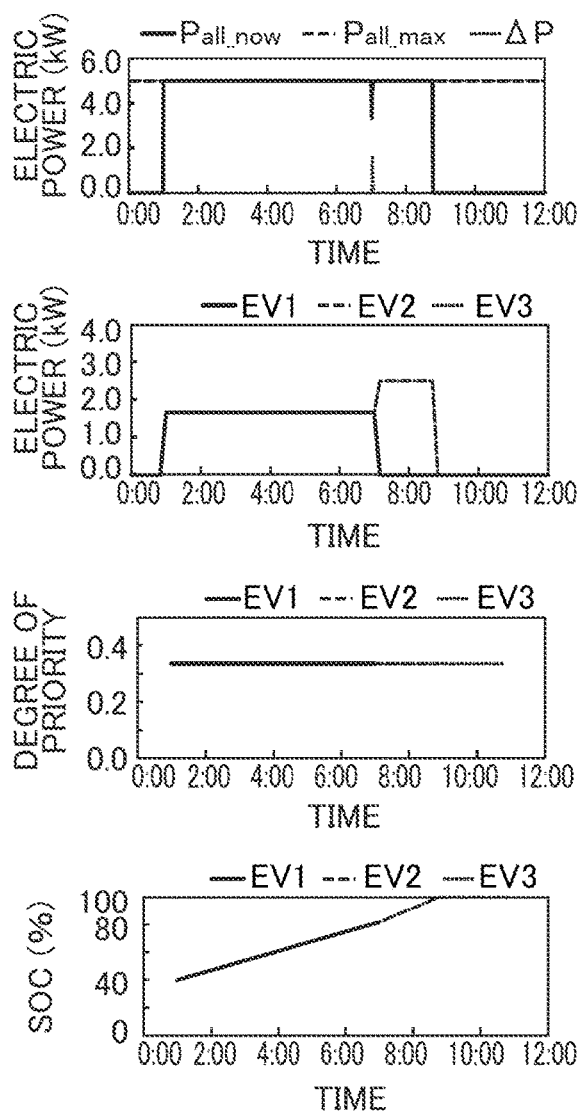
FIG. 8B is a view of plural graphs showing results of the second simulation in the third embodiment, indicating the four graphs of a reference example on the left side and the four graphs of the third embodiment on the right side.
Figure 8B:
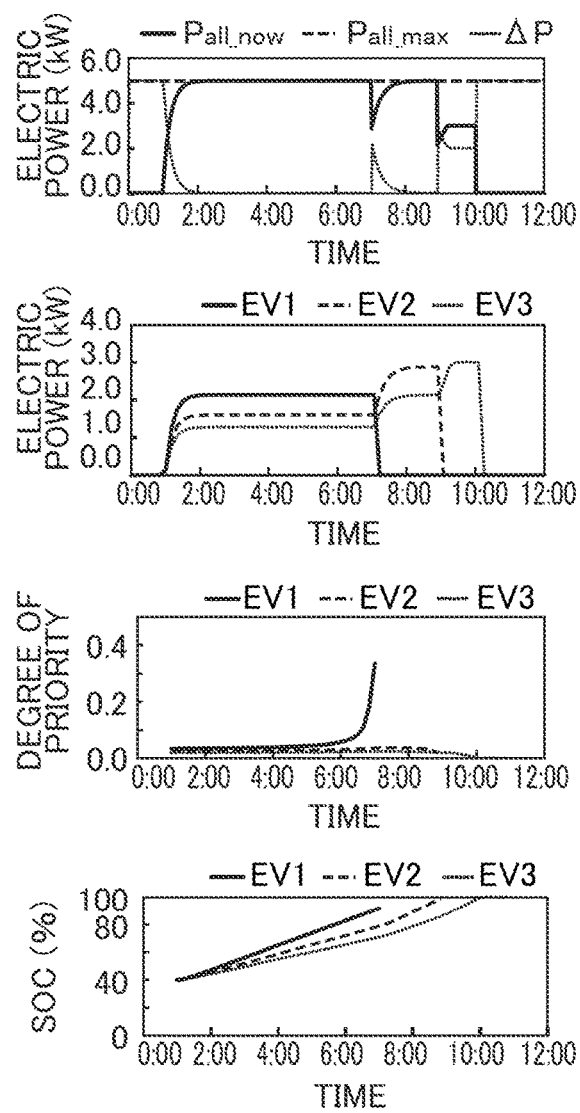

The results of the second simulation are next described below. FIG. 8B illustrates eight graphs showing the results of the second simulation, indicating the four graphs of a reference example on the left side and the four graphs of the third embodiment on the right side. The items of the numerical values indicated in the axis of ordinates and the axis of abscissas in the respective graphs are the same as those in the respective graphs shown in FIG. 5B, and overlapping explanations are not repeated below.

The simulation conditions for the reference example illustrated in FIG. 8A are common to the simulation conditions for the reference example illustrated in FIG. 5A. The simulation results of the reference example illustrated in FIG. 8B are also common to the simulation results of the reference example illustrated in FIG. 5B. The overlapping explanations are thus not repeated below.

According to the third embodiment as shown in FIG. 8B, since the start time of the electric power reception of the respective electric vehicles (EV1, EV2, and EV3) is the same but the end time of the electric power reception differs from each other, the remaining time period ($T=T_d-T_o$) differs from each other. The uncharged state (ASOC) at the start time of the electric power reception (at 1 a.m.) is equivalent to each other. A difference in the degree of priority ($\beta$) mainly depending on the difference in the remaining time period (T) is thus caused between the respective electric vehicles (EV1, EV2, and EV3) at the start time of the electric power reception (at 1 a.m.), as given by the formula (5). In particular, the electric vehicle EV1 having the shortest remaining time period (T) has the highest degree of priority, and the electric vehicle EV3 having the longest remaining time period (T) has the lowest degree of priority. A difference in the rate of increase in the element-receiving electric power (Pt) and the state of charge (SOC) is caused between the respective electric vehicles (EV1, EV2, and EV3) depending on the difference in the degree of priority (β). The differential electric power (ΔP) thus can be allotted to the electric vehicle EV1 having the shortest remaining time period (T) so as to be charged prior to the other electric vehicles (EV2 and EV3).

Since the remaining time period (T) of the electric vehicle EV1 approaches zero as the time approaches 7 a.m., the degree of priority (β) of the electric vehicle EV1 is rapidly increased, and the charge of the electric vehicle EV1 ends at 7 a.m. (NO in step S03 in FIG. 2).

The electric vehicle EV2 ends the electric power reception after 8 a.m. since the battery is fully charged (NO in step S03 in FIG. 2). The electric vehicle EV3 ends the electric power reception around 10 a.m. since the battery is fully charged (NO in step S03 in FIG. 2).

In the reference example shown in FIG. 8B, the state of charge of the electric vehicle EV1 at the end time of the electric power reception (at 7 a.m.) resulted in 82%. The simulation revealed that the embodiment shown in FIG. 8B could increase the state of charge of the electric vehicle EV1 at the end time of the electric power reception (at 7 a.m.) to about 90%.

With regard to the comparison of the end time of the electric power reception of the electric vehicle EV3, the embodiment shown in FIG. 8B is later than the reference example shown in FIG. 8B. However, the electric vehicle EV3 could be fully charged by the leaving time. The embodiment thus can avoid a variation in the final state of charge of the respective electric vehicles (EV1, EV2, and EV3) in the load group 11 to level the state of charge while satisfying the demand of the user of the electric vehicle EV3 (the leaving time).

(Third Simulation Results)

The conditions for the third simulation are first described below. As illustrated in FIG. 9A, each of the three electric vehicles (EV1, EV2, and EV3) executes the power reception control in accordance with the power reception control method according to the third embodiment. The time at which the respective electric vehicles start the electric power reception (the start time) is the same (1:00 a.m.), but the time at which the respective electric vehicles end the electric power reception (the end time) differs from each other. The end time is 7 a.m. for the electric vehicle EV1, 9 a.m. for the electric vehicle EV2, and 11 a.m. for the electric vehicle EV3. The maximum value of the electric power (the element-receiving electric power) that the power reception device 24 of the respective electric vehicles (EV1, EV2, and EV3) can receive is common to each other, which is 3 kW, and the capacity of the battery 25 (the storage battery capacity) of the respective electric vehicles (EV1, EV2, and EV3) is also common to each other, which is 24 kWh. The state of charge of the respective electric vehicles (EV1, EV2, and EV3) at the start time of the electric power reception (the start-time SOC) differs from each other. The start-time SOC of the electric vehicle EV1 is 20%, the start-time SOC of the electric vehicle EV2 is 40%, and the start-time SOC of the electric vehicle EV3 is 60%. The target value of the state of charge (the target SOC) of the respective electric vehicles (EV1, EV2, and EV3) is not set by the user, and is 100% (full charge) that is a default value.

Figure 9B:
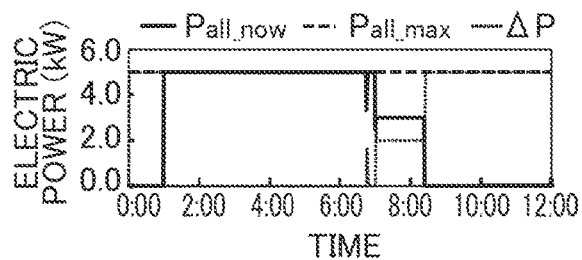
FIG. 9B is a view of plural graphs showing results of the third simulation in the third embodiment, indicating the four graphs of a reference example on the left side and the four graphs of the third embodiment on the right side.
Figure 9B:
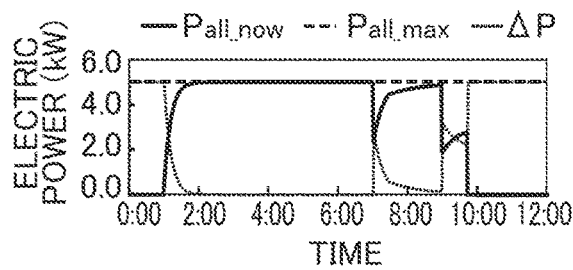
Figure 9B:
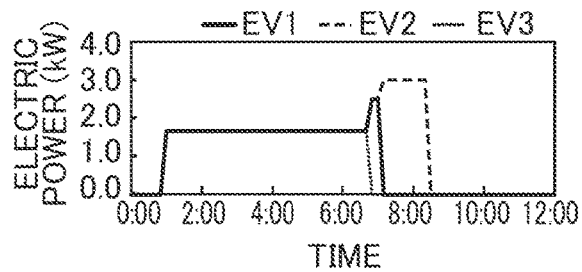
Figure 9B:
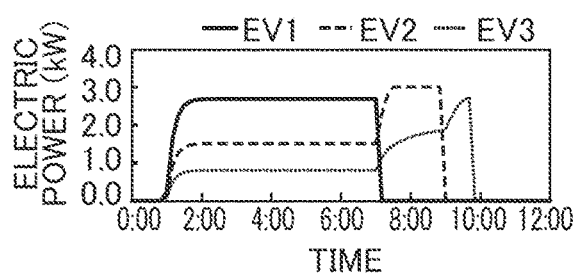
Figure 9B:
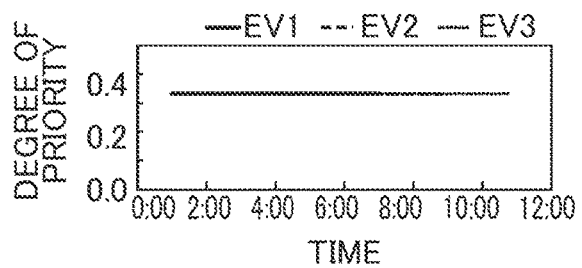
Figure 9B:
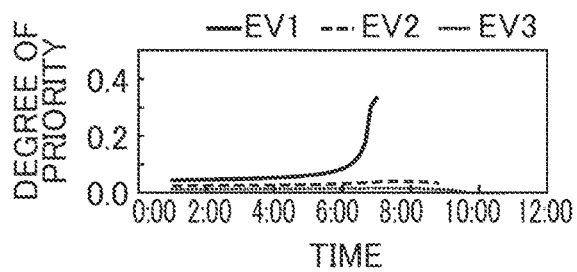
Figure 9B:
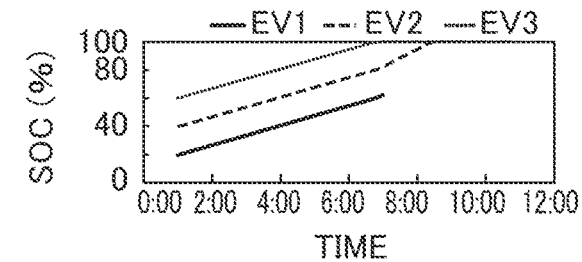
Figure 9B:
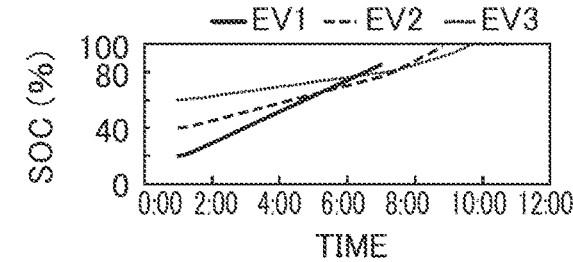

The results of the third simulation are next described below. FIG. 9B illustrates eight graphs showing the results of the third simulation, indicating the four graphs of a reference example on the left side and the four graphs of the third embodiment on the right side. The items of the numerical values indicated in the axis of ordinates and the axis of abscissas in the respective graphs are the same as those in the respective graphs shown in FIG. 5B, and overlapping explanations are not repeated below.

The reference example illustrated in FIG. 9B sets the degree of priority (β) of the respective electric vehicles (EV1, EV2, and EV3) to a fixed value (⅓) based on the total number (N) of the electric vehicles which is three. Since the differential electric power (ΔP) is evenly distributed by ⅓ to the respective electric vehicles (EV1, EV2, and EV3), the element-receiving electric power (Pt) calculated according to the formula (3) also equally varies in the three electric vehicles. The electric vehicles (EV1, EV2, and EV3) that all start the electric power reception simultaneously at 1 a.m. thus receive the same element-receiving electric power (Pt). The state of charge (SOC) of the three electric vehicles equally increases while having the common inclination, although the start-time SOC of the respective vehicles (EV1, EV2, and EV3) differs from each other.

The electric vehicle EV3, which has the highest start-time SOC, ends the electric power reception after 6 a.m. since the battery is fully charged (NO in step S03 in FIG. 2). The element-receiving electric power of the electric vehicle EV3 is then shifted to the differential electric power (ΔP), and is redistributed to the other two electric vehicles (EV1 and EV2). The element-receiving electric power of the other electric vehicles (EV1 and EV2) is thus increased after 6 a.m.

The electric vehicle EV1 then ends the electric power reception at 7 a.m. since the time reaches the leaving time (NO in step S03 in FIG. 2). The element-receiving electric power of the electric vehicle EV1 is then shifted to the differential electric power (ΔP), and is redistributed to the remaining electric vehicle EV2. The element-receiving electric power of the electric vehicle EV2 is increased after 7 a.m., but does not exceed the electric power capacity (3 kW) of the power reception device 24 of the electric vehicle EV2.

The electric vehicle EV2 then ends the electric power reception after 8 a.m. since the battery is fully charged (NO in step S03 in FIG. 2). The state of charge of the electric vehicle EV1 at the time at which the electric power reception ended was about 50%.

According to the third embodiment as shown in FIG. 9B, since the start time of the electric power reception of the respective electric vehicles (EV1, EV2, and EV3) is the same but the end time of the electric power reception differs from each other, the remaining time period ($T=T_d-T_o$) differs from each other. The uncharged state (ASOC) at the start time of the electric power reception (at 1 a.m.) also differs from each other. In particular, the remaining time period (T) is shorter in the order of the electric vehicle EV1, the electric vehicle EV2, and the electric vehicle EV3, and the uncharged state (ASOC) is greater in the order of the electric vehicle EV1, the electric vehicle EV2, and the electric vehicle EV3.

Since the denominator in the formula (5) is smaller in the order of the electric vehicle EV1, the electric vehicle EV2, and the electric vehicle EV3, and the numerator is greater in the order of the electric vehicle EV1, the electric vehicle EV2, and the electric vehicle EV3, the degree of priority (β) calculated according to the formula (5) is greater also in the order of the electric vehicle EV1, the electric vehicle EV2, and the electric vehicle EV3. In the third embodiment as illustrated in FIG. 9B, the rate of increase in each of the element-receiving electric power (Pt) and the state of charge (SOC) is thus greater in the order of the electric vehicle EV1, the electric vehicle EV2, and the electric vehicle EV3.

The simulation revealed that the difference in the start-time SOC of the respective electric vehicles (EV1, EV2, and EV3) was decreased with the passage of charging time, so as to avoid a variation in the state of charge to level the state of charge. This could increase the state of charge of the electric vehicle EV1 having the smallest start-time SOC at the start time from about 50% to near 90%. The third embodiment thus could suitably share the differential electric power ($\Delta P$) depending on the demands of the users (the leaving time) while leveling the state of charge of the respective electric vehicles.

With regard to the comparison of the end time of the electric power reception of the two electric vehicles (EV2 and EV3), the embodiment shown in FIG. 9B is later than the reference example shown in FIG. 9B. However, the respective electric vehicles (EV2 and EV3) could be fully charged by the leaving time. The embodiment thus can avoid a variation in the final state of charge of the respective electric vehicles (EV1, EV2, and EV3) in the load group 11 to level the state of charge while satisfying the demand of the user of the electric vehicle EV1 (the leaving time).

Fourth Embodiment

A fourth embodiment is illustrated with a case in which the degree of priority ($\beta$) of the electric vehicle EV1 is calculated according to a format that the user has contracted regarding the electric power reception for the electric vehicle EV1.

The user sometimes can make a choice among several types of format to be contracted regarding the electric power reception for the electric vehicle EV1. For example, the user can choose a desirable grade (a contract format) from plural grades such as the first grade, the second grade, the third grade, . . . , regarding the level of the degree of priority ($\beta$). The user makes a contract regarding the electric power reception for the electric vehicle EV1 with a counterparty to which the user pays the charges for the use of the electric power supplied via the electric power facility 12. The counterparty to which the user pays the charges is an organization or a system that manages and operates the infrastructure regarding the electric power supply, for example.

The phrase "format that the user has contracted regarding the electric power reception for the electric vehicle EV1 (referred to below as an "electric-power contract format")" is not limited to a direct contract regarding the level of the degree of priority ($\beta$). The electric-power contract format may be a format regarding a grade of inclusive electric power supply service. In such a case, the level of the degree of priority ($\beta$) is preliminarily determined depending on the difference in the grade of the inclusive electric power supply service, for example.

The calculation device 23 calculates the degree of priority ($\beta$) of the electric vehicle EV1 based on a numerical value defined according to the electric-power contract format. The numerical value defined according to the electric-power contract format is a correction coefficient preliminarily determined depending on the electric-power contract format, for example. Several adjustment coefficients (1, $\frac{4}{5}$, $\frac{3}{5}$, . . . ) are allotted to the respective electric-power contract formats (the first grade, the second grade, the third grade, . . . ). The calculation device 23 multiplies a default value of the degree of priority (for example, 1/N) by the corresponding adjustment coefficient determined depending on the electric-power contract format so as to calculate the degree of priority ($\beta$) of the electric vehicle EV1. The sign "N" indicates the total number of the electric vehicles that receive the electric power in the load group 11. Electrical data on the electric-power contract format and the respective adjustment coefficients determined depending on the electric-power contract format is preliminarily stored in a memory in the calculation device 23 (such as a register, a buffer memory, a cache memory, ROM, and RAM in a CPU).

The power reception control device according to the fourth embodiment differs from the first embodiment to the third embodiment in "the numerical value indicating the demand of the user of the electric vehicle EVE" used upon calculating the degree of priority ($\beta$). The other configurations are common to those in the first embodiment (FIG. 1), and overlapping explanations are not repeated below.

The operations of the power reception control device, namely, the power reception control method according to the fourth embodiment is common to the process as illustrated in FIG. 2. The operations in step S02 and step S04 only differ from those illustrated in FIG. 2. In step S02, the vehicle condition acquisition device 22 acquires the information indicating the electric-power contract format. In step S04, the calculation device 23 calculates the degree of priority ($\beta$) of the electric vehicle EV1 based on the numerical value defined according to the electric-power contract format (such as the correction coefficient). The other steps are common to those in the first embodiment, and overlapping explanations are not repeated below.

The first modified example in which the method of calculating the current value of the total transmitted electric power (Pall_now) is modified (FIG. 3) and the second modified example in which the method of calculating the differential electric power ($\Delta P$) is modified (FIG. 4) with respect to the first embodiment, are also applicable to the power reception control device and the power reception control method according to the fourth embodiment.

(Simulation Results)

Next, results of a simulation of the power reception control executed in accordance with the power reception control method according to the fourth embodiment are described below.

The conditions for the simulation in the fourth embodiment are first described below. As illustrated in FIG. 10A, each of the three electric vehicles (EV1, EV2, and EV3) executes the power reception control in accordance with the power reception control method according to the fourth embodiment. The time at which the respective electric vehicles start the electric power reception (the start time) is the same (1:00 a.m.), and the time at which the respective electric vehicles end the electric power reception (the end time) is the same (11 a.m.). The maximum value of the electric power (the element-receiving electric power) that the power reception device 24 of the respective electric vehicles (EV1, EV2, and EV3) can receive is common to each other, which is 3 kW, and the capacity of the battery 25 (the storage battery capacity) of the respective electric vehicles (EV1, EV2, and EV3) is also common to each other, which is 24 kWh. The state of charge of the respective electric vehicles (EV1, EV2, and EV3) at the start time of the electric power reception (the start-time SOC) is also common to each other, which is 40%. The target value of the state of charge (the target SOC) of the respective electric vehicles (EV1, EV2, and EV3) is not set by the user, and is 100% (full charge) that is a default value.

The degree of priority of the respective electric vehicles (EV1, EV2, and EV3) differs from each other. The correction coefficient of the electric vehicle EV1 is $\frac{1}{3}$, the correction coefficient of the electric vehicle EV2 is ⅔, and the correction coefficient of the electric vehicle EV3 is 1. The degree of priority is higher in the order of the electric vehicle EV3, the electric vehicle EV2, and the electric vehicle EV1. Based on the total number (N) of the electric vehicles which is three, the degree of priority of the electric vehicle EV1 is set to ⅙, the degree of priority of the electric vehicle EV2 is set to ⅔, and the degree of priority of the electric vehicle EV3 is set to ⅓.

Figure 10B:
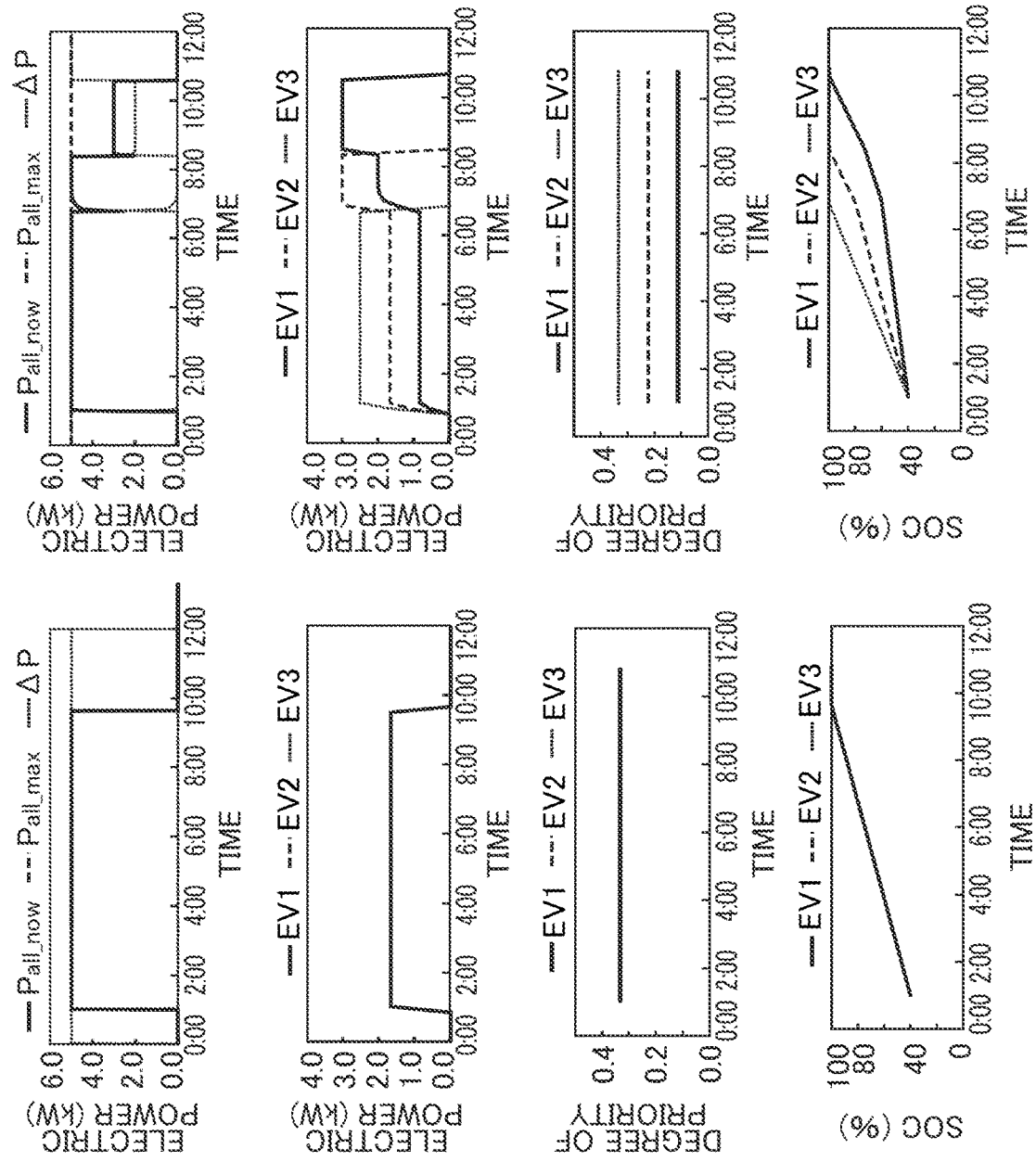
FIG. 10B is a view of plural graphs showing results of the simulation in the fourth embodiment, indicating the four graphs of a reference example on the left side and the four graphs of the fourth embodiment on the right side.

The results of the simulation are next described below. FIG. 10B illustrates eight graphs showing the results of the simulation in the fourth embodiment, indicating the four graphs of a reference example on the left side and the four graphs of the fourth embodiment on the right side. The items of the numerical values indicated in the axis of ordinates and the axis of abscissas in the respective graphs are the same as those in the respective graphs shown in FIG. 5B, and overlapping explanations are not repeated below.

The reference example sets the degree of priority (β) of the respective electric vehicles (EV1, EV2, and EV3) to a fixed value (⅓) based on the total number (N) of the electric vehicles which is three. Since the differential electric power (ΔP) is evenly distributed by ⅓ to the respective electric vehicles (EV1, EV2, and EV3), the element-receiving electric power (Pt) calculated according to the formula (3) also equally varies in the three electric vehicles. The electric vehicles (EV1, EV2, and EV3) that all start the electric power reception simultaneously at 1 a.m. thus receive the same element-receiving electric power (Pt). The state of charge (SOC) of the three electric vehicles equally increases while having the common inclination, since the start-time SOC of the respective electric vehicles (EV1, EV2, and EV3) is the same.

The three electric vehicles (EV1, EV2, and EV3) end the electric power reception before 10 a.m. since the respective batteries are fully charged (NO in step S03 in FIG. 2).

According to the fourth embodiment, the differential electric power (ΔP) is not distributed evenly to the electric vehicles (EV1, EV2, and EV3) since the degree of priority (β) of the respective electric vehicles (EV1, EV2, and EV3) differs from each other, and the distributed amount is greater in the order of the electric vehicle EV3, the electric vehicle EV2, and the electric vehicle EV1. The element-receiving electric power (Pt) is thus the highest in the electric vehicle EV3 and is the lowest in the electric vehicle EV1. While the start-time SOC of the respective electric vehicles (EV1, EV2, and EV3) is common to each other, the degree of priority (β) differs from each other. The electric vehicle EV3 having the highest degree of priority (β) ends the electric power reception at the earliest time (after 6 a.m.) since the battery is fully charged (NO in step S03 in FIG. 2). The element-receiving electric power of the electric vehicle EV3 is then shifted to the differential electric power (ΔP), and is redistributed to the other two electric vehicles (EV1 and EV2). The element-receiving electric power of the other electric vehicles (EV1 and EV2) is thus increased after 6 a.m.

The electric vehicle EV2 having the second highest degree of priority (β) then ends the electric power reception at the second earliest time (after 8 a.m.) since the battery is fully charged (NO in step S03 in FIG. 2). The element-receiving electric power of the electric vehicle EV2 is then shifted to the differential electric power (ΔP), and is redistributed to the remaining electric vehicle (EV1). The element-receiving electric power of the electric vehicle (EV1) is thus increased after 8 a.m.

The electric vehicle EV1 having the lowest degree of priority (β) ends the electric power reception at the latest time (after 10 a.m.) since the battery is fully charged (NO in step S03 in FIG. 2).

As described above, the respective electric vehicles (EV1, EV2, and EV3) not only can reach the full charge simultaneously before the end time (11 a.m.), but also can execute the power reception control that differs from each other, depending on the difference in the format that the user has contracted regarding the electric power reception of the electric vehicle EV1. This can suitably share the differential electric power (ΔP) depending on the demands of the users while leveling the state of charge of the respective electric vehicles.

The respective electric vehicles as used in the first embodiment and the modified examples thereof, and the second embodiment to the fourth embodiment are an example of the "power storage element". The power reception control device and the power reception control method according to the first embodiment and the modified examples thereof, and the second embodiment to the fourth embodiment may be used for any power storage element, in addition to the electric vehicles, such as stationary batteries (including stationary storage batteries) installed in residences, buildings, and facilities, or batteries mounted on mobile communication terminals such as laptop computers and smartphones.

Fifth Embodiment

As given by the formula (3), the calculation device 23 adds the element differential electric power (βΔP) to the element-receiving electric power (Pt) in the previous processing cycle so as to update the element-receiving electric power (Pt+1). The element-receiving electric power (Pt) of the respective electric vehicles is increased every time the processing cycle is repeated, so that the current value of the total transmitted electric power (Pall_now) calculated by the current measurement device 13 approximates to the maximum value of the total transmitted electric power (Pall_max) that is the available amount to be supplied to the entire load group 11 via the electric power facility 12. Since the differential electric power (ΔP) as given by the formula (1) also approximates to zero, the current value of the total transmitted electric power (Pall_now) converges in the maximum value of the total transmitted electric power (Pall_max).

A case is described below on the presumption that any other electric vehicle in the load group 11 intends to newly start the electric power reception when the differential electric power (ΔP) is zero. The initial value of the element-receiving electric power ($P_o$) of the other electric vehicle is zero, and the element differential electric power (βΔP) is also zero. Since the element-receiving electric power (Pt) of the other electric vehicle is not increased as long as the differential electric power (ΔP) is zero, the electric power reception of the other electric vehicle is not newly started.

The fifth embodiment and modified examples thereof subtract a constant electric power correction value (αPt) from the previous element-receiving electric power (Pt) upon updating the element-receiving electric power (Pt+1) so as to correct the element-receiving electric power (Pt+1) after being updated. This can lead the differential electric power (ΔP) to avoid reaching zero. The electric vehicle that intends to newly start receiving the electric power thus can start the electric power reception at an early stage.

The specific configuration and process of the power reception control device and the power reception control method according to the fifth embodiment and the modified examples thereof are described below.

The configuration of the power reception control device according to the fifth embodiment is described below. The power reception control device according to the fifth embodiment differs from the power reception control device according to the first embodiment as illustrated in FIG. 1 in the processing of updating the element-receiving electric power (Pt+1) made by the calculation device 23. The other configurations are common to those in the power reception control device as illustrated in FIG. 1. The configurations of the peripheral devices of the power reception control device (including the electric vehicle EV1, the electric power facility 12, the current measurement device 13, the differential information transmission device 14, and the other electric power-consuming elements 15) are similar to those in the first embodiment. The different parts are herein mainly described below and overlapping explanations are not repeated below.

The power reception control device according to the fifth embodiment repeats a predetermined processing cycle to control the element-receiving electric power (Pt) that the electric vehicle EV1 included in the load group 11 is to receive via the electric power facility 12 that supplies the electric energy to the load group 11 including the plural electric vehicles (EV1, EV2, EV3, . . . ).

The "processing cycle" herein includes processing steps (i) to (iv) described below.

(i) The signal reception device 21 acquires the information indicating the differential electric power (ΔP) obtained by subtracting the current value of the total transmitted electric power (Pall_now) having been supplied to the entire load group 11 via the electric power facility 12 from the maximum value of the total transmitted electric power (Pall_max) that is the available amount to be supplied to the entire load group 11 via the electric power facility 12.

(ii) The calculation device 23 multiplies the differential electric power (ΔP) indicated in the acquired information by the degree of priority (β) of the electric vehicle EV1 indicating a level of priority regarding the electric power reception that the own vehicle (the electric vehicle EV1) has over the other electric vehicles (EV2, EV3, . . . ) so as to calculate the element differential electric power (βΔP).

(iii) The calculation device 23 adds the element differential electric power (βΔP) to the element-receiving electric power (Pt) in the previous processing cycle, and then subtracts the electric power correction value (αPt), so as to update the element-receiving electric power (Pt+1). The electric power correction value (αPt) is calculated in accordance with a predetermined correction rate (a) and the element-receiving electric power (Pt).

(iv) The calculation device 23 controls the electric vehicle EV1 so as to receive the element-receiving electric power (Pt+1) after being updated.

The respective electric vehicles as used in the fifth embodiment and the modified examples thereof are an example of the "power reception element". The power reception control device and the power reception control method according to the fifth embodiment and the modified examples thereof may be used for any power reception element including, in addition to the electric vehicles, any other power storage elements such as stationary batteries and any other electric power-consuming elements without including batteries.

As illustrated in FIG. 1, the power reception control device includes the signal reception device 21 that externally receives electrical signals, and the calculation device 23 that calculates the element-receiving electric power (Pt) of the electric vehicle EV1. The power reception control device according to the fifth embodiment does not necessarily include the vehicle condition acquisition device 22 since the degree of priority (β) used is set to a fixed value.

The signal reception device 21 receives the electrical signal indicating the differential electric power (ΔP) sent from the transmitter 32. The electrical signal indicating the differential electric power (ΔP) is transferred to the calculation device 23.

The vehicle condition acquisition device 22 acquires the information indicating the condition of the electric vehicle EV1. The phrase "condition of the electric vehicle EV1" refers to a numerical value indicating the demand of the user of the electric vehicle EV1, for example. Examples of numerical values indicating the demand of the user of the electric vehicle EV1 include the remaining time period (T) by the end time ($T_d$) of the electric power reception of the electric vehicle EV1, and the target SOC of the electric vehicle EV1. Another example of the demand of the user of the electric vehicle is the format that the user has contracted regarding the electric power reception of the electric vehicle EV1 (the electric-power contract format).

The calculation device 23 multiplies the differential electric power (ΔP) by degree of priority (β) so as to calculate the element differential electric power (βΔP), as given by the formula (7) below. The calculation device 23 adds the element differential electric power (βΔP) to the element-receiving electric power (Pt) in the previous processing cycle, and then subtracts the electric power correction value (αPt), so as to update the element-receiving electric power (Pt+1). The electric power correction value (αPt) is calculated by integrating the correction rate α with the element-receiving electric power (Pt).

[Math. 7]

$$P_{t+1} = P_t + \beta \cdot \Delta P - \alpha \cdot P_t \qquad (7)$$

In the fifth embodiment, the calculation device 23 uses the fixed value (1/N) for the degree of priority (β).

The correction rate α in the formula (7) indicates a strength of correction. The effect of correction is smaller as the correction rate α is smaller, while a margin of the total transmitted electric power supplied via the electric power facility 12, namely, the differential electric power is generated more easily as the correction rate α is larger. The correction rate α is determined so as to obtain appropriate responsiveness of the entire load group 11. In particular, the correction rate α is set to be smaller to reduce the responsiveness as a statistical power reception time of the entire contracting party (a power reception continuable time Tcharge) is longer. For example, when the respective electric vehicles in the entire load group 11 receive the electric power for eleven hours (7 p.m. to 6 a.m.) on average, the power reception continuable time is sufficiently long. The respective vehicles thus can be charged to the target SOC by 6 a.m. with the smaller correction rate α.

Another example of the factor of the responsiveness is the repeating period of the processing cycle or the control interval. The responsiveness is higher as the repeating period of the processing cycle or the control interval is shorter, so as to reduce the correction rate α. In view of the presumed power reception continuable time Tcharge and the control interval, the correction rate α can be set to 0.015.

The calculation device 23 sends the instruction signal to the power reception device 24 so as to receive the element-receiving electric power (Pt+1) after being updated. The power reception device 24 when receiving the instruction signal receives the updated element-receiving electric power (Pt+1) via the electric power facility 12.

The power reception control device repeatedly executes the "processing cycle" including the processing steps (i) to (iv) at regular intervals, so as to control the electric power (the element-receiving electric power Pt) received by the power reception device 24 of the electric vehicle EV1.

An example of the power reception control method executed by the power reception control device according to the fifth embodiment is described below with reference to the flowchart shown in FIG. 2. A person skilled in the art can easily understand a specific process of the power reception processing method executed by the power reception control device, according to the explanations of the specific configurations and functions of the power reception control device as illustrated with reference to FIG. 1. The fifth embodiment thus herein illustrates the power reception processing method executed by the power reception control device with main processing operations of the power reception control device, and explanations of specific processing operations that overlap with those illustrated above are not repeated below.

First, in step S01, the signal reception device 21 acquires the information indicating the differential electric power (ΔP) calculated by the calculator 31.

The process skips over step 802 and proceeds to step S03, and the power reception control device determines whether the electric power reception needs to be continued. For example, when the instruction signal for finishing the electric power reception is received from the user of the electric vehicle EV1 (NO in step S03) or when the current time reaches the end time (T_d) of the electric power reception, the power reception control device ends the electric power reception. The power reception control device also ends the electric power reception when detecting disconnection of the charging port (NO in step S03), since the probability that the electric vehicle EV1 starts moving within several minutes from the disconnection is high. The power reception control device also ends the electric power reception when the state of charge (SOC) of the battery 25 reaches the target value (NO in step S03). When any of these cases are not detected (YES in step S03), the power reception control device causes the process to proceed to step S04 so as to keep the electric power reception.

In step 804, the calculation device 23 sets the degree of priority (β) of the electric vehicle EV1 to the fixed value (1/N). The process proceeds to step 805, and the calculation device 23 substitutes the differential electric power (ΔP), the degree of priority (B), and the correction rate α (α=0.015) for the formula (7) so as to update the element-receiving electric power (Pt+1).

The process proceeds to step 806, and the calculation device 23 controls the power reception device 24 so as to receive the element-receiving electric power (Pt+1) after being updated. The power reception control device repeats the processing cycle from step S01 to step S06 as a unit until the determination in the step S03 results in NO so as to control the element-receiving electric power (Pt).

The first modified example in which the method of calculating the current value of the total transmitted electric power (Pall_now) is modified (FIG. 3) and the second modified example in which the method of calculating the differential electric power (ΔP) is modified (FIG. 4) with respect to the first embodiment, are also applicable to the power reception control device and the power reception control method according to the fifth embodiment and the modified examples thereof.

(Simulation Results)

Next, results of a simulation of the power reception control executed in accordance with the power reception control method according to the fifth embodiment are described below.

The conditions for the simulation in the fifth embodiment are first described below. As illustrated in FIG. 11A, each of the three electric vehicles (EV1, EV2, and EV3) executes the power reception control in accordance with the power reception control method according to the fifth embodiment. The time at which the respective electric vehicles start the electric power reception (the start time) differs from each other. The start time of the electric vehicle EV1 is 1 a.m., the start time of the electric vehicle EV2 is 2 a.m., and the start time of the electric vehicle EV3 is 3 a.m. The time at which the respective electric vehicles end the electric power reception (the end time) differs from each other. The end time of the electric vehicle EV1 is 11 a.m., the end time of the electric vehicle EV2 is 10 a.m., and the end time of the electric vehicle EV3 is 9 a.m. The maximum value of the electric power (the element-receiving electric power) that the power reception device 24 of the respective electric vehicles (EV1, EV2, and EV3) can receive is common to each other, which is 3 kW, and the capacity of the battery 25 (the storage battery capacity) of the respective electric vehicles (EV1, EV2, and EV3) is also common to each other, which is 24 kWh. The state of charge of the respective electric vehicles (EV1, EV2, and EV3) at the start time of the electric power reception (the start-time SOC) is common to each other, which is 40%. The target value of the state of charge (the target SOC) of the respective electric vehicles (EV1, EV2, and EV3) is not set by the user, and is 100% (full charge) that is a default value. The correction rate α of the respective electric vehicles (EV1, EV2, and EV3) is set to 0.015, and the degree of priority (β) is set to ⅓ (the fixed value).

Figure 11B:
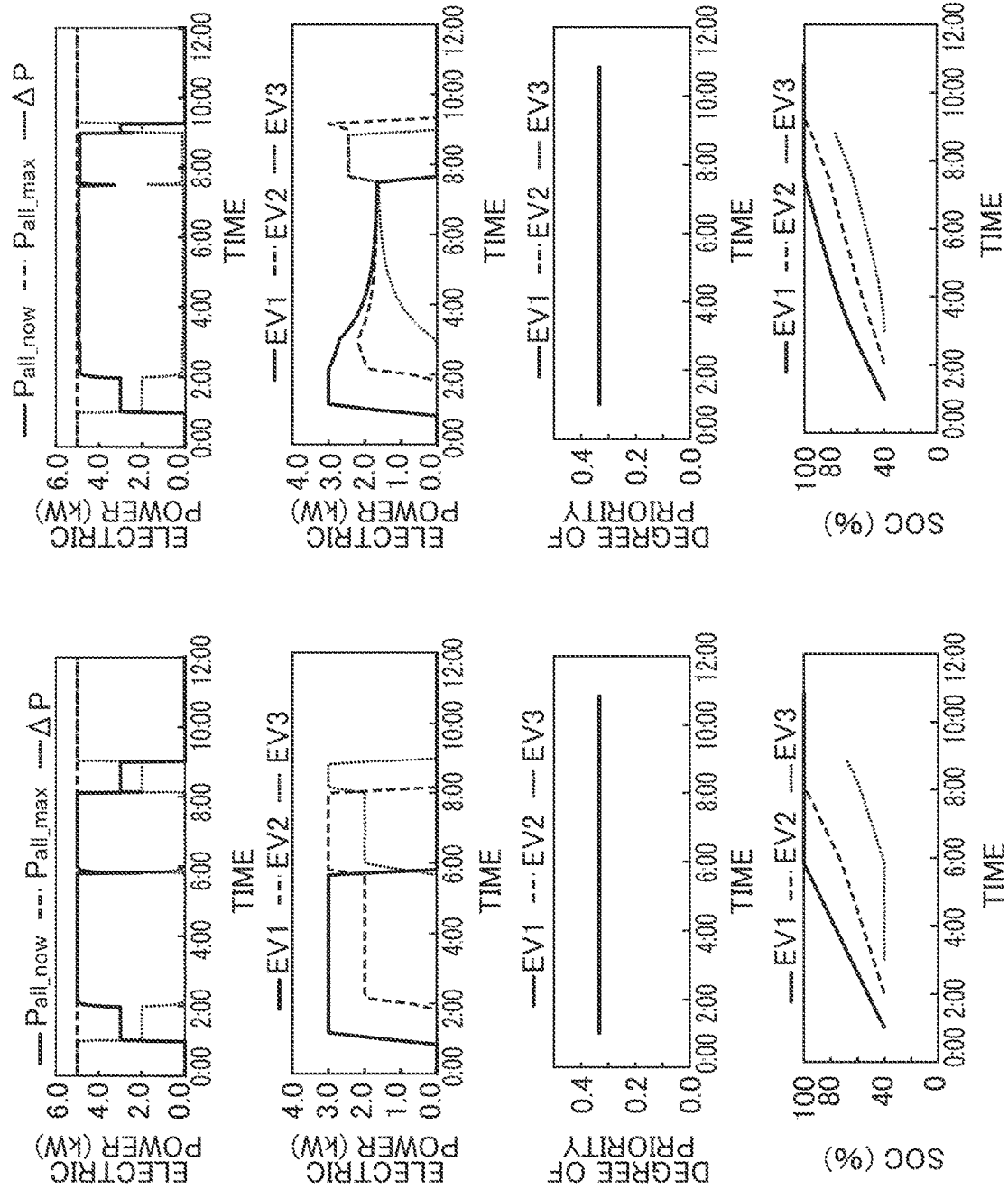
FIG. 11B is a view of plural graphs showing results of the simulation in the fifth embodiment, indicating the four graphs of a reference example on the left side and the four graphs of the fifth embodiment on the right side.

The results of the simulation are next described below. FIG. 11B illustrates eight graphs showing the results of the simulation, indicating the four graphs of a reference example on the left side and the four graphs of the fifth embodiment on the right side. The items of the numerical values indicated in the axis of ordinates and the axis of abscissas in the respective graphs are the same as those in the respective graphs shown in FIG. 5B, and overlapping explanations are not repeated below.

The calculation device 23 in the reference example updates the element-receiving electric power (Pt+1) according to the formula (3). The formula (3) does not include the term of the electric power correction value (αPt) on the right side, which differs from the formula (7). The element-receiving electric power (Pt) of the electric vehicle EV1 that has started the electric power reception at 1 a.m. is increased to the own electric power capacity (3 kW). The element-receiving electric power (Pt) of the electric vehicle EV2 that has started the electric power reception at 2 a.m. is increased to the differential electric power (2 kW) obtained by subtracting the element-receiving electric power of the electric vehicle EV1 (3 kW) from the maximum value of the total transmitted electric power (5 kW).

The differential electric power (ΔP) at this point does not change but remains zero. The element-receiving electric power (Pt) of the electric vehicle EV3 that has started the electric power reception at 3 a.m. is thus not increased but remains zero. Namely, the state of charge SOC does not change but remains the start-time SOC since the electric vehicle EV3 cannot start the electric power reception.

The electric vehicle EV1 ends the electric power reception around 6 a.m. since the battery is fully charged (NO in step 803 in FIG. 2). The element-receiving electric power (3 kW) of the electric vehicle EV1 is then shifted to the differential electric power (ΔP), and is redistributed to the other two electric vehicles (EV2 and EV3). The element-receiving electric power (Pt) of the electric vehicle EV3 is increased to 2 kW. Namely, the electric vehicle EV3 starts the electric vehicle reception, so that the state of charge SOC starts increasing.

The electric vehicle EV2 ends the electric power reception around 8 a.m. since the battery is fully charged (NO in step S03 in FIG. 2). The element-receiving electric power (3 kW) of the electric vehicle EV2 is then shifted to the differential electric power (ΔP), and is redistributed to the remaining electric vehicle (EV3).

The electric vehicle EV3 ends the electric power reception at 9 a.m. since the time reaches the "end time ($T_d$) of the electric power reception" of the electric vehicle EV3 (NO in step S03 in FIG. 2). The state of charge of the electric vehicle EV3 at this point was about 60%.

In the reference example as described above, the electric vehicle EV3, which intends to newly start the electric power reception at the point at which the differential electric power (ΔP) is zero, cannot start the electric power reception until the other electric vehicle EV1 ends the electric power reception (NO in step S03 in FIG. 2). This hinders the electric vehicle EV3 from newly starting the electric power reception at an early stage.

According to the fifth embodiment, the calculation device 23 updates the element-receiving electric power (Pt+1) according to the formula (7) that includes the term of the electric power correction value (αPt) on the right side. A margin is then generated in the current value of the total transmitted electric power (Pall_now) supplied via the electric power facility 12 after the electric vehicle EV2 starts the electric power reception at 2 a.m. This leads the differential electric power (ΔP) to avoid reaching zero. The margin in the current value of the total transmitted electric power (Pall_now) is thus distributed as the differential electric power (ΔP) also to the electric vehicle EV3 that intended to newly start the electric power reception.

The element-receiving electric power of the electric vehicle EV3 starts increasing immediately at the point of starting the electric power reception (at 3 a.m.). The simulation revealed that the state of charge SOC of the electric vehicle EV3 at "the end time of the electric power reception (at 9 a.m.)" could be increased from about 60% to about 70%. The electric vehicle EV3 thus could increase the state of charge at the end time of the electric power reception since the electric vehicle EV3 could start the electric power reception earlier without waiting until the other electric vehicle EV1 ended the electric power reception.

As given by the formula (7), the electric power correction value (αPt) is proportional to the element-receiving electric power (Pt). The margin generated in the total transmitted electric power thus can be shared among the plural electric vehicles depending on the element-receiving electric power (Pt).

Third Modified Example

The fifth embodiment is illustrated above with the degree of priority (β) that is set to the fixed value (1/N). A third modified example is illustrated below with a case of calculating the degree of priority (β) in accordance with the uncharged state (ASOC) obtained by subtracting the current value of the state of charge (SOCnow) of the battery from the target value of the state of charge (SOCgoal) of the battery 25.

The power reception control device according to the third modified example includes the vehicle condition acquisition device 22. The vehicle condition acquisition device 22 acquires the information indicating the target value of the state of charge (SOCgoal) of the battery 25 and the current value of the state of charge (SOCnow) of the battery 25. In particular, in step 302 in the processing cycle shown in FIG. 2, the vehicle condition acquisition device 22 measures the state of charge of the battery 25, and acquires the measured value as the current value (SOCnow).

In step S04 in FIG. 2, the calculation device 23 calculates the degree of priority (β) of the electric vehicle EV1 based on the target value of the state of charge (SOCgoal) of the battery 25 according to the formula (8) below. The degree of priority (β) is proportional to the uncharged state (ASOC). The degree of priority (β) may be proportional to the uncharged state (ASOC) to the power of g (g is a positive integer of two or greater). When the user does not set the target value (SOC goal), the target value (SOC goal) is set to 100%, which is 1.00.

[Math. 8]

$$\beta = \frac{SOC_{goal} - SOC_{now}}{N} \tag{8}$$

In the third modified example, when the current value (SOCnow) reaches the target value (SOCgoal), the calculation device 23 may determine to finish the electric power reception in step S03 in FIG. 2.

(Simulation Results)

Next, results of a simulations of the power reception control executed in accordance with the power reception control method according to the third modified example are described below.

The conditions for the simulation of the third modified example are the same as the conditions for the simulation of the fifth embodiment, as illustrated in FIG. 11A and FIG. 12A. The correction rate α of the respective electric vehicles (EV1, EV2, and EV3) is set to 0.015, and the degree of priority (β) is calculated according to the formula (8) for both the reference example and the third modified example.

Figure 12B:
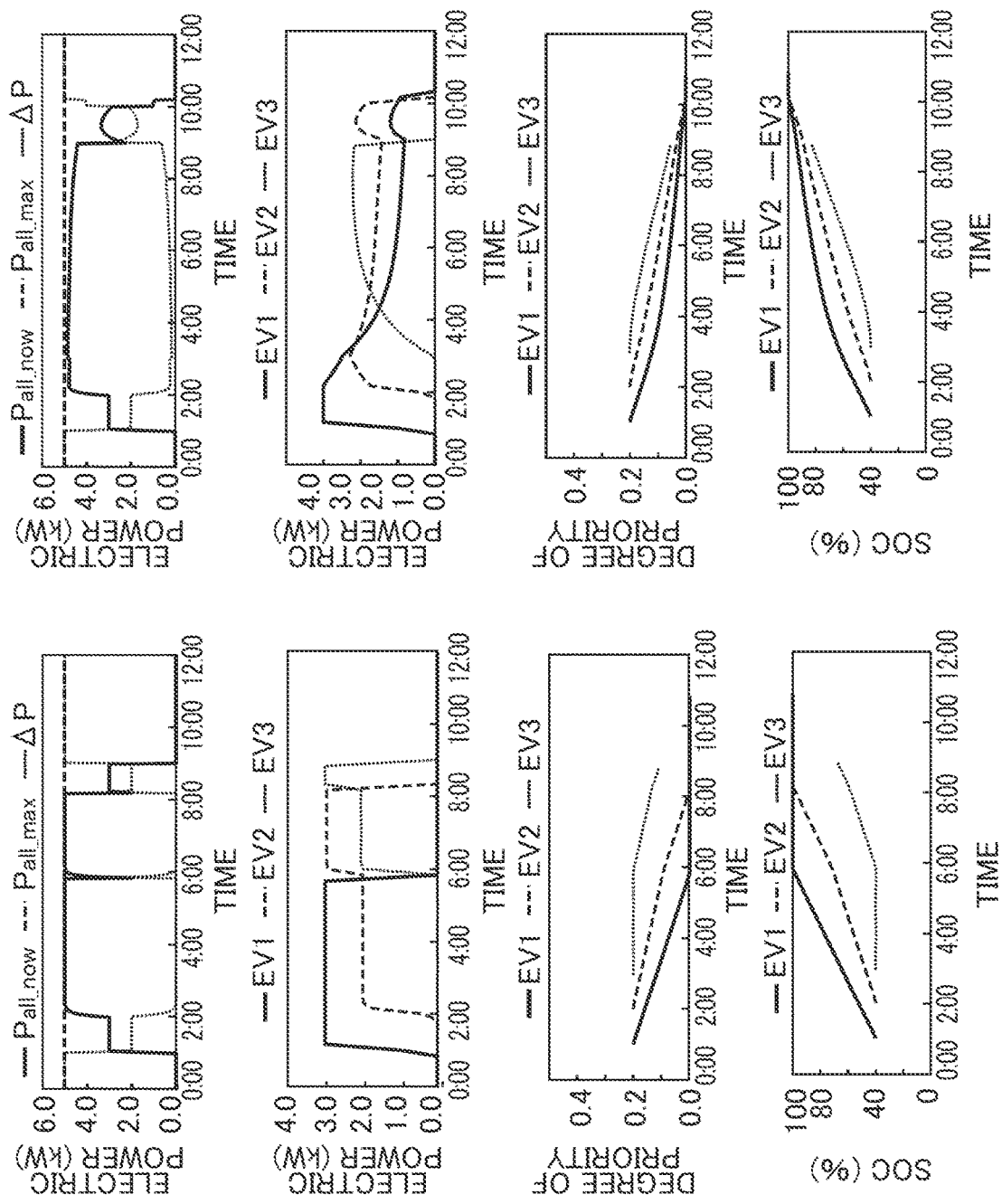
FIG. 12B is a view of plural graphs showing results of the simulation in the third modified example, indicating the four graphs of a reference example on the left side and the four graphs of the third modified example on the right side.

The results of the simulation are next described below. FIG. 12B illustrates eight graphs showing the results of the simulation, indicating the four graphs of the reference example on the left side and the four graphs of the third modified example on the right side. The items of the numerical values indicated in the axis of ordinates and the axis of abscissas in the respective graphs are the same as those in the respective graphs shown in FIG. 5B, and overlapping explanations are not repeated below.

The calculation device 23 in the reference example updates the element-receiving electric power (Pt+1) according to the formula (3). The formula (3) does not include the term of the electric power correction value (αPt) on the right side, which differs from the formula (7). The differential electric power (ΔP) does not change but remains zero after 2 a.m. at which the electric vehicle EV2 has started the electric power reception. The electric vehicle EV3, which has started the electric power reception at 3 a.m., cannot start the electric power reception until the other electric vehicle EV1 ends the electric power reception at 6 a.m., even though the electric vehicle EV3 has the higher priority than the other two electric vehicles (EV1 and EV2), and the state of charge SOC does not change but remains the start-time SOC. The state of charge of the electric vehicle EV3 at the end time of the electric power reception (at 9 a.m.) was about 60%.

According to the third modified example, the calculation device 23 updates the element-receiving electric power (Pt+1) according to the formula (7) that includes the term of the electric power correction value (αPt) on the right side. A margin is then generated in the current value of the total transmitted electric power (Pall_now) supplied via the electric power facility 12 after the electric vehicle EV2 starts the electric power reception at 2 a.m. This leads the differential electric power (ΔP) to avoid reaching zero. The margin in the current value of the total transmitted electric power (Pall_now) is thus distributed as the differential electric power (ΔP) also to the electric vehicle EV3 that intended to newly start the electric power reception.

The element-receiving electric power of the electric vehicle EV3 starts increasing immediately at the point of starting the electric power reception (at 3 a.m.). The simulation revealed that the state of charge SOC of the electric vehicle EV3 at "the end time of the electric power reception (at 9 a.m.)" could be increased from about 60% to about 80%. The electric vehicle EV3 thus could increase the state of charge at the end time of the electric power reception since the electric vehicle EV3 could start the electric power reception earlier without waiting until the other electric vehicle EV1 ended the electric power reception.

Fourth Modified Example

A fourth modified example is illustrated below with a case of calculating the degree of priority (β) in accordance with the remaining time period (T) from the current time ($T_o$) to the end time ($T_d$) of the electric power reception, instead of the uncharged state (ASOC).

The power reception control device according to the fourth modified example includes the vehicle condition acquisition device 22. The vehicle condition acquisition device 22 acquires the information indicating the remaining time period (T) from the current time ($T_o$) to the end time ($T_d$) of the electric power reception. In particular, in step S02 in the processing cycle shown in FIG. 2, the vehicle condition acquisition device 22 acquires the information indicating the remaining time period (T). Alternatively, the vehicle condition acquisition device 22 may acquire the information indicating the end time ($T_d$) of the electric power reception so as to calculate the remaining time period (T) from the current time ($T_o$) to the end time ($T_d$) of the electric power reception.

In step S04 in FIG. 2, the calculation device 23 calculates the degree of priority (β) of the electric vehicle EV1 based on the remaining time period (T) from the current time ($T_o$) to the end time ($T_d$) of the electric power reception according to the formula (2). The degree of priority (β) is inversely proportional to the remaining time period (T). The degree of priority (β) is higher as the remaining time period (T) is shorter. The application of the formula (2) is an example, and the degree of priority (β) may be inversely proportional to "the remaining time period (T) to the power of g" obtained by multiplying the remaining time period (T) 'g' times (g is a positive integer of two or greater).

(Simulation Results)

Next, results of a simulations of the power reception control executed in accordance with the power reception control method according to the fourth modified example are described below.

The conditions for the simulation of the fourth modified example are the same as the conditions for the simulation of the fifth embodiment, as illustrated in FIG. 11A and FIG. 13A. The correction rate α of the respective electric vehicles (EV1, EV2, and EV3) is set to 0.015, and the degree of priority (β) is calculated according to the formula (2) for both the reference example and the fourth modified example.

Figure 13B:
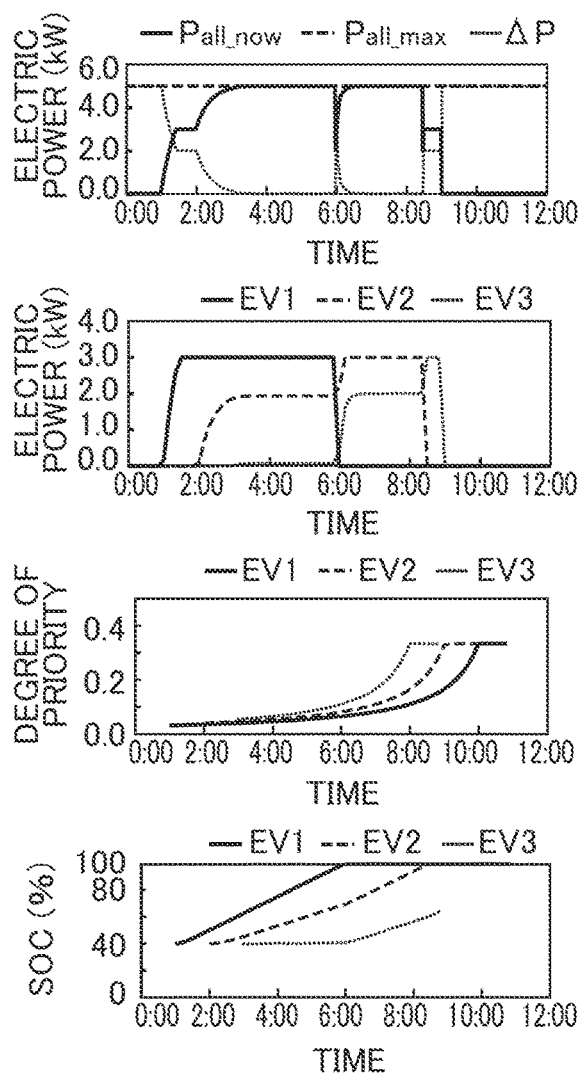
FIG. 13B is a view of plural graphs showing results of the simulation in the fourth modified example, indicating the four graphs of a reference example on the left side and the four graphs of the fourth modified example on the right side.
Figure 13B:
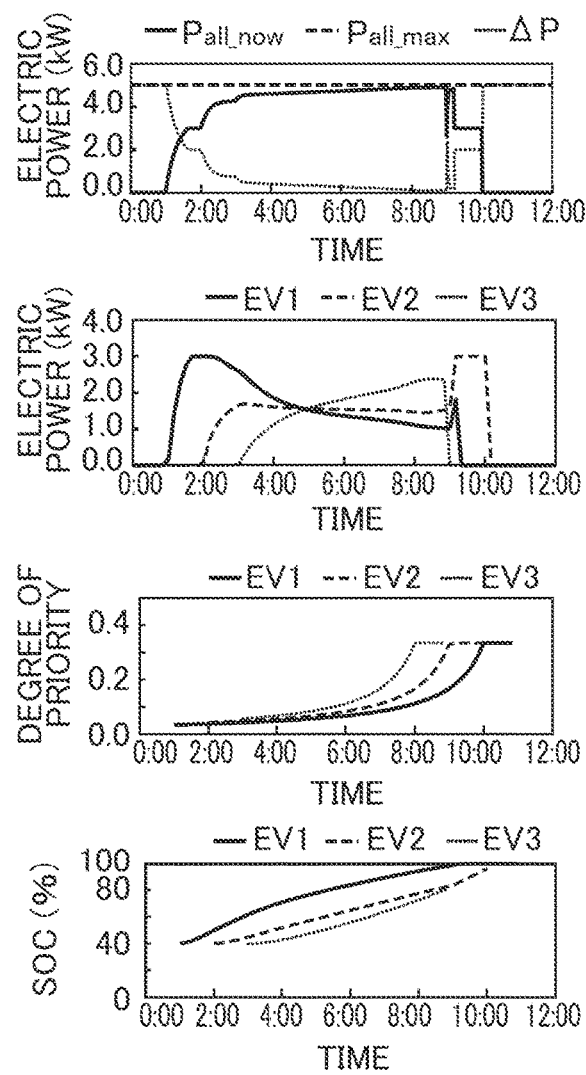

The results of the simulation are next described below. FIG. 13B illustrates eight graphs showing the results of the simulation, indicating the four graphs of the reference example on the left side and the four graphs of the fourth modified example on the right side. The items of the numerical values indicated in the axis of ordinates and the axis of abscissas in the respective graphs are the same as those in the respective graphs shown in FIG. 5B, and overlapping explanations are not repeated below.

The calculation device 23 in the reference example updates the element-receiving electric power (Pt+1) according to the formula (3). The formula (3) does not include the term of the electric power correction value (αPt) on the right side, which differs from the formula (7). The differential electric power (ΔP) does not change but remains zero after 3 a.m. at which the element-receiving electric power of the electric vehicle EV2 is stable. The element-receiving electric power (Pt) of the electric vehicle EV3, which has started the electric power reception at 3 a.m., does not increase but remains substantially zero, even though the electric vehicle EV3 has the higher priority than the other two electric vehicles (EV1 and EV2). The electric vehicle EV3 thus cannot start the electric power reception until the other electric vehicle EV1 ends the electric power reception at 6 a.m., and the state of charge SOC remains substantially the same as the start-time SOC. The state of charge of the electric vehicle EV3 at the end time of the electric power reception (at 9 a.m.) was about 60%.

According to the fourth modified example, the calculation device 23 updates the element-receiving electric power (Pt+1) according to the formula (7) that includes the term of the electric power correction value (αPt) on the right side. The element-receiving electric power of the electric vehicle EV1 started decreasing after the electric vehicle EV2 started the electric power reception at 2 a.m., and the margin thus remained in the current value of the total transmitted electric power (Pall_now) since the differential electric power (ΔP) did not reach zero after 3 a.m. The margin in the current value of the total transmitted electric power (Pall_now) was thus distributed as the differential electric power (ΔP) also to the electric vehicle EV3 that intended to newly start the electric power reception at 3 a.m., so as to increase the element-receiving electric power of the electric vehicle EV3 at an early stage. The margin remaining in the current value of the total transmitted electric power (Pall_now) could allow the electric vehicle EV3 that intended to newly start the electric power reception to start the electric power reception at an early stage.

The element-receiving electric power of the electric vehicle EV3 starts increasing immediately at the point of starting the electric power reception (at 3 a.m.). The simulation revealed that the state of charge SOC of the electric vehicle EV3 at "the end time of the electric power reception (at 9 a.m.)" could be increased from about 60% to about 80%. The electric vehicle EV3 thus could increase the state of charge at the end time of the electric power reception since the electric vehicle EV3 could start the electric power reception earlier without waiting until the other electric vehicle EV1 ended the electric power reception.

While the time at which the electric vehicle EV1 reached the full charge was later than the time in the reference example, the electric vehicle EV1 could be fully charged by the end time ($T_d$) of the electric power reception of the electric vehicle EV1. This satisfies the demand of the user of the electric vehicle EV1. The state of charge of the electric vehicle EV2 at the end time of the electric power reception (at 10 a.m.=$T_d$) did not reach the full charge but was increased to 95% or greater, which can be determined to satisfy the demand of the user sufficiently. The fourth modified example could level the state of charge of the respective electric vehicles (EV1 to EV3) while satisfying the demands of the users of all of the electric vehicles included in the load group 11. Namely, a variation in the state of charge at the end time ($T_d$) of the respective electric vehicles could be decreased.

Fifth Modified Example

A fifth modified example is illustrated below with a case of calculating the degree of priority (β) in accordance with the uncharged state (ASOC) and the remaining time period (T) by the end time ($T_d$) of the electric power reception. The fifth modified example can employ the method for calculating the degree of priority (β) according to the formula (5) as described in the third embodiment.

The power reception control device according to the fifth modified example includes the vehicle condition acquisition device 22. The vehicle condition acquisition device 22 acquires the information indicating the target value (SOCgoal) of the state of charge and the current value (SOCnow) of the state of charge of the battery 25, and the information indicating the remaining time period (T). In particular, in step S02 in the processing cycle shown in FIG. 2, the vehicle condition acquisition device 22 measures the state of charge of the battery 25, and acquires the measured value as the current value (SOCnow). The vehicle condition acquisition device 22 also acquires the information indicating the remaining time period (T). Alternatively, the vehicle condition acquisition device 22 may acquire the information indicating the end time ($T_d$) of the electric power reception so as to calculate the remaining time period (T) by the end time ($T_d$) of the electric power reception.

In step S04, the calculation device 23 calculates the degree of priority (β) of the electric vehicle EV1 based on the remaining time period (T) by the end time ($T_d$) of the electric power reception and the target value of the state of charge (SOCgoal) of the battery 25 according to the formula (5), instead of the formula (2). The fifth modified example is illustrated with the case of calculating the degree of priority (β) according to the formula (5), but may use the formula (6) instead of the formula (5).

(Simulation Results)

Next, results of a simulations of the power reception control executed in accordance with the power reception control method according to the fifth modified example are described below.

The conditions for the simulation of the fifth modified example are the same as the conditions for the simulation of the fifth embodiment, as illustrated in FIG. 11A and FIG. 14A. The correction rate α of the respective electric vehicles (EV1, EV2, and EV3) is set to 0.015, and the degree of priority (β) is calculated according to the formula (5) for both the reference example and the fifth modified example. The target value of the state of charge (SOCgoal) is set to the full charge (100%=1.00) which is the default value.

Figure 14B:
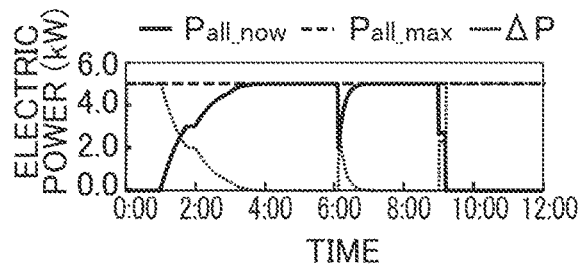
FIG. 14B is a view of plural graphs showing results of the simulation in the fifth modified example, indicating the four graphs of a reference example on the left side and the four graphs of the fifth modified example on the right side.
Figure 14B:
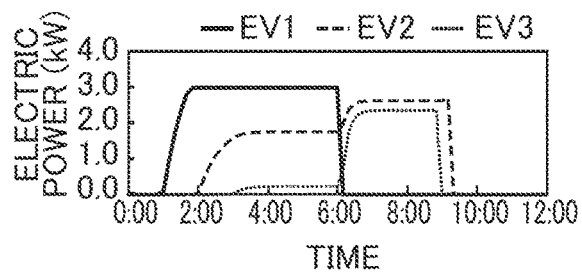
Figure 14B:
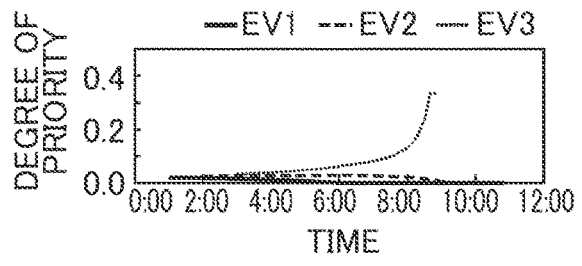
Figure 14B:
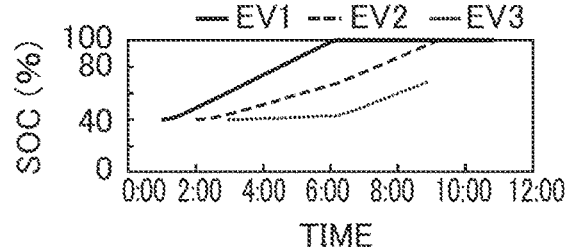
Figure 14B:
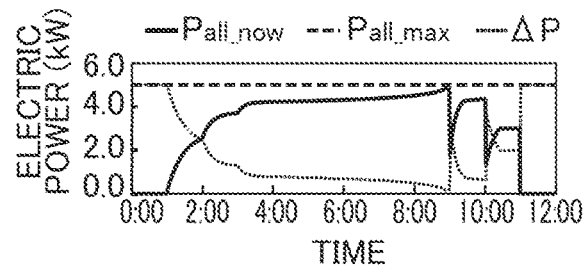
Figure 14B:
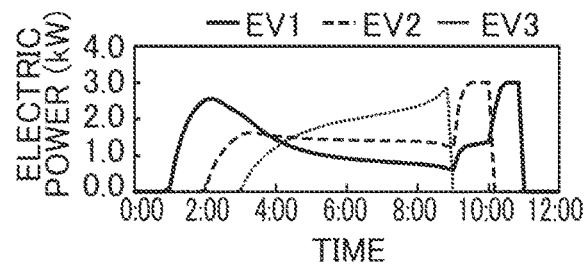
Figure 14B:
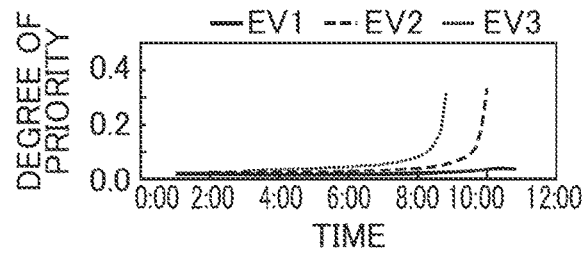
Figure 14B:
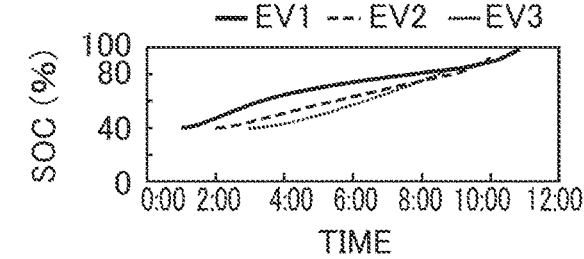

The results of the simulation are next described below. FIG. 14B illustrates eight graphs showing the results of the simulation, indicating the four graphs of the reference example on the left side and the four graphs of the fifth modified example on the right side. The items of the numerical values indicated in the axis of ordinates and the axis of abscissas in the respective graphs are the same as those in the respective graphs shown in FIG. 5B, and overlapping explanations are not repeated below.

The calculation device 23 in the reference example updates the element-receiving electric power (Pt+1) according to the formula (3). The formula (3) does not include the term of the electric power correction value (αPt) on the right side, which differs from the formula (7). The differential electric power (ΔP) does not change but remains zero after 4 a.m. at which the element-receiving electric power of the electric vehicle EV2 is stable. The element-receiving electric power (Pt) of the electric vehicle EV3, which slightly increases at the point of 3 a.m. at which the electric vehicle EV3 has started the electric power reception since the differential electric power (ΔP) slightly remains, does not increase after 4 a.m. at which the differential electric power (ΔP) reaches zero. The element-receiving electric power (Pt) of the electric vehicle EV3, which has started the electric power reception at 3 a.m., does not increase more than the element-receiving electric power (Pt) of the other two electric vehicles (EV1 and EV2), even though the electric vehicle EV3 has the higher priority than the other two electric vehicles (EV1 and EV2). The electric vehicle EV3 thus cannot start the electric power reception until the other electric vehicle EV1 ends the electric power reception at 6 a.m., and the state of charge SOC remains substantially the same as the start-time SOC. The state of charge of the electric vehicle EV3 at the end time of the electric power reception (at 9 a.m.) was about 60%.

According to the fifth modified example, the calculation device 23 updates the element-receiving electric power (Pt+1) according to the formula (7) that includes the term of the electric power correction value (αPt) on the right side. The element-receiving electric power of the electric vehicle EV1 started decreasing after the electric vehicle EV2 started the electric power reception at 2 a.m., and the margin remained in the current value of the total transmitted electric power (Pall_now) since the differential electric power (ΔP) did not reach zero after 3 a.m. The margin in the current value of the total transmitted electric power (Pall_now) was thus distributed as the differential electric power (ΔP) also to the electric vehicle EV3 that intended to newly start the electric power reception at 3 a.m., so as to increase the element-receiving electric power of the electric vehicle EV3 at an early stage. The margin remaining in the current value of the total transmitted electric power (Pall_now) could allow the electric vehicle EV3 that intended to newly start the electric power reception to start the electric power reception at an early stage.

The element-receiving electric power of the electric vehicle EV3 starts increasing immediately at the point of starting the electric power reception (at 3 a.m.). The simulation revealed that the state of charge SOC of the electric vehicle EV3 at "the end time of the electric power reception (at 9 a.m.)" could be increased from about 60% to about 80%. The electric vehicle EV3 thus could increase the state of charge at the end time of the electric power reception since the electric vehicle EV3 could start the electric power reception earlier without waiting until the other electric vehicle EV1 ended the electric power reception.

The state of charge of the electric vehicle EV1 at the end time of the electric power reception (at 11 a.m.=$T_d$) did not reach the full charge but was increased to 95% or greater, which can be determined to satisfy the demand of the user sufficiently. Similarly, the state of charge of the electric vehicle EV2 at the end time of the electric power reception (at 10 a.m.=$T_d$) did not reach the full charge but was increased to about 90%, which can be determined to satisfy the demand of the user sufficiently. The fifth modified example could level the state of charge of the respective electric vehicles (EV1 to EV3) while satisfying the demands of the users of all of the electric vehicles included in the load group 11. Namely, a variation in the state of charge at the end time ($T_d$) of the respective electric vehicles could be decreased.

Sixth Modified Example

The power reception control device according to the fifth embodiment subtracts the electric power correction value ($\alpha Pt$) from the previous element-receiving electric power (Pt) upon updating the element-receiving electric power (Pt) as given by the formula (7), so as to lead the differential electric power ($\Delta P$) to avoid reaching zero. This generates the margin in the current value of the total transmitted electric power (Pall_now), so as to allow the electric vehicle that intends to newly start the electric power reception to start the electric power reception at an early stage.

Subtracting the electric power correction value ($\alpha Pt$) does not lead the current value of the total transmitted electric power (Pall_now) having been supplied to the entire load group 11 via the electric power supply base point 10 to converge in the maximum value of the total transmitted electric power (Pall_max) but to be smaller than the maximum value of the total transmitted electric power (Pall_max). This decreases the efficiency of use of the total transmitted electric power, namely, decreases a ratio of the current value of the total transmitted electric power (Pall_now) to the maximum value of the total transmitted electric power (Pall_max).

The subtraction of the electric power correction value ($\alpha Pt$) needs to be made in the case in which the differential electric power ($\Delta P$) is zero, but is not necessarily made when the differential electric power ($\Delta P$) is not zero.

The power reception control method according to a sixth modified example adds a processing step of determining whether the differential electric power ($\Delta P$) is zero to the processing cycle shown in FIG. 2, and switches the calculation formula used for updating the element-receiving electric power (Pt) in step S05 between the formula (3) and the formula (7) depending on the determination result.

In step S05 in FIG. 2, the calculation device 23 determines whether the differential electric power ($\Delta P$) indicated in the information acquired in step 801 is zero before calculating the element-receiving electric power (Pt+1) after being updated.

In the sixth modified example, the expression "the differential electric power ($\Delta P$) is zero" encompasses not only a case in which the differential electric power ($\Delta P$) is accurately zero but also a case in which the differential electric power ($\Delta P$) is within a predetermined range presumed to be zero (referred to below as a "range of zero").

The range of zero is defined such that the differential electric power ($\Delta P$) is zero or greater and a threshold electric power ($\Delta Pth$) or less.

The responsiveness of the power reception control system varies depending on the range of zero. Increasing the range of zero can lead the margin to be generated in the total transmitted electric power earlier, namely, can increase the responsiveness for generating the margin in the total transmitted electric power. This can allow the additional electric vehicle to newly start the electric power reception at an early stage. Decreasing the range of zero can delay generating the margin in the differential electric power, namely can decrease the responsiveness for generating the margin in the total transmitted electric power. This can lead the current value of the total transmitted electric power (Pall_now) to further approximate to the maximum value of the total transmitted electric power (Pall_max), so as to increase the efficiency of use of the total transmitted electric power (Pall_now/Pall_max). The range of zero, which is the threshold voltage ($\Delta Pth$), is a parameter determined in view of the early start of the electric power reception of the additional electric vehicle and the improvement in the efficiency of use of the total transmitted electric power.

The calculation device 23, when determining that the differential electric power ($\Delta P$) is zero, updates the element-receiving electric power (Pt+1) according to the formula (7), since the margin needs to be generated in the current value of the total transmitted electric power (Pall_now). More particularly, the calculation device 23 adds the element differential electric power (OAP) to the element-receiving electric power (Pt) in the previous processing cycle, and then subtracts the electric power correction value ($\alpha Pt$) so as to update the element-receiving electric power (Pt+1).

The calculation device 23, when determining that the differential electric power ($\Delta P$) is not zero, does not need to use the term of the electric power correction value ($\alpha Pt$) for generating a new margin since the margin has been generated in the current value of the total transmitted electric power (Pall_now). The calculation device 23 then updates the element-receiving electric power (Pt+1) according to the formula (3). Namely, the calculation device 23 adds the element differential electric power ($\beta \Delta P$) to the element-receiving electric power (Pt) in the previous processing cycle so as to update the element-receiving electric power (Pt+1).

Repeating the processing cycle described above can switch the calculation formula used for updating the element-receiving electric power (Pt) in step S05 between the formula (3) and the formula (7) depending on the result of determination of whether the differential electric power ($\Delta P$) is zero.

This example thus can allow the electric vehicle that intends to newly start the electric power reception to start the electric power reception at an early stage, and can increase the efficiency of use of the total transmitted electric power (Pall_now/Pall_max) supplied via the electric power supply base point 10.

With regard to a specific method of switching between the formula (3) and the formula (7), for example, the calculation device 23 sets the correction rate $\alpha$ in the formula (7) to zero when determining that the differential electric power ($\Delta P$) is not zero, and sets the correction rate $\alpha$ in the formula (7) to a value other than zero (for example, 0.015) when determining that the differential electric power ($\Delta P$) is zero. The calculation device 23 thus can switch the presence or absence of the term of the electric power correction value (αPt) in the formula (7) so as to update the element-receiving electric power (Pt+1).

The method of calculating the degree of priority (β) in the sixth modified example may be determined as appropriate. The degree of priority (β) may be the fixed value (1/N) as described in the fifth embodiment, may be calculated in accordance with the uncharged state (ASOC) as given by the formula (8), may be calculated in accordance with the remaining time period (T) as given by the formula (2), may be calculated in combination with the uncharged state (ASOC) and the remaining time period (T) as given by the formula (4) or the formula (5), or may be calculated by use of any other calculating methods.

(Simulation Results)

Next, results of a simulations of the power reception control executed in accordance with the power reception control method according to the sixth modified example are described below.

The conditions for the simulation of the sixth modified example are the same as the conditions for the simulation of the fifth modified example, as illustrated in FIG. 14A and FIG. 15A. The correction rate α of the respective electric vehicles (EV1, EV2, and EV3) is set to 0.015, and the degree of priority (β) is calculated according to the formula (5) for both the fifth modified example and the sixth modified example. The target value of the state of charge (SOCgoal) is set to the full charge (100%=1.00) which is the default value. The fifth modified example is illustrated above with the case of constantly setting the correction rate α in the formula (7) to 0.015 to update the element-receiving electric power (Pt+1) regardless of whether the differential electric power (ΔP) is zero. The sixth modified example sets the correction rate α in the formula (7) to 0.015 only when the differential electric power (ΔP) is zero so as to update the element-receiving electric power (Pt+1), and sets the correction rate α in the formula (7) to zero when the differential electric power (ΔP) is not zero so as to update the element-receiving electric power (Pt+1) according to the formula (3).

Figure 15B:
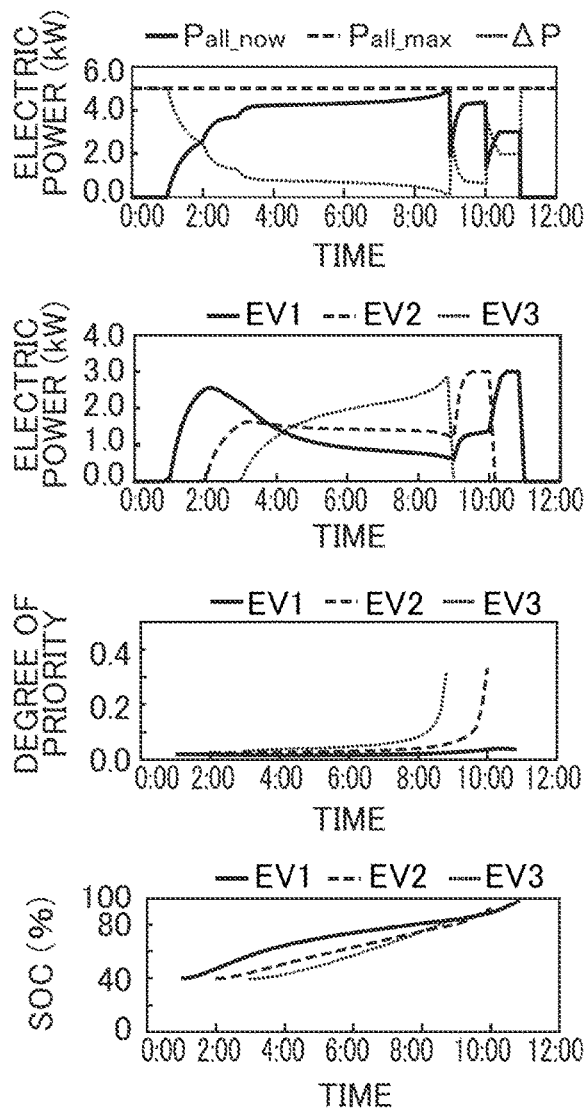
FIG. 15B is a view of plural graphs showing results of the simulation in the sixth modified example, indicating the four graphs of the fifth modified example on the left side and the four graphs of the sixth modified example on the right side.
Figure 15B:
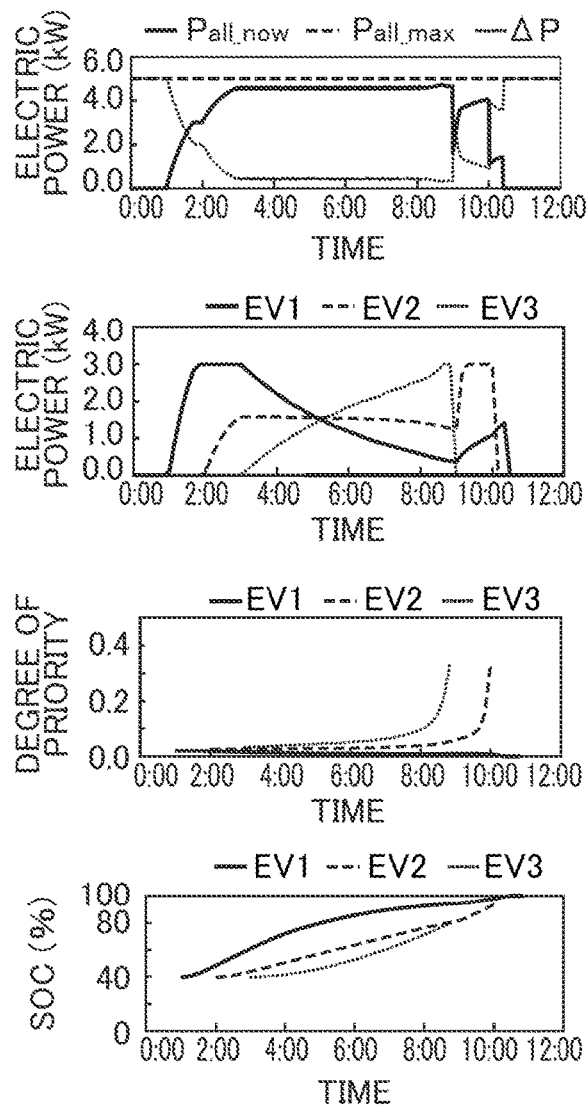

The results of the simulation are next described below. FIG. 15B illustrates eight graphs showing the results of the simulation, indicating the four graphs of the fifth modified example on the left side and the four graphs of the sixth modified example on the right side. The items of the numerical values indicated in the axis of ordinates and the axis of abscissas in the respective graphs are the same as those in the respective graphs shown in FIG. 5B, and overlapping explanations are not repeated below.

The differences between the fifth modified example (the four graphs on the left side) and the sixth modified example (the four graphs on the right side) are described below. The element-receiving electric power (Pt) of each of the electric vehicle EV1 that has started the electric power reception at 1 a.m. and the electric vehicle EV2 that has started the electric power reception at 2 a.m. rapidly increases immediately after the start of the electric power reception. The current value of the total transmitted electric power (Pall_now) also rapidly increases. The reason for this is because at this point the element-receiving electric power (Pt) of the respective electric vehicles (EV1 and EV2) is updated without the use of the term of the electric power correction value (αPt) since the differential electric power (ΔP) is determined not to be zero.

The margin remained in the current value of the total transmitted electric power (Pall_now) since the differential electric power (ΔP) did not reach zero after the electric vehicle EV3 started the electric power reception at 3 a.m. This is because the element-receiving electric power (Pt) of the respective electric vehicles (EV1 to EV3) is updated by use of the term of the electric power correction value (αPt) since the differential electric power (ΔP) is determined to be zero.

The sixth modified example can leave the margin in the current value of the total transmitted electric power (Pall_now) to lead the differential electric power (ΔP) to avoid reaching zero while decreasing the difference between the current value of the total transmitted electric power (Pall_now) and the maximum value of the total transmitted electric power (Pall_max), as compared with the fifth modified example. Namely, the sixth modified example can increase the efficiency of use of the total transmitted electric power (Pall_now/Pall_max) supplied to the load group 11 via the electric power supply base point 10, and can allow the electric vehicle that intends to newly start the electric power reception to start the electric power reception at an early stage.

The electric power correction value (αPt) may be proportional to the maximum value of the element-receiving electric power (Ptmax) that the electric vehicle EV1 can receive, instead of the element-receiving electric power (Pt). This can suitably share the generation of the margin in the current value of the total transmitted electric power (Pall_now) among the respective electric vehicles depending on the maximum value of the element-receiving electric power (the electric power capacity).

First Example

The power reception control device and the power reception control method according to the respective embodiments and the modified examples thereof described above all can be used for various phases, levels, or situations in the entire electric power system including the generation of the electric energy (the power generation), the transport (the electric power transmission/electric power conversion), the consumption (the demand), and the supply (the electric power distribution).

The following are first to seventh examples illustrated with various phases, levels, or situations to which the power reception control device and the power reception control method according to the respective embodiments and the modified examples thereof can be applied. It should be understood that the following examples are not intended to limit the applicable ranges of the power reception control device and the power reception control method. The power reception control device and the power reception control method according to the respective embodiments and the modified examples thereof can execute the power reception control for various kinds of power reception elements or power storage elements on the basis of the electric power supply base point 10 optionally set in the electric power system.

While the first to seventh examples are illustrated with the case in which the power reception control device is mounted on the electric vehicle EV, the power reception control device may be located on the outside of the electric vehicle (the power reception element) as a target to be controlled.

Figure 16:
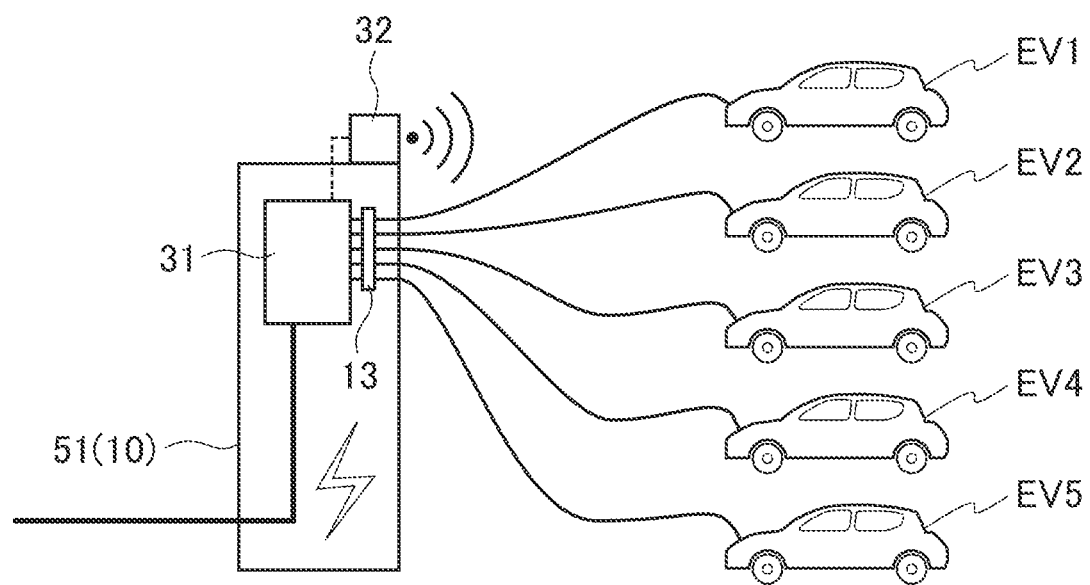
FIG. 16 is a block diagram illustrating a configuration of a power reception control device and peripheral devices according to a first example.

The first example is illustrated below with a case of using the power reception control device in a charging station for electric vehicles EV installed in a spot such as a residence, an office building, a commercial facility, a factory, or a parking lot in an expressway. As illustrated in FIG. 16, a plurality of charging cables are connected to a single pole-type charging station 51, and the respective charging cables are provided with charging connectors at the ends thereof.

The charging station 51 of this type is called a "multi-port charger". The respective charging connectors are connected to each of the charging ports of the electric vehicles (EV1 to EV5). The electric energy supplied from the upstream side of the charging station 51 is supplied to the respective electric vehicles (EV1 to EV5) via the charging station 51.

In the first example, the charging station 51 corresponds to the "electric power supply base point 10", and the load group 11 is composed of the electric vehicles (EV1 to EV5). The load group 11 does not include any configuration corresponding to the other electric power-consuming elements 15. The load group 11, however, may include any other power reception elements or power storage elements to which the power reception control device and the power reception control method according to the embodiments or the modified examples are applied.

The maximum value of the total transmitted electric power (Pall_max) that can be supplied to all of the electric vehicles (EV1 to EV5) via the charging station 51 is preliminarily determined, and is 10 kW, for example. The charging station 51 includes the current measurement device 13 that measures the current value of the total transmitted electric power (Pall_now) having been supplied to all of the electric vehicles (EV1 to EV5) via the charging station 51, and the calculator 31 that subtracts the current value of the total transmitted electric power (Pall_now) from the maximum value of the total transmitted electric power (Pall_max) so as to calculate the differential electric power ($\Delta P$). The transmitter 32 is installed adjacent to the charging station 51. The transmitter 32 transmits (broadcasts) the electrical signal indicating the differential electric power ($\Delta P$) to all of the electric vehicles (EV1, EV2, EV3, . . . ) included in the load group 11 by mobile communication such as a wireless LAN or Bluetooth (registered trademark). The electrical signal may be transmitted as broadcast via wired communication through charging cables, instead of the transmitter 32.

When the maximum electric power that the respective electric vehicles (EV1 to EV5) can receive is presumed to 3 kW, for example, three of the electric vehicles can be charged simultaneously at the maximum electric power of 3 kW. When the four or five electric vehicles are charged simultaneously, the electric power needs to be shared among the respective electric vehicles (EV1 to EV5). The use of the power reception control device and the power reception control method according to the embodiments or the modified examples thereof can shift the charging time of the respective electric vehicles (EV1 to EV5) or control the element-receiving electric power (Pt) depending on the degree of priority ($\beta$). The technical effects and significances as described above thus can be achieved.

For example, in a case of commuting by a vehicle, the charging time in a charging facility installed in the workplace is typically about two to three hours per vehicle, which is shorter than the working hours (eight hours). Starting the electric power reception of all of the electric vehicles (EV1 to EV5) at substantially the same time on arrival at the workplace at the maximum electric power (3 kW) requires a massive amount of the contract electric power, inevitably increasing the number of the charging stations 51 accordingly. The shift of the charging time of the respective electric vehicles (EV1 to EV5) or the control of the element-receiving electric power (Pt) can reduce the amount of the contract electric power and the number of the charging stations 51.

The charging station 51 can be achieved such that the existing facility (the charging station 51) is only additionally provided with the transmitter 32 as a device, since the existing facility already includes the current measurement device 13 and the calculator 31. The charging station 51 thus can be introduced to any existing facilities at low costs. In addition, the electric vehicles (EV1 to EV5) do not need to have a function of communications toward the charging station 51 for determining the degree of priority ($\beta$), and the transmitter 32 only needs to have a function of one-way communications, so as to decrease the number of functions that the added transmitter 32 should have.

The electric vehicles (EV1 to EV5) determine the own degree of priority ($\beta$) and control the own element-receiving electric power (Pt) independently of and parallel to each other. The charging station 51 only needs to calculate and transmit as broadcast the differential electric power ($\Delta P$) to the respective electric vehicles (EV1 to EV5). This can decrease the number of functions to be added to the existing facility (the charging station 51).

The first example is an application example in which the charging station 51 is used as the "electric power supply base point 10" that supplies the electric power to the load group 11 including about three to ten electric vehicles. The charging station 51 may use any charging mode, which may be either normal charging (output: single-phase 100V/200V AC) or quick charging (output: maximum 500V DC).

Second Example

The second example is illustrated below with a case of sing the "electric power supply base point 10" as an electric power converter installed in a facility such as a residence, an office building, a commercial facility, a factory, or a parking lot in an expressway. The electric power converter in the facility is an example of the electric power facility 12 located on the upstream side of the charging station 51. As illustrated in FIG. 17A, a power conversion facility 52 is conventionally used that supplies the electric power to socket-type charging ports (P1 to P5) with no cables. The following is a case presumed to need to increase the charging ports (P6 to P10). In the comparative example as illustrated in FIG. 17A, a second power conversion facility 53 needs to be additionally installed for supplying the electric power to the charging ports (P6 to P10). The comparative example requires extra contract electric power to be supplied to the respective charging ports via both the first power conversion facility 52 and the second power conversion facility 53, increasing the electric power cost more than before.

Figure 17B:
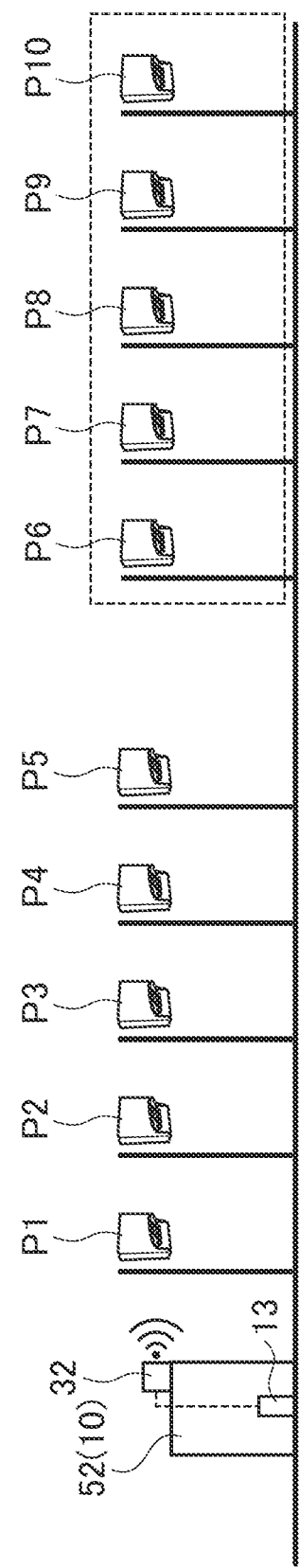
FIG. 17B is a block diagram illustrating a configuration of a power reception control device and peripheral devices according to the second example.

In contrast, according to the second example as illustrated in FIG. 17B, an electric power transmission cable for supplying the electric power to the respective charging ports (P1 to P5) is extended to be connected with the charging ports (P6 to P10). The power reception control device and the power reception control method according to the embodiments or the modified examples thereof are applied to all of the electric vehicles that receive the electric power via the charging ports (P1 to P10).

The second example does not need to increase the amount of the maximum value of the total transmitted electric power (Pall_max: the contract electric power) supplied via the power conversion facility 52 having been installed before or increase the electric power capacity of the electric power transmission cable, but only adds the transmitter 32 as a device. The power conversion facility 52 is only required to have the function as the current measurement device 13.

The second example is based on the second modified example as illustrated in FIG. 4. In particular, the signal reception device 21 mounted in the respective electric vehicles connected to the charging ports (P1 to P10) receives the electrical signal indicating the maximum value of the total transmitted electric power (Pall_max: the contract electric power) that is the available amount to be supplied to all of the electric vehicles via the power conversion facility 52 and the electrical signal indicating the current value of the total transmitted electric power (Pall_now), and the calculation device 23 mounted on the respective electric vehicles calculates the differential electric power (ΔP) to control the own element-receiving electric power (Pt). Alternatively, the current measurement device 13 may calculate the differential electric power (ΔP) so that the transmitter 32 transmits the electrical signal indicating the differential electric power (ΔP).

In the second example, the power conversion facility 52 corresponds to the "electric power supply base point 10", and the load group 11 is composed of the electric vehicles connected to the respective charging ports (P1 to P10). The load group 11 does not include any configuration corresponding to the other electric power-consuming elements 15. The load group 11, however, may include any other power reception elements or power storage elements to which the power reception control device and the power reception control method according to the embodiments or the modified examples are applied.

The other configurations are common to those in the first example, and overlapping explanations are not repeated below.

Third Example

The third example is illustrated below with a case of using the "electric power supply base point 10" as a wiring facility that distributes the electric power generated in a power plant and transferred via an electrical substation.

Figure 18:
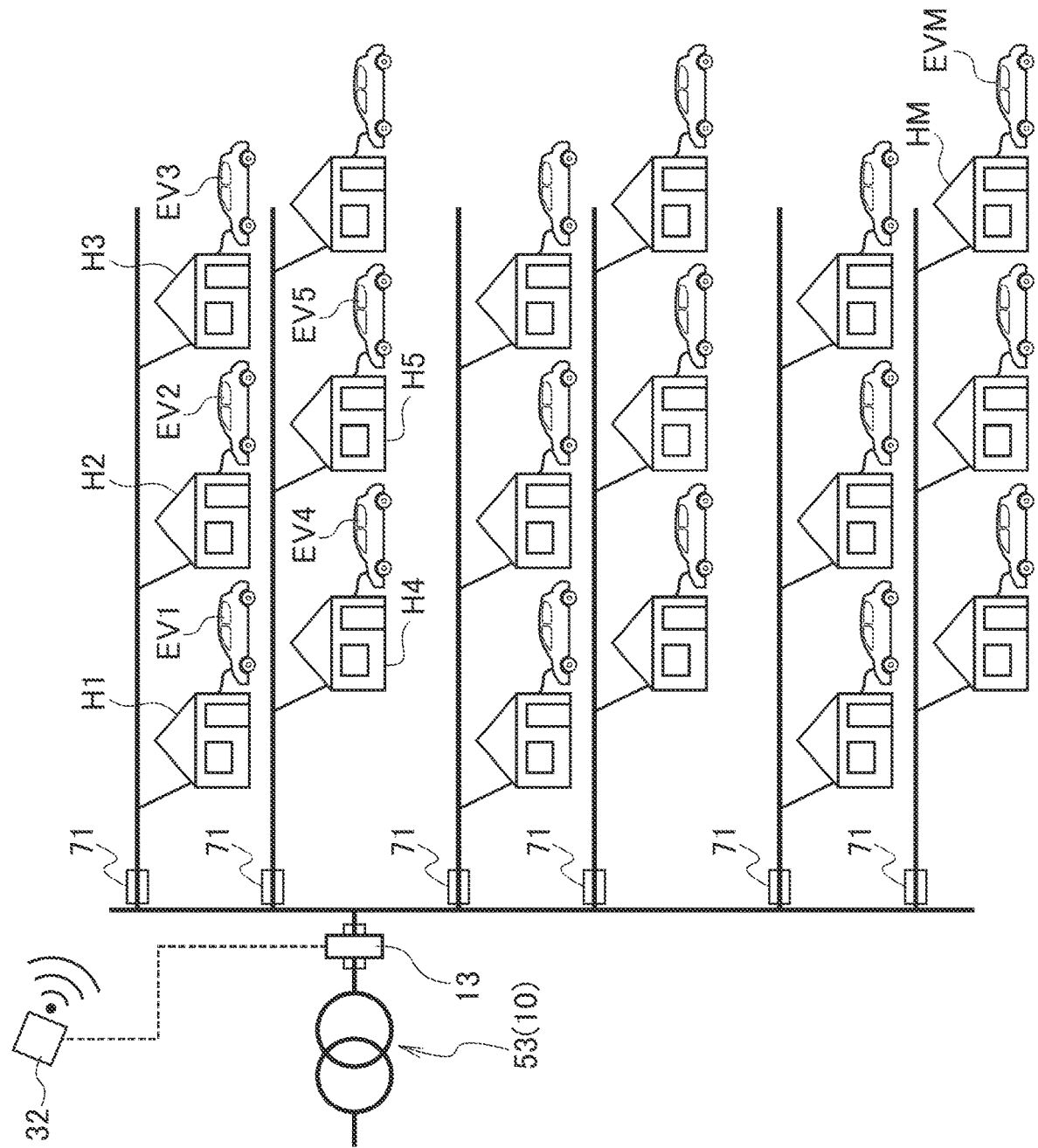
FIG. 18 is a block diagram illustrating a configuration of a power reception control device and peripheral devices according to a third example.

As illustrated in FIG. 18, the electric power supplied via the wiring facility 53 (an example of the electric power supply base point 10) is distributed to a plurality of pole-mount transformers 71, and the electric power via the respective pole-mount transformers 71 is further distributed to a plurality of residences (H1 to HM) and a plurality of electric vehicles (EV1 to EVM). The sign "M" indicates the number of the residences and the electric vehicles.

The current measurement device 13 is installed on the wiring facility 53 on the upstream side of the respective pole-mounted transformers 71. The current measurement device 13 measures the current value of the total transmitted electric power (Pall_now) having been supplied to all of the residences (H1 to HM) and the electric vehicles (EV1 to EVM) via the wiring facility 53. The electrical signal indicating the current value of the total transmitted electric power (Pall_now) measured by the current measurement device 13 is sent to the transmitter 32. The transmitter 32 transmits (broadcasts) the signal to all of the residences (H1 to HM) and the electric vehicles (EV1 to EVM) by mobile communication such as a wireless LAN or Bluetooth (registered trademark). The transmitter 32 may transmit as broadcast the signal via wired communication through electric transmission cables.

The power reception control device and the power reception control method according to the embodiments or the modified examples thereof are applied to all of the residences (H1 to HM) and the electric vehicles (EV1 to EVM) that receive the electric power via the wiring facility 53. In the third example, the wiring facility 53 corresponds to the "electric power supply base point 10", and the load group 11 is composed of the residences (H1 to HM) and the electric vehicles (EV1 to EVM). The respective residences (H1 to HM) correspond to the other electric power-consuming elements 15.

In a case in which some of the residences (H1 to HM) have a stationary battery installed, the power reception control device and the power reception control method according to the embodiments or the modified examples thereof can be applied to the power reception control upon charging the stationary battery. The stationary battery in this case is an example of the other power storage elements.

The third example is also based on the second modified example as illustrated in FIG. 4 as in the case of the second example. In particular, the signal reception device 21 included in the respective electric vehicles (EV1 to EVM) receives the electrical signal indicating the maximum value of the total transmitted electric power (Pall_max: the contract electric power) and the electrical signal indicating the current value of the total transmitted electric power (Pall_now) to calculate the differential electric power (ΔP). Alternatively, the current measurement device 13 may calculate the differential electric power (ΔP) so that the transmitter 32 transmits the electrical signal indicating the differential electric power (ΔP).

The wiring facility 53 in the third example includes facilities or devices on the upstream side of the pole-mounted transformers 71, such as wires, switches, voltage regulators, and feeders.

The third example can avoid an electrical overload of the transmitted electric power of the wiring facility 53 if the number of the electric vehicles (EV1 to EVM) that receive the electric power increases within an area or block to which the electric power is supplied via the wiring facility 53.

Fourth Example

The first to third examples are illustrated above with the case in which the maximum value of the total transmitted electric power (Pall_max) that is the available amount to be supplied to the entire load group 11 via the electric power supply base point (51, 52, 53) is set to the fixed value that does not vary. The power reception control device and the power reception control method according to the embodiments or the modified examples thereof can be applied also to a case in which the maximum value of the total transmitted electric power (Pall_max) varies depending on the time.

Figure 19A:
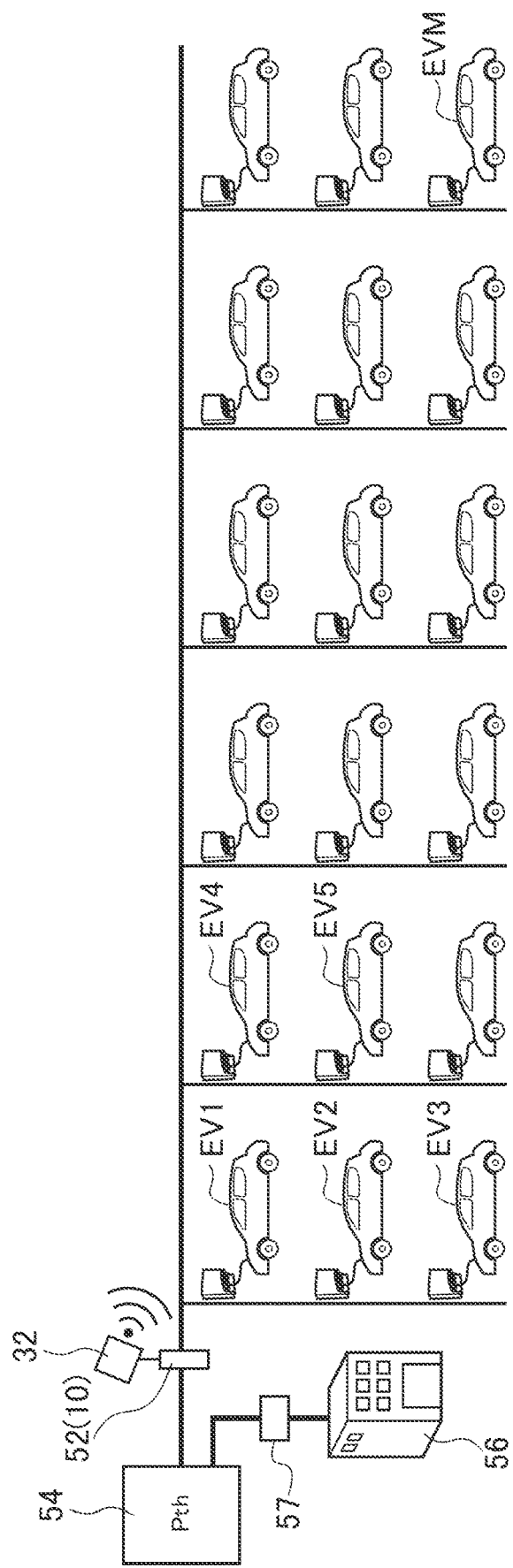
FIG. 19A is a block diagram illustrating a configuration of a power reception control device and peripheral devices according to a fourth example.

The fourth example is illustrated below with a case in which the maximum value of the total transmitted electric power (Pall_max) varies depending on the time. As illustrated in FIG. 19A, not only the charging station for electric vehicles EV but also an in-facility device 56 that consumes the electric power such as a lighting device, an air conditioning device, and an elevating device are present in a facility such as an office building, a commercial facility, a factory, or a parking lot in an expressway.

Figure 19B:
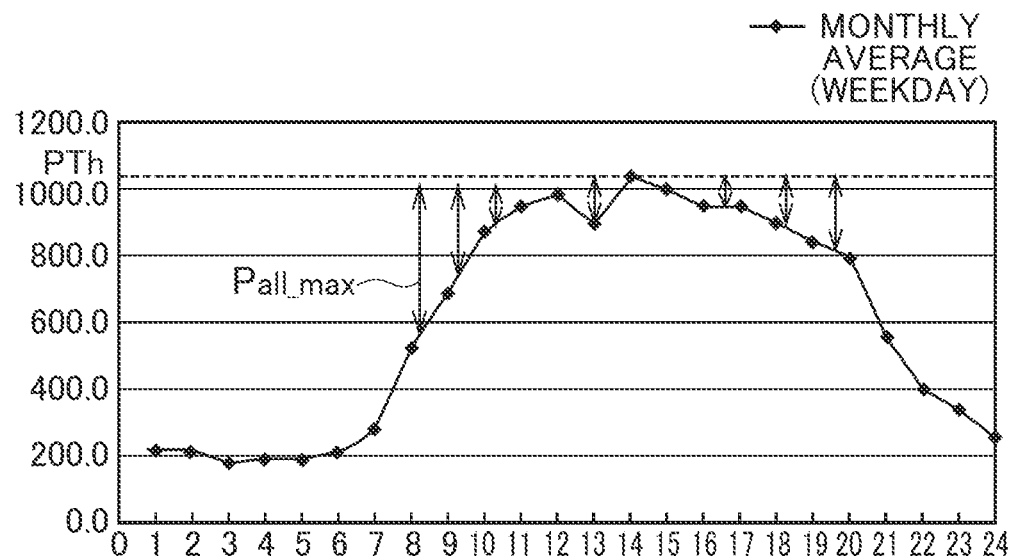
FIG. 19B is a graph showing a change with time in electric power consumed by an in-facility device 56 (facility-consumed electric power).

An electric power converter 54 installed in the facility transfers the electric power not only to the electric vehicles (EV1 to EVM) connected to the charging station but also to the in-facility device 56. As illustrated in FIG. 19B, the electric power consumed by the in-facility device 56 (referred to below as a "facility-consumed electric power") greatly varies depending on the time zone. The facility-consumed electric power between 8 a.m. and 9 p.m. is greater than or equal to triple times as large as the facility-consumed electric power between 0 a.m. and 7 a.m.

A caretaker of the facility usually contracts the electric power capacity according to the upper limit of the total transmitted electric power (Pth) that is the available amount to be supplied to the in-facility device 56 and the respective electric vehicles (EV1 to EVM) connected to the charging station via the electric power converter 54.

Regulating the amount of the electric power supplied to the respective electric vehicles (EV1 to EVM) so as to be decreased to a small level during the time zone around noon during which the consumed electric power of the in-facility device 56 is maximum, and regulating the amount of the electric power supplied to the respective electric vehicles (EV1 to EVM) so as to be increased during the time zone during which the consumed electric power of the in-facility device 56 is relatively small, can decrease the upper limit of the total transmitted electric power (Pth) to a small level.

As illustrated in FIG. 19$, the maximum value of the total transmitted electric power (Pall_max) that is the available amount to be supplied to all of the electric vehicles (EV1 to EVM) is caused to vary in accordance with the change with time in the facility-consumed electric power and the preliminarily determined upper limit of the total transmitted electric power (Pth). In particular, the maximum value of the total transmitted electric power (Pall_max) is set to a value obtained by subtracting the facility-consumed electric power from the upper limit of the total transmitted electric power (Pth). This leads the maximum value of the total transmitted electric power (Pall_max) to vary in association with the facility-consumed electric power.

In the fourth example, the "load group 11" includes all of the electric vehicles (EV1 to EVM) but does not include the in-facility device 56. The power conversion facility 52 is located on the downstream side of the electric power converter 54. The power conversion facility 52 supplies the electric power to all of the electric vehicles (EV1 to EVM). The power conversion facility 52 has the same configuration as the power conversion facility 52 illustrated in FIG. 17B. In the fourth example, the power conversion facility 52 corresponds to the "electric power supply base point 10".

The fourth example may include a facility electric power measurement device 57 that measures a current value of the facility-consumed electric power. An electrical signal indicating the current value of the facility-consumed electric power calculated by the facility electric power measurement device 57 is sent to the power conversion facility 52. A calculator in the power conversion facility 52 subtracts the current value of the facility-consumed electric power from the upper limit of the total transmitted electric power (Pth) so as to calculate the maximum value of the total transmitted electric power (Pall_max).

Instead of the installation of the facility electric power measurement device 57, statistical data of the facility-consumed electric power may be preliminarily prepared that is obtained by analyzing histories of changes with time in the facility-consumed electric power. The calculator in the power conversion facility 52 subtracts the statistical data on the facility-consumed electric power from the upper limit of the total transmitted electric power (Pth) so as to calculate the maximum value of the total transmitted electric power (Pall_max).

The transmitter 32 is installed adjacent to the power conversion facility 52. The transmitter 32 transmits the electrical signal indicating the maximum value of the total transmitted electric power (Pall_max) and the electrical signal indicating the current value of the total transmitted electric power (Pall_now) to all of the electric vehicles (EV1 to EVM). The signal reception device 21 included in the respective electric vehicles (EV1 to EVM) calculates the differential electric power ($\Delta P$) in accordance with the maximum value of the total transmitted electric power (Pall_max) and the current value of the total transmitted electric power (Pall_now). Alternatively, the current measurement device 13 in the power conversion facility 52 may calculate the differential electric power ($\Delta P$) so that the transmitter 32 transmits the electrical signal indicating the differential electric power ($\Delta P$).

Alternatively, the power conversion facility 52 may calculate the differential electric power ($\Delta P$). The transmitter 32 then transmits the electrical signal indicating the differential electric power ($\Delta P$).

The fourth example calculates the differential electric power ($\Delta P$) in accordance with the maximum value of the total transmitted electric power (Pall_max) that varies with the passage of time to decrease the upper limit of the total transmitted electric power (Pth), so as to reduce the electric power cost to a small level.

Fifth Example

Figure 19C:
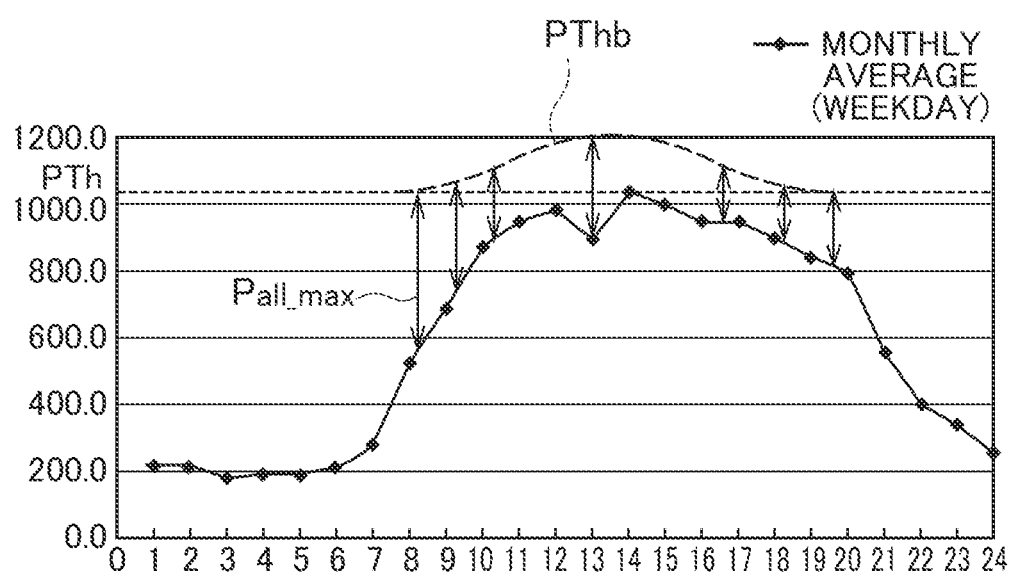
FIG. 19C is a graph showing a change with time in the electric power consumed by the facility-installed device 56 (the facility-consumed electric power) and independent-generation electric power.

The power reception control device according to the embodiments and the modified examples thereof can be applied to a case in which a facility that consumes the electric power, such as an office building, a commercial facility, a factory, or a parking lot in an expressway, privately includes a power generation facility for renewable energy such as sunlight, wind-generated power, geothermal heat, small and medium-sized water power, and biomass. As illustrated in FIG. 19C, the maximum value of the total transmitted electric power (Pall_max) can be changed according to a second upper limit (Pthb) obtained such that independent-generation electric power is added to the upper limit of the total transmitted electric power (Pth). Namely, the value obtained by subtracting the facility-consumed electric power from the second upper limit (Pthb) can be set as the maximum value of the total transmitted electric power (Pall_max).

The electric power generated from part of the renewable energy such as sunlight or wind-generated power is affected by the seasons or the weather. In the fifth example, the facility electric power measurement device 57 as illustrated in FIG. 19A measures the current value of the facility-consumed electric power, and also measures the current value of the independent-generation electric power. The electrical signal indicating the current value of the facility-consumed electric power and the current value of the independent-generation electric power calculated by the facility electric power measurement device 57 are sent to the power conversion facility 52. The calculator in the power conversion facility 52 subtracts the current value of the facility-consumed electric power from the upper limit of the total transmitted electric power (Pth) and adds the current value of the independent-generation electric power thereto so as to calculate the maximum value of the total transmitted electric power (Pall_max).

Instead of the installation of the facility electric power measurement device 57, statistical data of the independent-generation electric power may be preliminarily prepared that is obtained by analyzing histories of changes with time in the independent-generation electric power. The calculator in the power conversion facility 52 subtracts the statistical data on the facility-consumed electric power from the upper limit of the total transmitted electric power (Pth) and adds the statistical data on the independent-generation electric power thereto so as to calculate the maximum value of the total transmitted electric power (Pall_max).

The fifth example calculates the differential electric power (ΔP) in accordance with the second upper value (Pthb) obtained such that the independent-generation electric power is added to the upper value of the total transmitted electric power (Pth), so as to decrease the upper value of the total transmitted electric power (Pth) to reduce the electric power cost. At the same time, the fifth example can execute the power reception control that makes effective use of the independent-generation electric power for leading power supply usage of the renewable energy.

Sixth Example

The power reception control device and the power reception control method according to the embodiments and the modified examples thereof can be applied to a power transmission situation, as illustrated in FIG. 20A, in which a plurality (the n-number in this case) of areas or blocks (collectively referred to below as "blocks) compose a single local government, and the electric power is supplied to all of the n-number of the blocks (61, 62, and 63) via an electric power facility (for example, an electrical substation 55) located on the upstream side of the n-number of the blocks (61, 62, and 63). The n-number of the blocks (61, 62, and 63) each correspond to the configuration as illustrated in FIG. 18.

A limited value of the total transmitted electric power (Pcity_max) that is the available amount to be supplied to the entire local government is allotted to the electrical substation 55. The limited value of the total transmitted electric power (Pcity_max) is distributed to the respective blocks (J). The electric power facility 55 controls the maximum electric power (Pall_max_J) of the respective blocks (J) so that the sum of the maximum electric power (Pall_max_J) distributed to the respective blocks (J) conforms to the limited value of the total transmitted electric power (Pcity_max), as given by the formula (9) below. The limited value of the total transmitted electric power (Pcity_max) is distributed according to a predetermined rate of distribution per block (J).

Figure 20B:
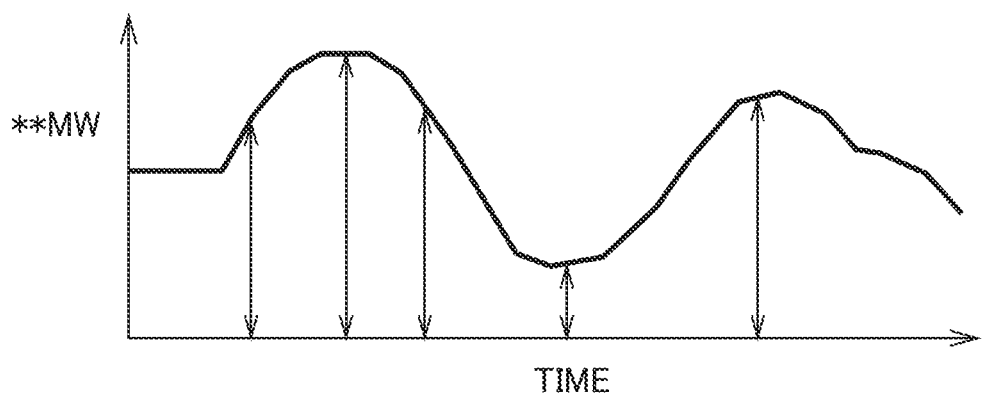
FIG. 20B is a graph showing an example of a change with time in a limited value of total transmitted electric power (Pcity_max) in the sixth example.

As illustrated in FIG. 20B, the limited value of the total transmitted electric power (Pcity_max) varies in association with the change with time in the electric power supplied to the electric power facility 55 from a power plant, for example. The electric power (Pall_max_J) distributed to the respective blocks (J) also varies in association with the variation in the limited value of the total transmitted electric power (Pcity_max).

In the sixth example, the maximum electric power (Pall_max_J) of the respective blocks (J) corresponds to the maximum value of the total transmitted electric power (Pall_max) that is the available amount to be supplied to the entire load group 11 from the electric power supply base point 10. The electric power supply base point 10 in the sixth example corresponds to the power conversion facility 52 in the respective blocks, and the load group 11 corresponds to the respective blocks (61, 62, and 63).

[Math. 9]

$$P_{city\_max} = \sum_{J=1}^{n} P_{all\_max\_J} \quad (9)$$

The power reception control device and the power reception control method according to the embodiments or the modified examples thereof are applied to all of the blocks (61, 62, and 63) to which the electric power is supplied via the electric power facility 55. In particular, the power reception control device and the power reception control method are applied to all of the power reception elements and the power storage elements included in all of the blocks (61, 62, and 63). Instructing the maximum electric power (Pall_max_J) of the respective blocks (J) by the electric power facility 55 located on the upstream side of the respective blocks (61, 62, and 63) can control the electric power reception of all of the power reception elements and the power storage elements included in all of the blocks (61, 62, and 63).

Seventh Example

The first to sixth examples are illustrated above with the case in which the plural electric vehicles EV included in the load group 11 are located within a particular practical region in the electric power system. The recent liberalization of electric power provides various kinds of electric power businesses and various types of providers of electric power service. While part of the electric power businesses or part of the providers of the electric power service each supplies the electric power to a plurality of consumers who have made an electric-power contract within a range of the maximum value of the total transmitted electric power (Pall_max) individually allotted thereto, not all the contracted consumers are located within the particular practical region in the electric power system.

Figure 21:
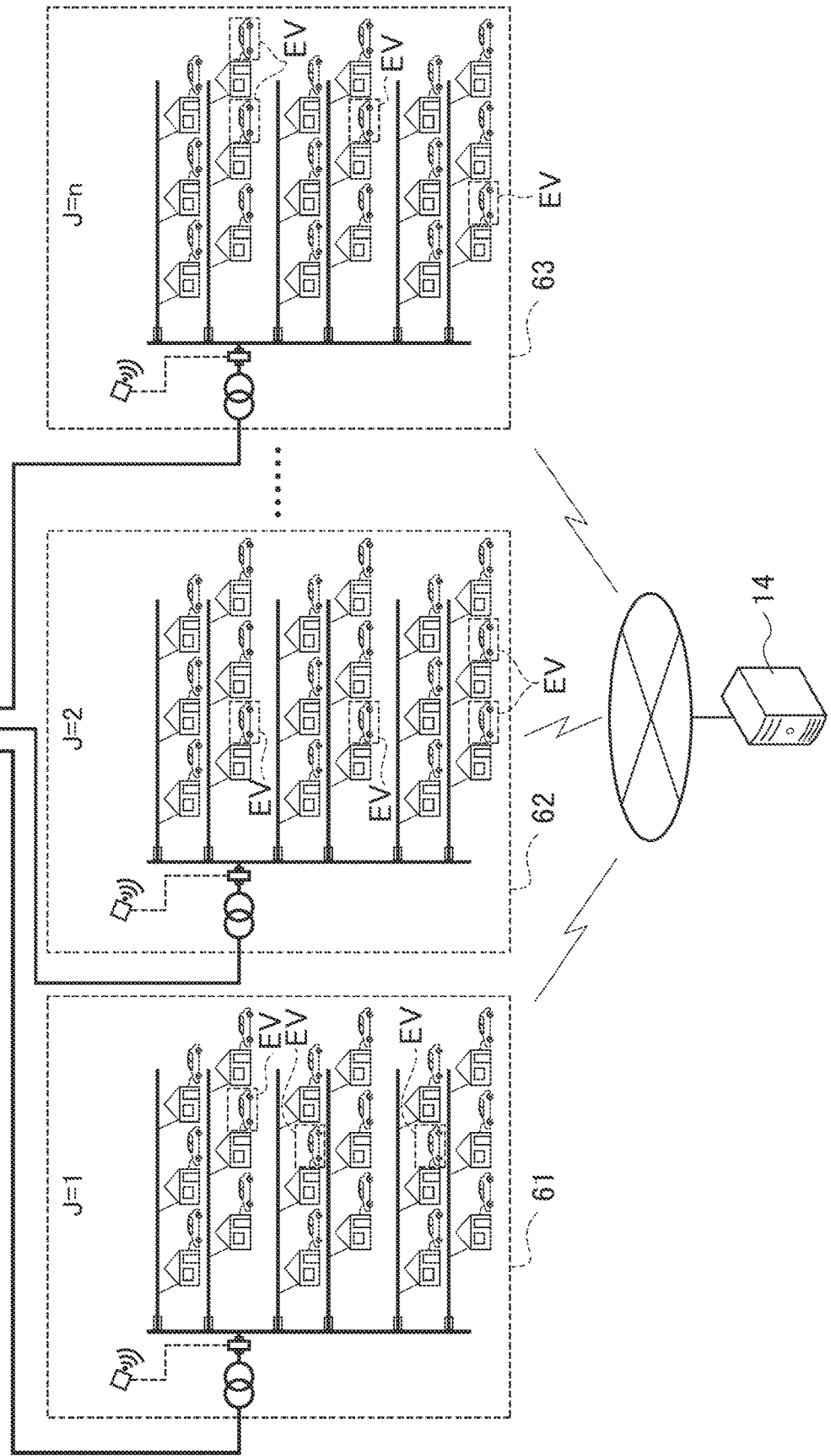
FIG. 21 is a block diagram illustrating a configuration of a power reception control device and peripheral devices according to a seventh example.

FIG. 21 illustrates an example in which a plurality of electric vehicles EV (an example of consumers) each having made an electric-power contract with a provider of electric power service are located over several blocks (61 to 63), and the plural blocks (61 to 63) each further include other electric vehicles that have made an electric-power contract with other providers of electric power service.

The load group 11 in this case includes the plural electric vehicles EV but does not include the other electric vehicles. The electric power supply base point 10 that supplies the electric power to the entire load group 11 is the electrical substation 55 located on the upstream side of the respective wiring facilities 53. Part of the electric power transmitted via the electrical substation 55 is also supplied to the other electric vehicles.

The provider of the electric power service uses a server 14 capable of mutually communicating with all of the electric vehicles EV each having made the electric-power contract therewith. As illustrated with reference to FIG. 3, the power reception device 24 of the respective electric vehicles EV includes the current measurement device 27 that measures the electric power (the element-receiving electric power) received by the electric vehicle EV1, and the transmitter 28 that transmits the electrical signal indicating the element-receiving electric power (Pt) to the differential information transmission device 14 by wireless communication. A transmission device that exchanges communications according to mobile communication standards such as 4G and 5G may be used as the transmitter 28.

The server 14 adds up the element-receiving electric power of all of the electric vehicles EV having made the electric-power contract with the provider, so as to calculate the current value of the total transmitted electric power (Pall_now) having been supplied to the entire load group 11 from the electrical substation 55. The server 14 calculates the differential electric power (ΔP) in accordance with the current value of the total transmitted electric power (Pall_now) and the maximum value of the total transmitted electric power (Pall_max) allotted to the provider of the electric power service among the total transmitted electric power (Pall_max) transferred via the electrical substation 55. The server 14 then transmits (broadcasts) the electrical signal indicating the differential electric power (ΔP) via the Internet to all of the electric vehicles EV having made the electric-power contract with the provider.

All of the electric vehicles EV can execute the power reception control method by use of the power reception control device according to the embodiments or the modified examples thereof. The power reception control device and the power reception control method according to the embodiments or the modified examples thereof thus can be applied to the case in which some of the plural electric vehicles EV included in the load group 11 are not located in the particular practical region in the electric power system.

(Other Examples)

The power reception control device and the power reception control method according to the respective embodiments and the modified examples thereof can be applied to an electric power system of bundling (aggregating) the electric energy, such as solar power, wind power, storage batteries, and fuel batteries, generated in small-sized power generation facilities distributed in various areas by use of the Internet of Things (IoT), and controlling and managing the bundled electric energy to use. The electric power system, which bundles the energy of the neighboring small-scale power storage elements to function as if a single large power plant, is called a virtual power plant (VPP).

The use of the power reception control device and the power reception control method according to the respective embodiments or the modified examples thereof can control the element-receiving electric power received by the plural power reception elements included in the load 11 in the virtual power plant that supplies the electric energy to the load group 11 including the power reception elements via an aggregator that bundles the electric energy (an example of the electric power supply base point 10).

The aggregator acquires the information indicating the maximum value of the total transmitted electric power (Pall_max) that is the available amount to be supplied to the entire load group 11 via the aggregator and the information indicating current value of the total transmitted electric power (Pall_now) having been supplied to the entire load group 11 via the aggregator, and transmits as broadcast the electrical signal indicating the differential electric power (ΔP) calculated in accordance with the respective information to the respective power reception elements included in the load group 11. Each of the power reception elements that receive the electrical signal indicating the differential electric power (ΔP) can control the own element-receiving electric power (Pt) independently of and parallel to the aggregator and the other power reception elements by use of the power reception control device and the power reception control method according to the respective embodiments or the modified examples thereof.

The power reception control device and the power reception control method according to the respective embodiments and the modified examples thereof can also be applied to a next-generation power grid (called a smart grid) capable of controlling and optimizing the flow of the electric power on both the supplier and consumer sides. A dedicated device or software installed in part of the power grid can transmit (broadcast) the electrical signal indicating the maximum value of the total transmitted electric power (Pall_max: the contract electric power), the current value of the total transmitted electric power (Pall_now), or the differential electric power (ΔP) to the respective power reception elements or the respective power storage elements included in the load group 11. The respective power reception elements or the respective power storage elements having received the corresponding electrical signal can execute the power reception control by use of the power reception control device according to the respective embodiments and the modified examples thereof.

The leading power supply usage of the renewable energy has an urgent and important issue to connect the electric power source of the renewable energy to a conventional electric power system connecting a large-scale power source with consuming spots. If the aggregator executes the centralized control in the control system in the virtual power plant using a smart grid, the aggregator needs to collect all of data including the element-receiving electric power (Pt), the current value of the total transmitted electric power (Pall_now), and the differential electric power (ΔP) of all of the power reception elements or the power storage elements. The conventional case thus still has various problems including the management of interactive communication conditions and the information processing ability of the aggregator, leading to high obstacles to introduction.

In contrast, the use of the power reception control device and the power reception control method according to the respective embodiments or the modified examples thereof can achieve the distribution control in the control system in the virtual power plant. That is, the respective power reception elements or the respective power storage elements control the own element-receiving electric power (Pt) independently of and parallel to the aggregator and the other power reception elements, so as to solve the various problems such as the management of the interactive communication conditions and the information processing ability of the aggregator. The aggregator in this case only needs to transmit (broadcast) the data such as the differential electric power (ΔP) or the current value of the total transmitted electric power (Pall_now) so that the respective power reception elements or the respective power storage elements receive the corresponding data transmitted. Namely, the one-way communications from the aggregator to the respective power reception elements or the respective power storage elements are only required.

The respective embodiments and the modified examples thereof are illustrated above with the example of the electric power control for the electric vehicles EV in the situation in which the driving battery 25 mounted on the respective electric vehicles EV is charged. The electric vehicles EV in this case are each an example of the "power storage element". The power reception control device or the power reception control method according to the respective embodiments and the modified examples thereof can also be applied to a situation in which the electric vehicles EV on which the battery 25 is mounted are each an example of the "electric power-consuming element" and thus an example of the "power reception element". Namely, an example can be presumed in which the respective electric vehicles EV directly consume the received electric power without storing the electric power in the battery 25.

For example, a situation is presumed in which a plurality of vehicles each including a wireless power reception apparatus are traveling on an expressway with traveling lanes that enable the traveling vehicles to receive the electric power in a wireless manner. Allowing the plural vehicles during traveling to receive the electric power in a wireless manner and the motor 26 as a drive source to directly consume received electric power, enables the respective vehicles to keep traveling. The battery 25 is thus sometimes not charged in such a wireless power supply situation during traveling. The electric vehicles in this case are thus not an example of the "power storage element" but an example of the "electric power-consuming element.

The plural vehicles traveling in the traveling lanes simultaneously receive the electric power from the respective traveling lanes in the wireless manner. The respective electric vehicles EV can exchange communications during traveling by use of the mobile communication system such as 4G and 5G. The transmitter 32 installed on an expressway transmits (broadcasts) the data such as the differential electric power ($\Delta P$) or the current value of the total transmitted electric power (Pall_now), so that the plural vehicles can receive the corresponding data. The respective vehicles can execute the power reception control method by use of the power reception control device according to the respective embodiments or the modified examples thereof.

The respective embodiments, the modified examples thereof, and the examples described above are examples of modes for executing the present invention. It should be understood that the present invention is not intended to be limited to the respective embodiments, the modified examples thereof, and the examples described above, and various modifications can be made, in addition to the embodiments described above, depending on the design without departing from the scope of the technical idea of the present invention.

The power reception control device according to the respective embodiments and the modified examples thereof can be implemented by a microcomputer including a central processing unit (CPU), a memory, and an input-output unit. A computer program (a power reception control program) for causing the microcomputer to function as the power reception control device is installed on the microcomputer to be executed. The microcomputer thus functions as a plurality of information processing units included in the power reception control device. While the present invention is illustrated with the case in which the software is installed to implement the power reception control device, dedicated hardware for executing various kinds of information processing may be prepared to implement the power reception control device. The dedicated hardware includes an application-specific integrated circuit (ASIC) configured to execute the functions described in the respective embodiments, the modified examples, or the examples, and conventional circuit components. The respective information processing units included in the power reception control device may be composed of individual hardware. The power reception control device may also serve as an electronic control unit (ECU) used for executing other control processing regarding the vehicles.

REFERENCE SIGNS LIST

10 ELECTRIC POWER SUPPLY BASE POINT
11 LOAD GROUP
12 ELECTRIC POWER FACILITY (ELECTRIC POWER SUPPLY BASE PONT)
15 OTHER ELECTRIC POWER-CONSUMING ELEMENT (POWER RECEPTION ELEMENT)
51 CHARGING STATION (ELECTRIC POWER SUPPLY BASE POINT)
52, 53 POWER CONVERSION FACILITY (ELECTRIC POWER SUPPLY BASE POINT)
55 ELECTRICAL SUBSTATION (ELECTRIC POWER SUPPLY BASE POINT)
71 POLE-MOUNT TRANSFORMER (ELECTRIC POWER SUPPLY BASE POINT)
EV1 to EV5, . . . , EVM ELECTRIC VEHICLE (POWER STORAGE ELEMENT, POWER RECEPTION ELEMENT)
Pall_max MAXIMUM VALUE OF TOTAL TRANSMITTED ELECTRIC POWER
Pall_now CURRENT VALUE OF TOTAL TRANSMITTED ELECTRIC POWER
Pt ELEMENT-RECEIVING ELECTRIC POWER
Ptmax MAXIMUM VALUE OF ELEMENT-RECEIVING ELECTRIC POWER
T REMAINING TIME PERIOD
SOCgoal TARGET VALUE OF STATE OF CHARGE OF POWER STORAGE ELEMENT
SOCnow CURRENT VALUE OF STATE OF CHARGE OF POWER STORAGE ELEMENT
$\beta$ DEGREE OF PRIORITY
$\beta\Delta P$ ELEMENT DIFFERENTIAL ELECTRIC POWER
$\Delta P$ DIFFERENTIAL ELECTRIC POWER
$\Delta SOC$ UNCHARGED STATE

The invention claimed is:

1. A power reception control method for a power storage element, the method comprising repeating a processing cycle to control element-receiving electric power received by the power storage element included in a load group in an electric power system for supplying electric energy to the load group including plural power storage elements via an electric power supply base point,
the processing cycle comprising:
acquiring information indicating differential electric power obtained by subtracting a current value of total transmitted electric power having been supplied to the entire load group via the electric power supply base point from a maximum value of the total transmitted electric power that is an available amount to be supplied to the entire load group via the electric power supply base point;
calculating a degree of priority of the power storage element indicating a level of priority regarding charging that the power storage element has over the other power storage elements in accordance with a numerical value indicating a demand of a user of the power storage element;
multiplying the differential electric power indicated in the acquired information by the degree of priority to calculate element differential electric power of the power storage element;
adding the element differential electric power to the element-receiving electric power in a previous processing cycle to update the element-receiving electric power; and
controlling the power storage element so as to receive the element-receiving electric power after being updated.

2. The power reception control method according to claim 1, wherein the numerical value indicating the demand of the user is a remaining time period during which the power storage element can be charged.

3. The power reception control method according to claim 2, wherein the degree of priority is higher as the remaining time period is shorter.

4. The power reception control method according to claim 3, wherein the degree of priority is inversely proportional to the remaining time period.

5. The power reception control method according to claim 1, wherein the numerical value indicating the demand of the user is a target value of a state of charge of the power storage element.

6. The power reception control method according to claim 5, wherein the degree of priority is calculated by comparison between the target value of the state of charge and a current value of the state of charge of the power storage element.

7. The power reception control method according to claim 6, wherein the degree of priority when the current value is smaller than the target value is greater than the degree of priority when the current value is greater than or equal to the target value.

8. The power reception control method according to claim 5, wherein the degree of priority is calculated in accordance with an uncharged state obtained by subtracting a current value of the state of charge of the power storage element from the target value of the state of charge.

9. The power reception control method according to claim 1, wherein the numerical value indicating the demand of the user is a value determined according to a format that the user makes a contract regarding charging for the power storage element.

10. A power reception control device for a power storage element, the device being configured to repeat a processing cycle to control element-receiving electric power received by the power storage element included in a load group in an electric power system for supplying electric energy to the load group including plural power storage elements via an electric power supply base point, the processing cycle comprising:
acquiring information indicating differential electric power obtained by subtracting a current value of total transmitted electric power having been supplied to the entire load group via the electric power supply base point from a maximum value of the total transmitted electric power that is an available amount to be supplied to the entire load group via the electric power supply base point;
calculating a degree of priority of the power storage element indicating a level of priority regarding charging that the power storage element has over the other power storage elements in accordance with a numerical value indicating a demand of a user of the power storage element;
multiplying the differential electric power indicated in the acquired information by the degree of priority to calculate element differential electric power of the power storage element;
adding the element differential electric power to the element-receiving electric power in a previous processing cycle to update the element-receiving electric power; and
controlling the power storage element so as to receive the element-receiving electric power after being updated.

11. A power reception control method for an electric vehicle, the method comprising repeating a processing cycle to control element-receiving electric power received by the electric vehicle included in a load group in an electric power system for supplying electric energy to the load group including plural electric vehicles via an electric power supply base point, the processing cycle comprising:
acquiring information indicating differential electric power obtained by subtracting a current value of total transmitted electric power having been supplied to the entire load group via the electric power supply base point from a maximum value of the total transmitted electric power that is an available amount to be supplied to the entire load group via the electric power supply base point;
calculating a degree of priority of the electric vehicle indicating a level of priority regarding charging that the electric vehicle has over the other electric vehicles in accordance with a numerical value indicating a demand of a user of the electric vehicle;
multiplying the differential electric power indicated in the acquired information by the degree of priority to calculate element differential electric power of the electric vehicle;
adding the element differential electric power to the element-receiving electric power in a previous processing cycle to update the element-receiving electric power; and
controlling the electric vehicle so as to receive the element-receiving electric power after being updated.

* * * * *